United States Patent
Sato

(10) Patent No.: US 10,609,400 B2
(45) Date of Patent: Mar. 31, 2020

(54) IMAGE PROCESSING DEVICE AND IMAGE PROCESSING METHOD

(71) Applicant: SONY CORPORATION, Tokyo (JP)

(72) Inventor: Kazushi Sato, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/406,616

(22) Filed: May 8, 2019

(65) Prior Publication Data

US 2019/0268613 A1    Aug. 29, 2019

Related U.S. Application Data

(63) Continuation of application No. 15/892,972, filed on Feb. 9, 2018, now Pat. No. 10,368,082, which is a
(Continued)

(30) Foreign Application Priority Data

Dec. 18, 2012  (JP) .................................. 2012-275775
Jul. 10, 2013   (JP) .................................. 2013-144930

(51) Int. Cl.
*H04N 19/34*   (2014.01)
*H04N 19/147*  (2014.01)
(Continued)

(52) U.S. Cl.
CPC ........... *H04N 19/34* (2014.11); *H04N 19/124* (2014.11); *H04N 19/147* (2014.11); *H04N 19/18* (2014.11);
(Continued)

(58) Field of Classification Search
None
See application file for complete search history.

(56) References Cited

U.S. PATENT DOCUMENTS

2003/0058936 A1   3/2003  Peng et al.
2007/0280349 A1   12/2007 Prieto et al.
(Continued)

FOREIGN PATENT DOCUMENTS

EP    2068567 A2    6/2009
JP    2007-266749 A 10/2007
(Continued)

OTHER PUBLICATIONS

Jan. 30, 2018, Japanese Office Action issued for related JP application No. 2014-553036.
(Continued)

*Primary Examiner* — Talha M Nawaz
(74) *Attorney, Agent, or Firm* — Paratus Law Group, PLLC

(57) ABSTRACT

Provided is an image processing device including a control section configured to set, based on a first quantization parameter offset set for a chroma component of a first layer, a second quantization parameter offset for a chroma component of a second layer decoded with reference to the first layer, and an inverse quantization section configured to inversely quantize transform coefficient data of the chroma component of the second layer using a quantization parameter computed using the second quantization parameter offset set by the control section.

14 Claims, 44 Drawing Sheets

Related U.S. Application Data continuation of application No. 14/441,671, filed as application No. PCT/JP2013/081406 on Nov. 21, 2013, now Pat. No. 9,967,578.

(51) Int. Cl.

| | | |
|---|---|---|
| *H04N 19/18* | (2014.01) | |
| *H04N 19/46* | (2014.01) | |
| *H04N 19/196* | (2014.01) | |
| *H04N 19/124* | (2014.01) | |
| *H04N 19/186* | (2014.01) | |
| *H04N 19/187* | (2014.01) | |
| *H04N 19/33* | (2014.01) | |
| *H04N 19/70* | (2014.01) | |
| *H04N 19/61* | (2014.01) | |

(52) U.S. Cl.
CPC ......... *H04N 19/186* (2014.11); *H04N 19/187* (2014.11); *H04N 19/196* (2014.11); *H04N 19/33* (2014.11); *H04N 19/46* (2014.11); *H04N 19/61* (2014.11); *H04N 19/70* (2014.11)

(56) References Cited

U.S. PATENT DOCUMENTS

| | | | |
|---|---|---|---|
| 2008/0008247 A1 | 1/2008 | Segall | |
| 2009/0148054 A1 | 6/2009 | Kim et al. | |
| 2009/0296808 A1 | 12/2009 | Regunathan et al. | |
| 2010/0309987 A1 | 12/2010 | Concion et al. | |
| 2012/0063515 A1 | 3/2012 | Panchal et al. | |
| 2013/0156099 A1 | 6/2013 | Sasai et al. | |
| 2013/0251032 A1 | 9/2013 | Tanaka | |
| 2014/0044161 A1 | 2/2014 | Chen et al. | |
| 2014/0044179 A1 | 2/2014 | Li et al. | |
| 2014/0050267 A1 | 2/2014 | Sakurai et al. | |
| 2014/0247869 A1 | 9/2014 | Su et al. | |
| 2014/0341277 A1 | 11/2014 | Jeon et al. | |
| 2014/0369415 A1* | 12/2014 | Naing .................. | H04N 19/159 375/240.16 |
| 2015/0229967 A1* | 8/2015 | Lee ........................ | H04N 19/30 375/240.02 |
| 2016/0050436 A1* | 2/2016 | Liu ....................... | H04N 19/597 375/240.24 |

FOREIGN PATENT DOCUMENTS

| | | |
|---|---|---|
| WO | WO 2012/108237 A1 | 8/2012 |
| WO | WO 2012/160890 A1 | 11/2012 |

OTHER PUBLICATIONS

Jan. 2, 2018, European Search Report issued for related EP application No. 17181919.6.

Aug. 30, 2017, CN communication issued for related CN application No. 201380064914.8.

May 27, 2016, Singapore Office Action for related SG Application No. 11201504504Y.

Naccari, et al., "On default scaling list values (WD changes)", Joint Collaborative Team on Video Coding (JCT-VC) of ITU-T SG16 WP3 and ISO/IEC JTC1/SC29/WG11, Oct. 10-19, 2012, pp. 1-2, 11th Meeting: Shanghai, CN.

Zhou, "Signaling of quantization matrices in SPS and PPS", Joint Collaborative Team on Video Coding (JCT-VC) of ITU-T SG16 WP3 and ISO/IEC JTC1/SC29/WG11, Apr. 27-May 7, 2012, pp. 1-4, 9th Meeting: Geneva, CH.

Rusert, "Inter-layer SPS prediction for HEVC extensions", Joint Collaborative Team on Video Coding (JCT-VC) of ITU-T SG16 WP3 and ISO/IEC JTC1/SC29/WG11, Oct. 10-19, 2012, pp. 1-5, 11th Meeting: Shanghai, CN.

Jun. 9, 2016, European Search Report for related EP Application No. 13863956.2.

Feb. 16, 2016, European Search Report for related EP Application No. 13863956.2.

Bao, et al., "CE09: Improved quantization for FGS coding", Joint Video Team (JVT) of ISO/IEC MPEG & ITU-T VCEG (ISO/IEC JTC1/SG29/WG11 and ITU-T SG16 Q.6), Jul. 24-29, 2005, pp. 1-8, 16th Meeting: Poznan, Poland.

Liu, et al., "Support of ChromaQPOffset in HEVC", Joint Collaborative Team on Video Coding (JCT-VC) of ITU-T SG16 WP3 and ISO/IEC JTC1/SC29/WG11, Nov. 21-30, 2011, pp. 1-7, 7th Meeting: Geneva, CH.

Bross, et al., "High Efficiency Video Coding (HEVC) text specification draft 9", Joint Collaborative Team on Video Coding (JCT-VC) of ITU-T SG16 WP3 and ISO/IEC JTC1/SC29/WG11, Oct. 10-19, 2012, pp. i-258, 11th Meeting: Shanghai, CN.

Xu, et al., "Chroma QP extension and signaling enhancement", Joint Collaborative Team on Video Coding (JCT-VC) of ITU-T SG16 WP3 and ISO/IEC JTC1/SC29/WG11, Apr. 27-May 7, 2012, pp. 1-11, 9th Meeting: Geneva, CH.

Benjamin Bross, et al., High Efficiency Video Coding (HEVC) text specification draft 9, Joint Collaborative Team on Video Coding (JCT-VC) of ITU-T SG16 WP3 and ISO/IEC JTC1/SC29/WG11, Oct. 10-19, 2012, pp. 1-129, 11th Meeting: Shanghai, CN.

Jill Boyce, et al., NAL unit header and parameter set designs for HEVC extensions, Joint Collaborative Team on Video Coding (JCT-VC) of ITU-T SG16 WP3 and ISO/IEC JTC1/SC29/WG11, Oct. 10-19, 2012, pp. 1-8, 11th Meeting: Shanghai, CN.

Jill Boyce, et al., TE6: Inter-layer syntax prediction from AVC base layer, Joint Collaborative Team on Video Coding (JCT-VC) of ITU-T SG16 WP3 and ISO/IEC JTC1/SC29/WG11, Oct. 10-19, 2012, pp. 13, 11th Meeting: Shanghai, CN.

Yunfei Wang(Tsinghua), et al., CE4: Subtest 2.4 Layered quantization matrices representation and compression, Joint Collaborative Team on Video Coding (JCT-VC) of ITU-T SG16 WP3 and ISO/IEC JTC1/SC29/WG11, Feb. 1-10, 2012, pp. 1-13, 8th Meeting: San Jose, CA.

Edouard Francois, et al., On the derivation of chroma QPs, Joint Collaborative Team on Video Coding (JCT-VC) of ITU-T SG16 WP3 and ISO/IEC JTC1/SC29/WG11, Oct. 10-19, 2012, pp. 1-12, 11th Meeting: Shanghai, CN.

Junichi Tanaka, et al., Enhancement of quantization matrix coding for HEVC, Joint Collaborative Team on Video Coding (JCT-VC) of ITU-T SG16 WP3 and ISO/IEC JTC1/SC29/WG11, Jul. 14-22, 2011, pp. 1-11, 6th Meeting: Torino, IT.

Aug. 6, 2019, Japanese Office Action issued for related JP Application No. 2018-158229.

Dec. 10, 2019, European Communication issued for related EP Application No. 17181919.6.

\* cited by examiner

FIG.2
Original Image
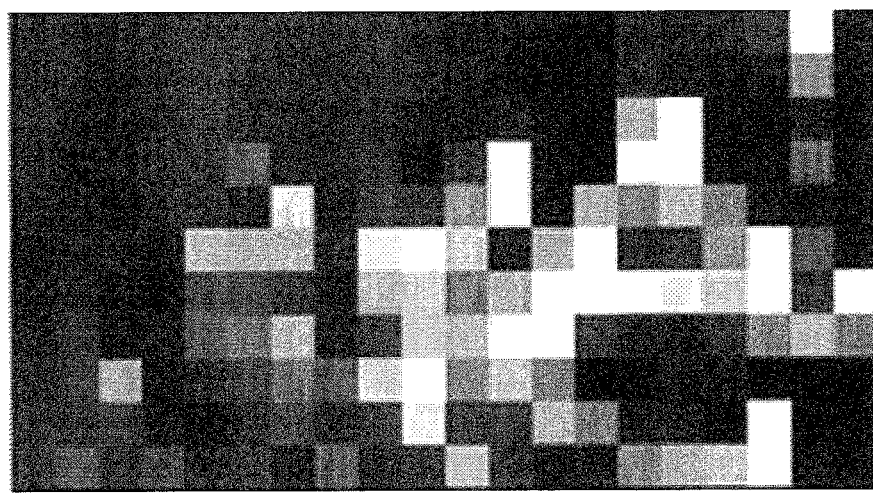
Activity (64 x 64)
Activity (16 x 16)

: TARGET OF SL PARAMETER    ⇩ : REUSE IN LAYERS

FIG.9C
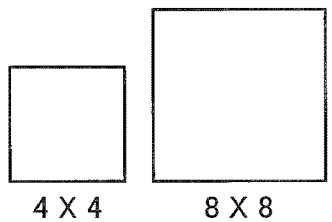
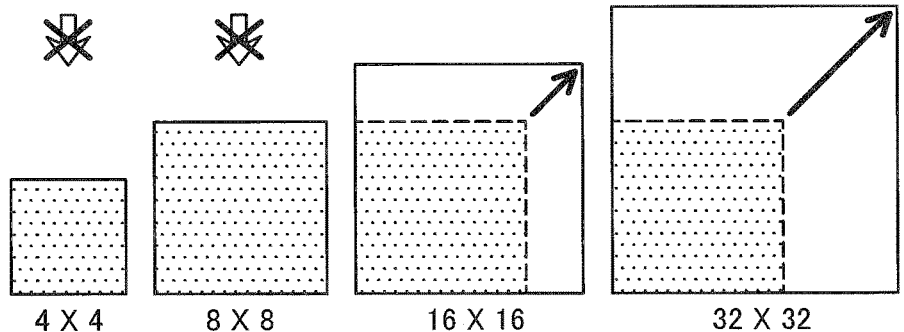
FIG.9D
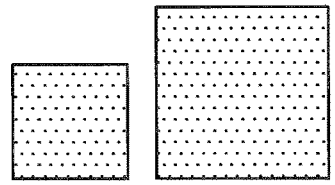
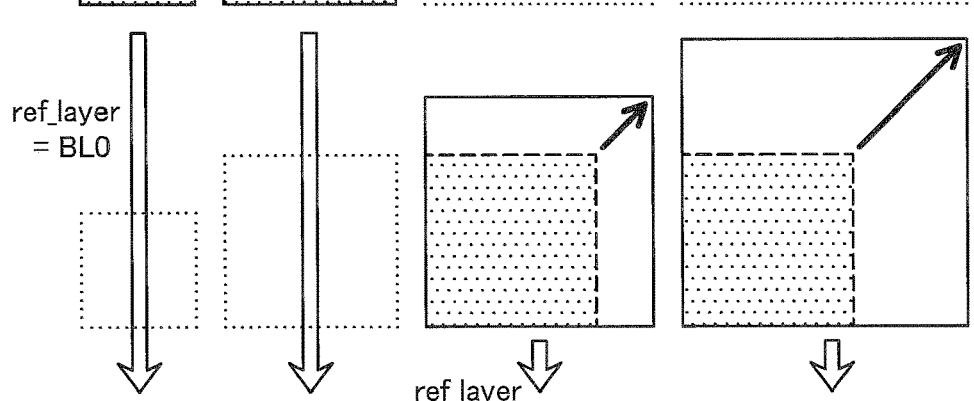
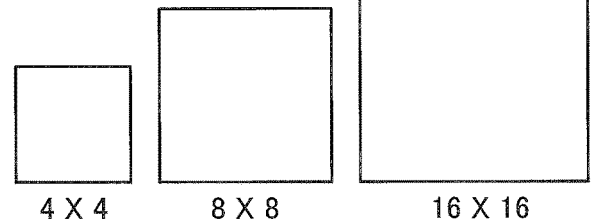

FIG.16A

```
01 | pic_parameter_set_rbsp( ) {
02 |   pic_parameter_set_id
03 |   seq_parameter_set_id
04 |   dependent_slice_segments_enabled_flag
05 |   sign_data_hiding_flag
06 |   cabac_init_present_flag
07 |   num_ref_idx_l0_default_active_minus1
08 |   num_ref_idx_l1_default_active_minus1
09 |   pic_init_qp_minus26
10 |   constrained_intra_pred_flag
11 |   transform_skip_enabled_flag
12 |   cu_qp_delta_enabled_flag
13 |   if ( cu_qp_delta_enabled_flag )
14 |     diff_cu_qp_delta_depth
15 |   BL_chroma_qp_offset_flag            <-- QP PARAMETER REUSE FLAG
16 |   if( !BL_chroma_qp_offset_flag )
17 |   {
18 |     pic_cb_qp_offset                  <-- QP PARAMETER (EL)
19 |     pic_cr_qp_offset                  <-
20 |   }
21 |   pic_slice_chroma_qp_offsets_present_flag
22 |   weighted_pred_flag
23 |   weighted_bipred_flag
24 |   output_flag_present_flag
25 |   transquant_bypass_enable_flag
26 |   tiles_enabled_flag
27 |   entropy_coding_sync_enabled_flag
28 |   if( tiles_enabled_flag ) {
29 |     num_tile_columns_minus1
30 |     num_tile_rows_minus1
31 |     uniform_spacing_flag
32 |     if( !uniform_spacing_flag ) {
33 |       for( i = 0; i < num_tile_columns_minus1; i++ )
34 |         column_width_minus1[ i ]
35 |       for( i = 0; i < num_tile_rows_minus1; i++ )
36 |         row_height_minus1[ i ]
37 |     }
38 |     loop_filter_across_tiles_enabled_flag
39 |   }
40 |   loop_filter_across_slices_enabled_flag
```

FIG.16B

```
41 | deblocking_filter_control_present_flag
42 | if( deblocking_filter_control_present_flag ) {
43 |   deblocking_filter_override_enabled_flag
44 |   pic_disable_deblocking_filter_flag
45 |   if( !pic_disable_deblocking_filter_flag ) {
46 |     beta_offset_div2
47 |     tc_offset_div2
48 |   }
49 | }
50 | pic_scaling_list_data_present_flag
51 | if( pic_scaling_list_data_present_flag )
52 |   scaling_list_data( )              <-- SL PARAMETER (EL)
53 | lists_modification_present_flag
54 | log2_parallel_merge_level_minus2
55 | num_extra_slice_header_bits
56 | slice_segment_header_extension_present_flag
57 | pps_extension_flag
58 | if( pps_extension_flag )
59 |   while( more_rbsp_data( ) )
60 |     pps_extension_data_flag
61 | rbsp_trailing_bits( )
62 | }
```

FIG.16C

```
01 | scaling_list_data( ) {
02 |   BL_scaling_list_flag            <--- QUANTIZATION MATRIX REUSE FLAG
03 |   for( sizeId = 0; sizeId < 4; sizeId++ )
04 |     for( matrixId = 0; matrixId < ( sizeId = = 3 ) ? 2 : 6; matrixId++ ) {
05 |       if( !( BL_scaling_list_flag == 1 &&
06 |          (avc_base_layer_flag == 0) ||
07 |          (avc_base_layer_flag== 1 && (sizeId==0 || sizeId==1) ) ) {
08 |         scaling_list_pred_mode_flag[ sizeId ][ matrixId ]
09 |         if( !scaling_list_pred_mode_flag[ sizeId ][ matrixId ] )
10 |           scaling_list_pred_matrix_id_delta[ sizeId ][ matrixId ]
11 |         else {
12 |           nextCoef = 8
13 |           coefNum = Min( 64, ( 1 << ( 4 + ( sizeId << 1) ) ) )
14 |           if( sizeId > 1 ) {
15 |             scaling_list_dc_coef_minus8[ sizeId - 2 ][ matrixId ]
16 |             nextCoef =
17 |                scaling_list_dc_coef_minus8[ sizeId - 2 ][ matrixId ] + 8
18 |           }
19 |           for( i = 0; i < coefNum; i++) {
20 |             scaling_list_delta_coef
21 |             nextCoef = ( nextCoef + scaling_list_delta_coef + 256 ) % 256
22 |             ScalingList[ sizeId ][ matrixId ][ i ] = nextCoef
23 |           }
24 |         }
25 |       }
26 |     }
27 | }
```

FIG.16D

```
01 | sps_extension( ) {
02 |    ...
03 |    copy_scaling_list_from_ref_layer_flag
04 |    if(copy_scaling_list_from_ref_layer_flag)
05 |            scaling_list_ref_layer
06 |    ...
07 | }

01 | pps_extension( ) {
02 |    ...
03 |    copy_scaling_list_from_ref_layer_flag
04 |    if(copy_scaling_list_from_ref_layer_flag)
05 |            scaling_list_ref_layer
06 |    ...
07 | }
```

FIG.16E

```
01 | sps_extension( ) {
02 |    ...
03 |    scaling_list_extension()
04 |    ...
05 | }

01 | pps_extension( ) {
02 |    ...
03 |    scaling_list_extension()
04 |    ...
05 | }

01 | scaling_list_extension( ) {
02 |    for(sizeId = 0; sizeId < 4; sizeId++)
03 |            for(matrixId = 0; matrixId < ( ( sizeId  = =  3 ) ? 2 : 6); matrixId++) {
04 |                    copy_scaling_list_from_ref_layer_flag[sizeId][matrixId]
05 |                    if(copy_scaling_list_from_ref_layer_flag[sizeId][matrixId])
06 |                            scaling_list_ref_layer[sizeId][matrixId]
07 |            }
08 |    }
09 | }
```

X : Inter-layer prediction is prohibited

X : Inter-layer prediction is prohibited

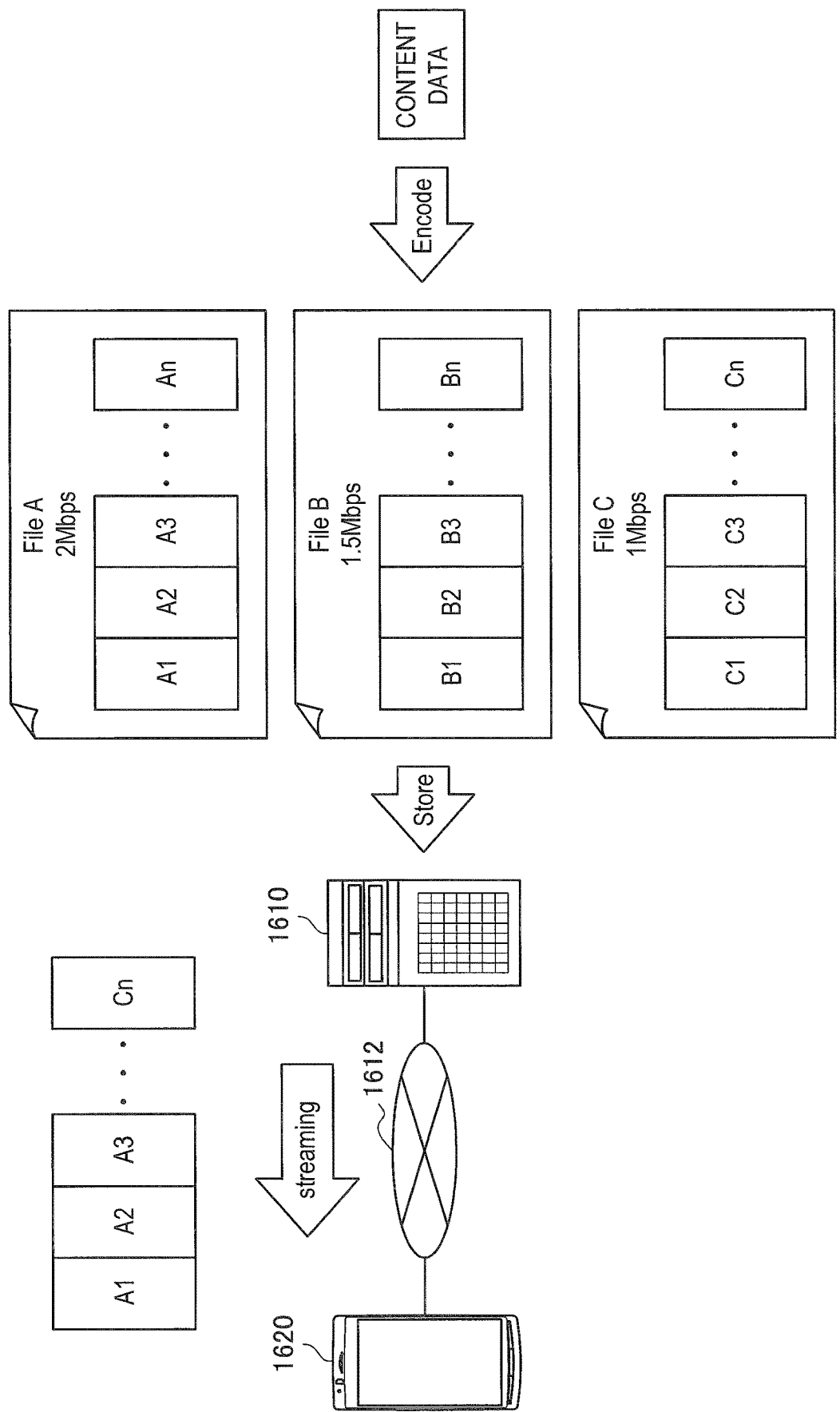

FIG.33

```
01 | <?xml version="1.0"?>
02 | <MPD
03 | xmlns:xsi="http://www.w3.org/2001/XMLSchema-instance"
04 | xmlns="urn:mpeg:DASH:schema:MPD:2011"
05 | xsi:schemaLocation="urn:mpeg:DASH:schema:MPD:2011 DASH-MPD.xsd"
06 | type="static"
07 | mediaPresentationDuration="PT3256S"
08 | minBufferTime="PT1.2S"
09 | profiles="urn:mpeg:dash:profile:isoff-on-demand:2011">
10 |
11 | <BaseURL>http://cdn1.example.com/</BaseURL>
12 | <BaseURL>http://cdn2.example.com/</BaseURL>
13 |
14 | <Period>
15 | <!-- English Audio -->
16 | <AdaptationSet mimeType="audio/mp4" codecs=" mp4a.40.2 " lang="en"
17 |           subsegmentAlignment="true" subsegmentStartsWithSAP="1">
18 | <ContentProtection schemeIdUri="urn:uuid:706D6953-656C-5244-4D48-656164657221"/>
19 | <Representation id="1" bandwidth="64000">
20 | <BaseURL>7657412348.mp4</BaseURL>
21 | </Representation>
22 | <Representation id="2" bandwidth="32000">
23 | <BaseURL>3463646346.mp4</BaseURL>
24 | </Representation>
25 | </AdaptationSet>
26 | <!-- Video -->
27 | <AdaptationSet mimeType="video/mp4" codecs="avc1.4d0228"
28 |           subsegmentAlignment="true" subsegmentStartsWithSAP="2">
29 | <ContentProtection schemeIdUri="urn:uuid:706D6953-656C-5244-4D48-656164657221"/>
30 | <Representation id="6" bandwidth="256000" width="320" height="240">
31 | <BaseURL>8563456473.mp4</BaseURL>
32 | </Representation>
33 | <Representation id="7" bandwidth="512000" width="320" height="240">
34 | <BaseURL>56363634.mp4</BaseURL>
35 | </Representation>
36 | <Representation id="8" bandwidth="1024000" width="640" height="480">
37 | <BaseURL>562465736.mp4</BaseURL>
38 | </Representation>
39 | <Representation id="9" bandwidth="1384000" width="640" height="480">
40 | <BaseURL>41325645.mp4</BaseURL>
41 | </Representation>
42 | <Representation id="A" bandwidth="1536000" width="1280" height="720">
43 | <BaseURL>89045625.mp4</BaseURL>
44 | </Representation>
45 | <Representation id="B" bandwidth="2048000" width="1280" height="720">
46 | <BaseURL>23536745734.mp4</BaseURL>
47 | </Representation>
48 | </AdaptationSet>
49 | </Period>
50 | </MPD>
```

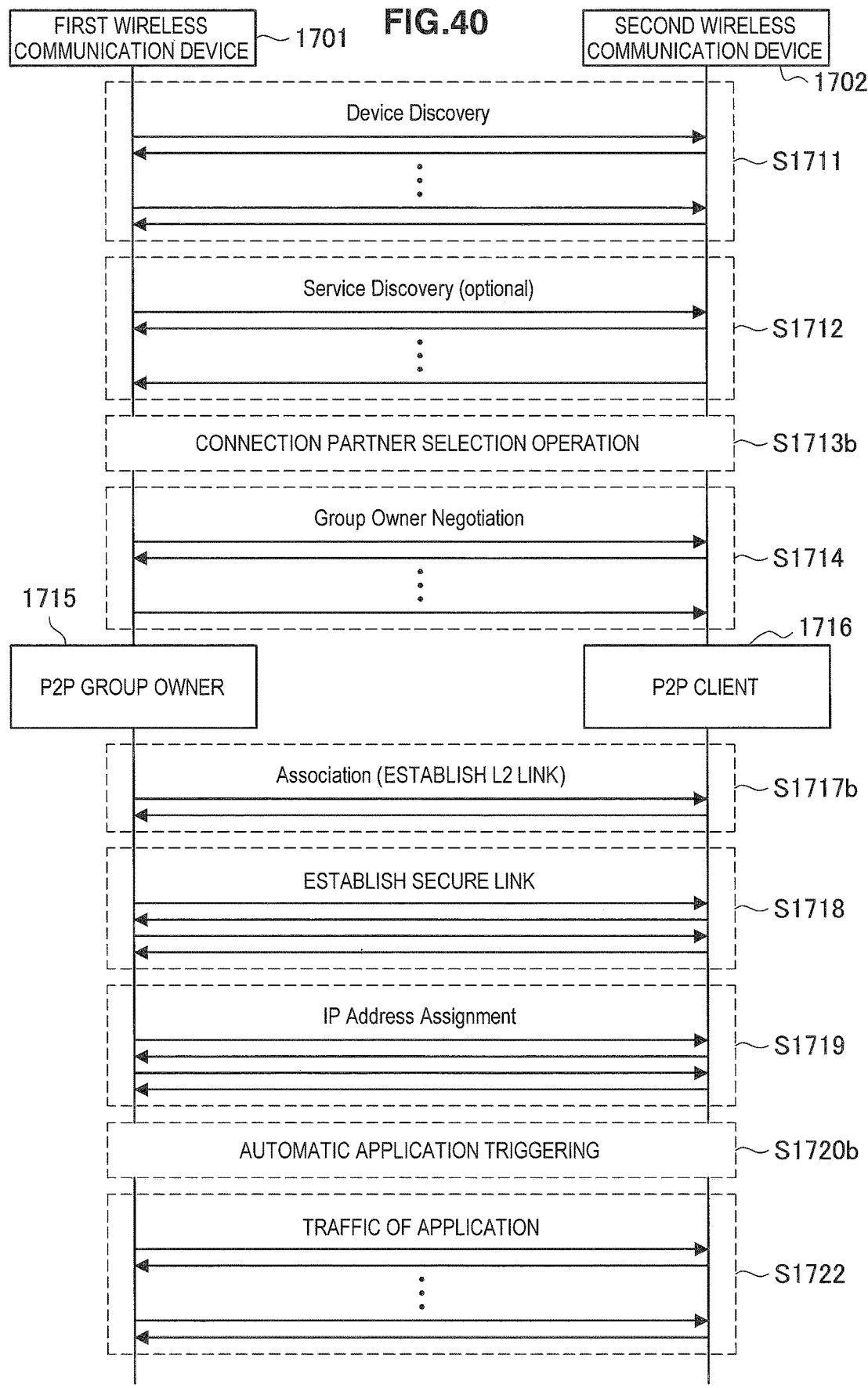

IMAGE PROCESSING DEVICE AND IMAGE PROCESSING METHOD

CROSS REFERENCE TO PRIOR APPLICATION

This application is a continuation of U.S. patent application Ser. No. 15/892,972 (filed on Feb. 9, 2018), which is a continuation of U.S. patent application Ser. No. 14/441,671 (filed on May 8, 2015 and issued as U.S. Pat. No. 9,967,578 on May 8, 2018), which is a National Stage Patent Application of PCT International Patent Application No. PCT/JP2013/081406 (filed on Nov. 21, 2013) under 35 U.S.C. § 371, which claims priority to Japanese Patent Application Nos. 2013-144930 (filed on Jul. 10, 2013) and 2012-275775 (filed on Dec. 18, 2012), which are all hereby incorporated by reference in their entirety.

TECHNICAL FIELD

The present disclosure relates to an image processing device and an image processing method.

BACKGROUND ART

The standardization of an image coding scheme called High Efficiency Video Coding (HEVC) by Joint Collaboration Team-Video Coding (JCTVC), which is a joint standardization organization of ITU-T and ISO/IEC, is currently under way for the purpose of improving encoding efficiency more than H.264/AVC (see, for example, Non-Patent Literature 1 below).

HEVC provides not only coding of a single layer but also scalable video coding, as in known image coding schemes such as MPEG2 and Advanced Video Coding (AVC) (for example, see Non-Patent Literature 2 below). An HEVC scalable video coding technology is also called Scalable HEVC (SHVC). In SHVC, while an enhancement layer is encoded in the HEVC scheme, a base layer may be encoded in the HEVC scheme or encoded in an image coding scheme other than the HEVC scheme (for example, the AVC scheme).

Generally, scalable video coding refers to a technology for hierarchically encoding a layer transmitting a rough image signal and a layer transmitting a fine image signal. Typical attributes hierarchized in the scalable video coding mainly include the following three:

Space scalability: Spatial resolutions or image sizes are hierarchized,
Time scalability: Frame rates are hierarchized.
Signal-to-noise ratio (SNR) scalability: SN ratios are hierarchized.

Further, though not yet adopted in the standard, the bit depth scalability and chroma format scalability are also discussed.

In the scalable video coding, coding efficiency can be improved by encoding a parameter, which can be re-used in layers, in only one layer (for example, see Non-Patent Literature 3).

CITATION LIST

Non-Patent Literature

Non-Patent Literature 1: "High Efficiency Video Coding (HEVC) text specification draft 9" by Benjamin Bross, Woo-Jin Han, Jens-Rainer Ohm, Gary J. Sullivan, Thomas Wiegand (JCTVC-K1003_v9, Oct. 10 to 19, 2012)
Non-Patent Literature 2: "NAL unit header and parameter set designs for HEVC extensions" by Jill Boyce, Ye-Kui Wang (JCTVC-K1007, Oct. 10 to 19, 2012)
Non-Patent Literature 3: "TE6: Inter-layer syntax prediction from AVC base layer" by Jill Boyce, Kawamura Kei, Haricharan Lakshman (JCTVC-K1106v2, Oct. 10 to 19, 2012)

SUMMARY OF INVENTION

Technical Problem

According to techniques of scalable video coding proposed so far, however, many parameters relating to quantization of transform coefficient data after an orthogonal transform are not reused in layers. In order to optimize coding efficiency, it is desirable to cause parameters relating to quantization to be reused in layers if possible. This point applies not only to scalable video coding but also to a general multi-layer codec that supports inter-layer prediction. Another example of a multi-layer codec is a multi-view codec.

Solution to Problem

According to an embodiment of the present disclosure, there is provided an image processing device including a control section configured to set, based on a first quantization parameter offset set for a chroma component of a first layer, a second quantization parameter offset for a chroma component of a second layer decoded with reference to the first layer, and an inverse quantization section configured to inversely quantize transform coefficient data of the chroma component of the second layer using a quantization parameter computed using the second quantization parameter offset set by the control section.

The image processing device mentioned above may be typically realized as an image decoding device that decodes an image.

According to another embodiment of the present disclosure, there is provided an image processing method including setting, based on a first quantization parameter offset set for a chroma component of a first layer, a second quantization parameter offset for a chroma component of a second layer decoded with reference to the first layer, and inversely quantizing transform coefficient data of the chroma component of the second layer using a quantization parameter computed using the set second quantization parameter offset.

According to another embodiment of the present disclosure, there is provided an image processing device including a quantization section configured to quantize transform coefficient data of a chroma component of a second layer encoded with reference to a first layer using a given quantization parameter, and an encoding section configured to encode a second quantization parameter offset of a chroma component of the second layer computed based on a first quantization parameter offset set for a chroma component of the first layer and the given quantization parameter.

The image processing device mentioned above may be typically realized as an image encoding device that encodes an image.

According to another embodiment of the present disclosure, there is provided an image processing method including quantizing transform coefficient data of a chroma component of a second layer encoded with reference to a first layer using a given quantization parameter, and encoding a second quantization parameter offset of the chroma component of the second layer computed based on a first quantization parameter offset set for a chroma component of the first layer and the given quantization parameter.

Advantageous Effects of Invention

According to the technology relating to the present disclosure, in a multi-layer codec, coding efficiency can be enhanced by reusing a parameter relating to quantization in layers.

BRIEF DESCRIPTION OF DRAWINGS

FIG. 2 is an illustrative diagram for describing granularity of rate control.

FIG. 9C is a third illustrative diagram for describing reuse of quantization matrixes.

FIG. 9D is a fourth illustrative diagram for describing reuse of quantization matrixes.

FIG. 16A is a first illustrative diagram for describing an example of syntax of an enhancement layer that can be employed in an embodiment.

FIG. 16B is a second illustrative diagram for describing an example of syntax of the enhancement layer that can be employed in an embodiment.

FIG. 16C is a third illustrative diagram for describing an example of syntax of the enhancement layer that can be employed in an embodiment.

FIG. 16D is an illustrative diagram for describing a first modified example of syntax of the enhancement layer.

FIG. 16E is an illustrative diagram for describing a second modified example of syntax of the enhancement layer.

FIG. 32 is an illustrative diagram showing an example of the flow of data in the content reproduction system.

FIG. 33 is an illustrative diagram showing a specific example of an MPD.

FIG. 40 is a sequence diagram showing an extended operation sequence.

DESCRIPTION OF EMBODIMENTS

Figure 1:
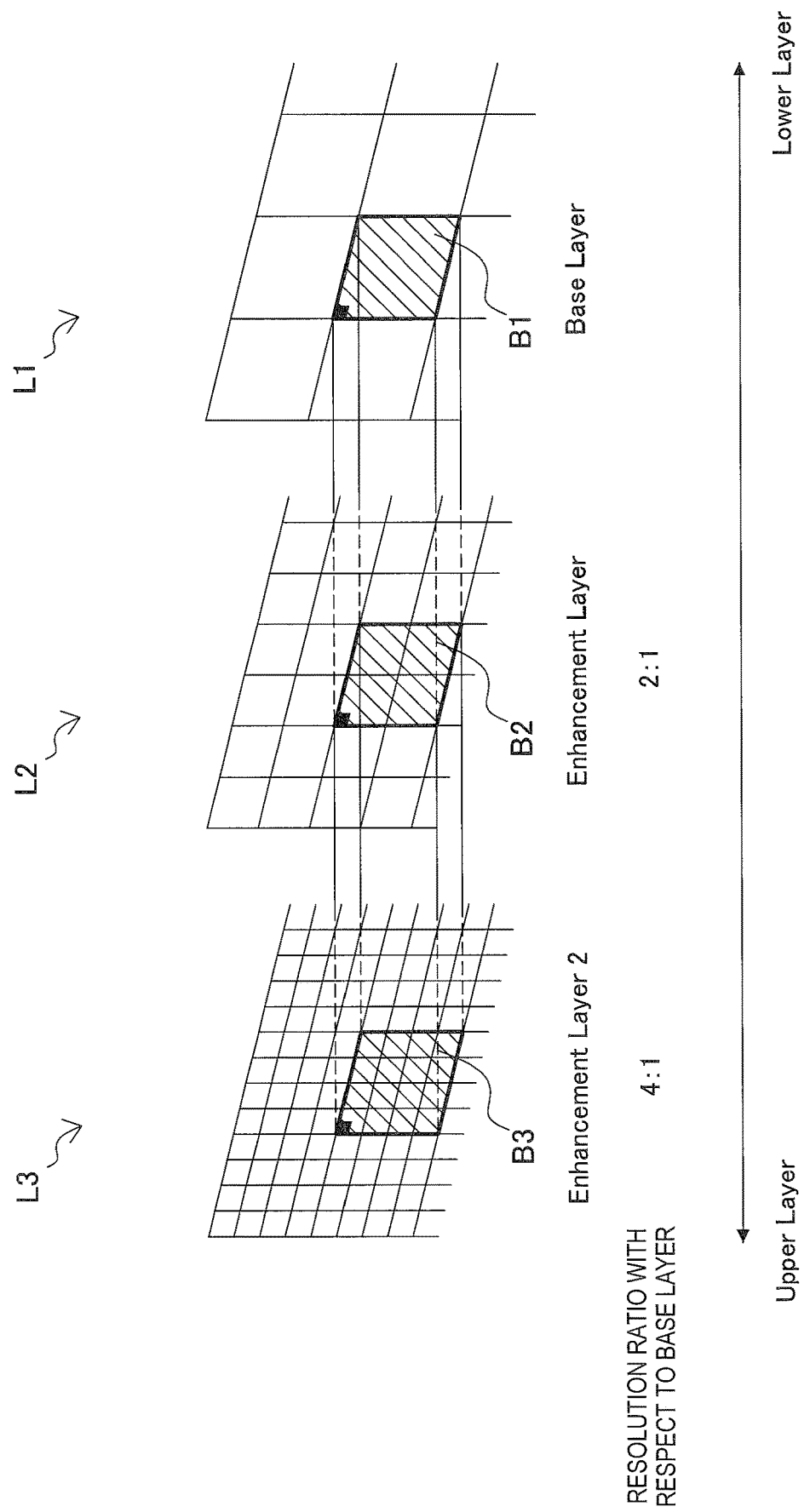
FIG. 1 is an illustrative diagram for describing scalable video coding.

Hereinafter, preferred embodiments of the present disclosure will be described in detail with reference to the appended drawings. Note that, in this specification and the drawings, elements that have substantially the same function and structure are denoted with the same reference signs, and repeated explanation is omitted.

In addition, description will be provided in the following order.

1. Overview
   1-1. Scalable video coding
   1-2. General rate control
   1-3. Quantization parameter of a chroma component
   1-4. Quantization matrix
   1-5. Basic configuration example of an encoder
   1-6. Basic configuration example of a decoder
2. Configuration example of an EL encoding section according to an embodiment
   2-1. Overall configuration
   2-2. Detailed configuration of a quantization control section
3. Flow of a process for encoding according to an embodiment
   3-1. Schematic flow
   3-2. Process relating to quantization
4. Configuration example of an EL decoding section according to an embodiment
   4-1. Overall configuration
   4-2. Detailed configuration of an inverse quantization control section
5. Flow of a process of decoding according to an embodiment
   5-1, Schematic flow
   5-2. Process relating to inverse quantization
   5-3. Example of syntax
6. Example of a combination of codecs
7. Application example
   7-1. Application to various products
   7-2. Various uses of scalable video coding
   7-3. Application to other codec
   7-4. Various mounting levels
   7-5. System that uses MPEG-DASH
   7-6. System that uses a P2P mode of Wi-Fi
8. Conclusion

1. Overview

1-1. Scalable Video Coding

In scalable video coding, a plurality of layers, each containing a series of images, are encoded. A base layer is a layer encoded first to represent a roughest image. An encoded stream of the base layer may be independently decoded without decoding encoded streams of other layers. Layers other than the base layer are layers called enhancement layers representing finer images. Encoded streams of the enhancement layers are encoded by using information contained in the encoded stream of the base layer. Therefore, to reproduce an image of an enhancement layer, encoded streams of both the base layer and the enhancement layer are decoded. The number of layers handled in the scalable video coding may be any number equal to or greater than 2. When three layers or more are encoded, the lowest layer is the base layer and the remaining plural layers are enhancement layers. For an encoded stream of a higher enhancement layer, information contained in encoded streams of a lower enhancement layer and the base layer may be used for encoding and decoding.

FIG. 1 shows three layers L1, L2, and L3 subjected to scalable video coding. The layer L1 is a base layer and the layers L2 and L3 are enhancement layers. Note that, among various kinds of scalabilities, space scalability is taken as an example herein. A space resolution ratio of the layer L2 to the layer L1 is 2:1. A space resolution ratio of the layer L3 to the layer L1 is 4:1. The resolution ratios herein are merely examples, and for example, a resolution ratio of a non-integer such as 1.5:1 may be used. A block B1 of the layer L1 is a processing unit of an encoding process in a picture of the base layer. A block B2 of the layer L2 is a processing unit of an encoding process in a picture of the enhancement layer to which a common scene to the block B1 is projected. The block B2 corresponds to the block B1 of the layer L1. A block B3 of the layer L3 is a processing unit of an encoding process in a picture of the enhancement layer higher than the layers to which the common scene to the blocks B1 and B2 is projected. The block B3 corresponds to the block B1 of the layer L1 and the block B2 of the layer L2.

In such a layer structure, layers in which a common scene is projected have a similar image frequency characteristic. For example, when an image of the block B1 of the layer L1 is flat and a high frequency component thereof is small, there is a high possibility of an image of the block B2 of the layer L2 also having a small high frequency component. The same applies to the block B2 of the layer L2 and the block B3 of the layer L3.

1-3. General Rate Control

A frequency characteristic of an image affects the number of bits of transform coefficient data that is generated as a result of an orthogonal transform. In order to maintain a bit rate of an encoded stream, transform coefficient data is generally quantized using a greater quantization step if the number of bits of the transform coefficient data is great. An example of a rate control scheme for realizing an expected bit rate is expressed in an MPEG2 test model. In the MPEG2 test model, an allocated code amount of each picture is first decided based on an amount of bits allocated to a GOP, a picture type of each picture in the GOP, and complexity (Global Complexity Measure). In addition, a quantization parameter of each macroblock in each picture (quantization scale code) is computed based on an activity computed for each macroblock and the allocated code amount of the picture. The activity referred to herein is a type of index expressing complexity of an image. Note that details of the rate control scheme in the MPEG2 test model are disclosed at the following web page.

Reference URL http://www.mpeg.org/MPEG/MSSG/tm5/Ch10/Ch10.html

In the MPEG2 scheme, however, the above-described quantization scale code is decided for each macroblock having the size of 16×16 pixels. The maximum size of a largest coding unit (LCU) corresponding to a macroblock in the HEVC scheme is 64×64 pixels. As granularity of rate control becomes excessively large, however, local regions in which a quantization step is improper for complexity of an image can be generated. For example, in FIG. 2, the result obtained by computing a normalization activity of the image shown in the upper part with granularity of 64×64 pixels is shown in the middle part, and the result obtained by computing the normalization activity with granularity of 16×16 pixels is shown in the lower part. Herein, higher activities are shown in white. As understood from FIG. 2, if rate control is performed with granularity of 64×64 pixels, many regions in which, for example, quantization is performed only using a large quantization step even though complexity is low, or quantization is performed using a small quantization step even though complexity is high can be generated.

In order to appropriately execute rate control while avoiding such impropriety resulting from the above-described block sizes, the HEVC scheme employs a technique of controlling quantization steps in units of blocks that are smaller than an LCU. To be more specific, referring to syntax of a picture parameter set (PPS) described in Non-Patent Literature 1 described above, when cu_qp_delta_enabled_flag is true, the size of a block that is the unit for designating a quantization step is designated based on size information of diff_cu_qp_delta_depth. In reality, since a logarithm of a quantization step is in a proportional relation with a signal-to-noise (SN) ratio, a quantization parameter is designated for each block, rather than direct designation of a quantization step. If a quantization step corresponding to a quantization parameter qp is set to S(qp), a relation between a quantization parameter qp and a quantization step S(qp) is defined so that the quantization step S(qp) satisfies the following expression.

[Math. 1]

$$\frac{S(qp+a)}{S(qp)} = b \quad (1)$$

Figure 3:
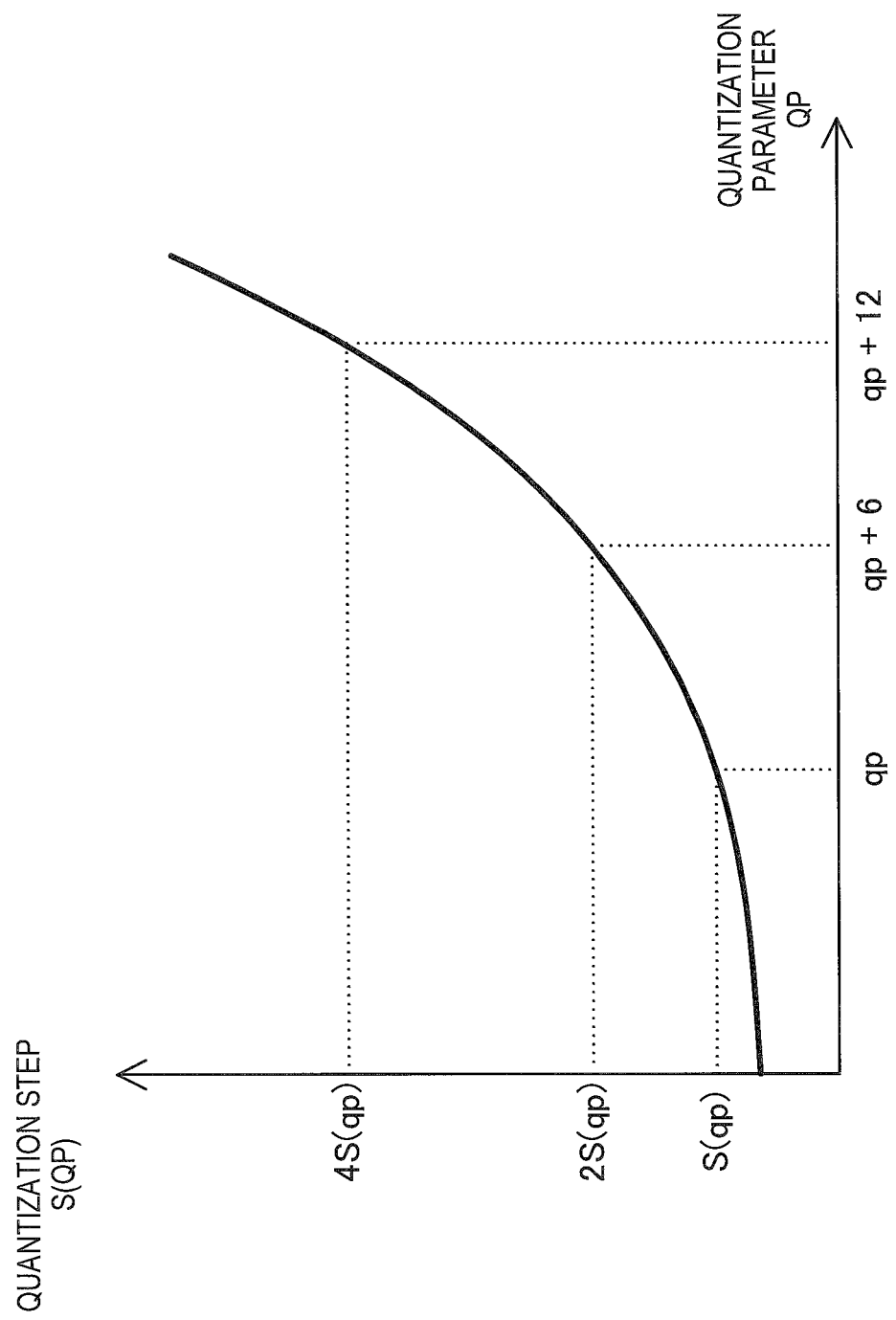
FIG. 3 is an illustrative diagram showing an example of a relation between quantization parameters and quantization steps.

In the HEVC scheme, values of a variable a=6 and a variable b=2 are adopted so that ranges of a quantization parameter and a quantization step are optimized. A relation between quantization parameters qp and quantization steps S(qp) of this case is illustrated in FIG. 3. As illustrated in FIG. 3, the value of a quantization step S(qp) doubles each time the value of a quantization parameter qp increases by six.

Figure 4:
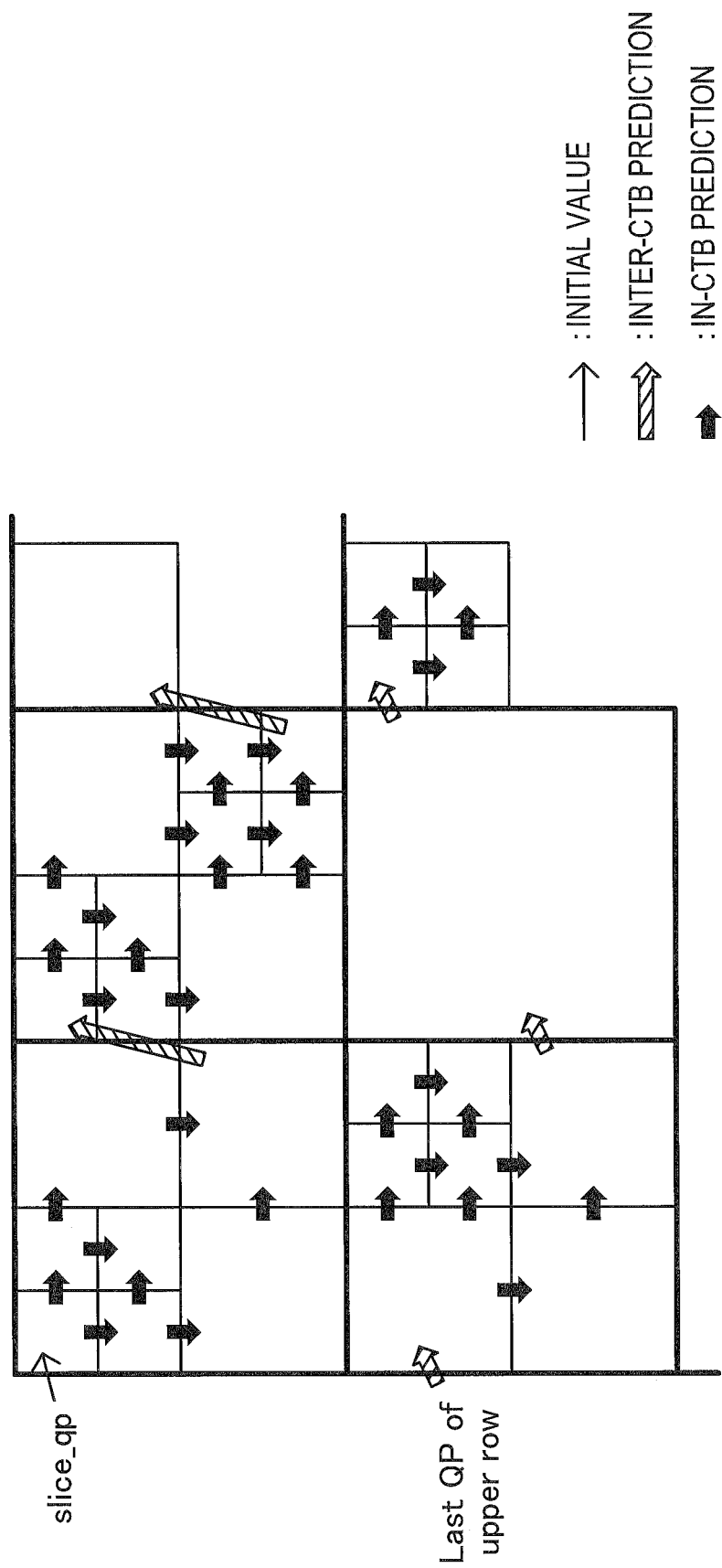
FIG. 4 is an illustrative diagram showing an example of a referential relation of blocks in in-CTB prediction and inter-CTB prediction.

A quantization parameter is actually designated using a combination of a plurality of quantization relevant parameters. Referring to the syntax described in Non-Patent Literature 1 described above, quantization parameters are initialized using parameters of pic_init_qp_minus26 in a PPS and slice_qp_delta in a slice header (SliceQP$_Y$=26+pic_init_qp_minus26+slice_qp_delta). Quantization parameters of individual coding units (CU) are predicted from the quantization parameter of one of an upper adjacent CU and a left adjacent CU or the quantization parameters of both of them (in-CTB prediction), or predicted from a quantization parameter of the previous CU in a decoding order (inter-CTB prediction). In FIG. 4, a referential relation in prediction of quantization parameters in coding tree blocks (CTBs) and between CTBs is exemplified. In in-CTB prediction in which both of an upper adjacent CU and a left adjacent CU can be referred to, a predicted value of a quantization parameter is equal to the average value ((TopQP+LeftQP+1)>>1) of the quantization parameters of the upper adjacent CU and the left adjacent CU (TopQP and LeftQP). In addition, by adding residuals indicated by cu_qp_delta_abs and cu_qp_delta_sign in a transform unit (TU) to the predicted value, the values of individual quantization parameters are computed.

1-3. Quantization Parameter of a Chroma Component

The quantization parameter computation technique described in the above section is mainly a technique regarding a quantization parameter of a luma component. With regard to a chroma component, by adding an offset to a quantization parameter of a luma component, a quantization parameter that is adjusted for the chroma component can be used. Referring to the syntax described in Non-Patent Literature 1 described above, an offset of a quantization parameter of a chroma component is designated based on pic_cb_qp_offset and pic_cr_qp_offset in a PPS and slice_cb_qp_offset and slice_cr_qp_offset in a slice header. The sum of pic_cb_qp_offset and slice_cb_qp_offset is the offset of the quantization parameter of a Cb component, and the sum of pic_cr_qp_offset and slice_cr_qp_offset is the offset of the quantization parameter of a Cr component.

Note that a specific expression of a relation between a quantization parameter of a luma component and a quantization parameter of a chroma component in the HEVC scheme is described in Non-Patent Literature 1 described above. As a difference from the AVC scheme, when offsets of a Cb component and a Cr component are equal to each other in the AVC scheme, only one chroma_qp_index_offset is encoded in a PPS. On the other hand, in the HEVC scheme, respective offsets of a Cb component and a Cr component are encoded in a PPS and a slice header as described above. Thus, a quantization parameter of a chroma component can be flexibly adjusted in units of slices in the HEVC scheme. In addition, while the upper value of a quantization parameter of a chroma component is 39 in the AVC scheme, the upper value of a quantization parameter of a chroma component is 51, which is the same as a luma component in the HEVC scheme. Thus, in the HEVC scheme, overflow of a hypothetical reference decoder (HRD) buffer is easily avoided by reducing an information amount of transform coefficient data of a chroma component.

1-4. Quantization Matrix

A quantization matrix (which is also referred to as a scaling list) is a technology introduced to quantize high frequency components more coarsely than low frequency components using characteristics of vision of human beings, who have difficulty perceiving high frequency components of an image. When a quantization matrix is used, a quantization step scaled with values of respective elements of the quantization matrix is used to perform quantization and inverse quantization on transform coefficient data, instead of the quantization step itself corresponding to the quantization parameter described in the above section. In the AVC scheme, quantization matrixes each having the sizes of 4×4 pixels and 8×8 pixels can be used. On the other hand, in the HEVC scheme, quantization matrixes each having the sizes of 4×4 pixels, 8×8 pixels, 16×16 pixels, and 32×32 pixels can be used. In the HEVC scheme, however, quantization matrixes of 16×16 pixels and 32×32 pixels are each encoded in the size of 8×8 pixels, excluding DC components in order to reduce a code amount, and are up-sampled by zero-order hold from the size of 8×8 pixels upon use. The DC components are separately encoded.

As described above, various parameters relating to quantization are encoded in the current specification of the HEVC scheme. Here, frequency characteristics of an image are similar in layers as described above. In addition, such a frequency characteristic of an image affects the number of bits of transform coefficient data, and the number of bits is controlled by quantization. Thus, by controlling quantization of a base layer and an enhancement layer in scalable video coding using common parameters to layers, appropriate rate control is expected to be able to be realized and a code amount of a parameter relating to quantization to be reduced. Thus, embodiments of an image processing device that enables a parameter relating to quantization to be reused in layers will be described in detail in the following sections.

1-5. Basic Configuration Example of an Encoder

Figure 5:
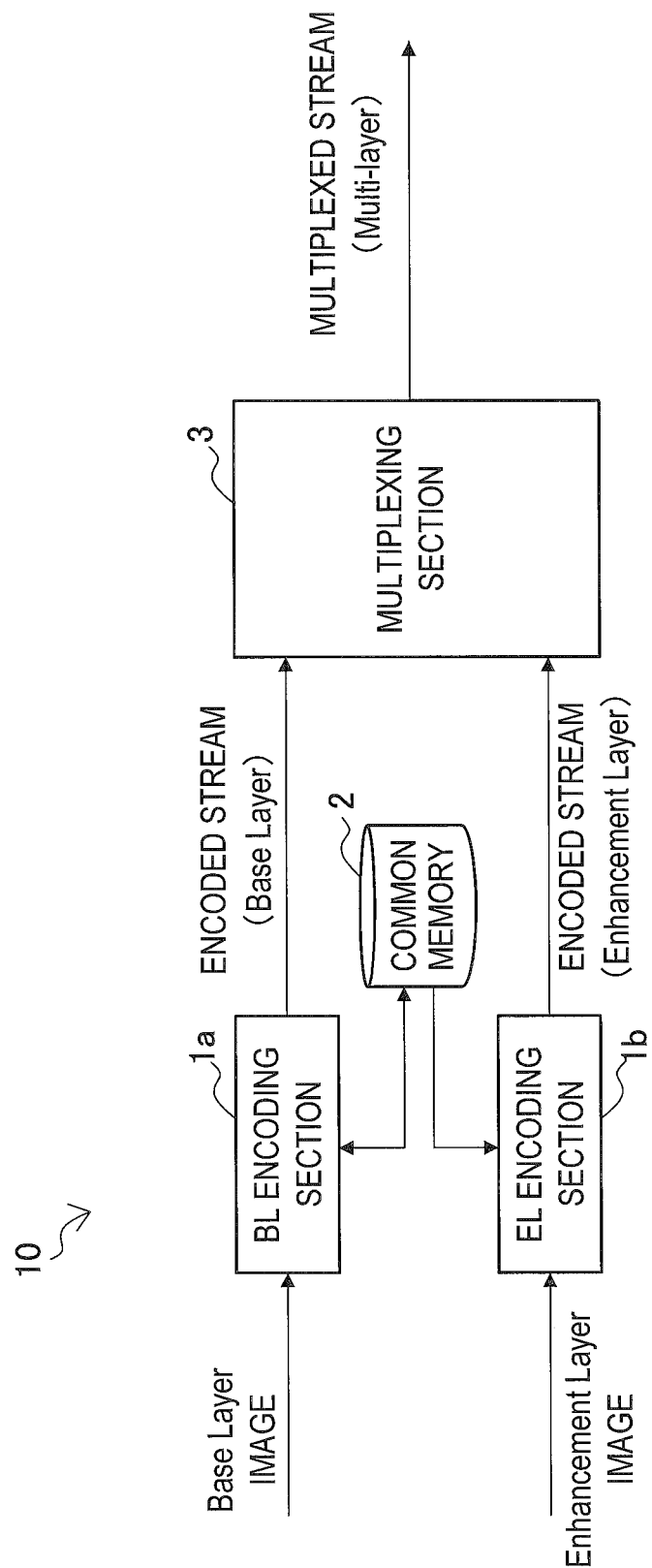
FIG. 5 is a block diagram showing a schematic configuration of an image encoding device according to an embodiment.

FIG. 5 is a block diagram showing a schematic configuration of an image encoding device 10 according to an embodiment supporting scalable video coding. Referring to FIG. 5, the image encoding device 10 includes a base layer (BL) encoding section 1a, an enhancement layer (EL) encoding section 1b, a common memory 2, and a multiplexing section 3.

The BL encoding section 1a encodes a base layer image to generate an encoded stream of the base layer. The EL encoding section 1b encodes an enhancement layer image to generate an encoded stream of an enhancement layer. The common memory 2 stores information commonly used between layers. The multiplexing section 3 multiplexes an encoded stream of the base layer generated by the BL encoding section 1a and an encoded stream of one or more enhancement layers generated by the EL encoding section 1b to generate a multilayer multiplexed stream.

1-6. Basic Configuration Example of a Decoder

Figure 6:
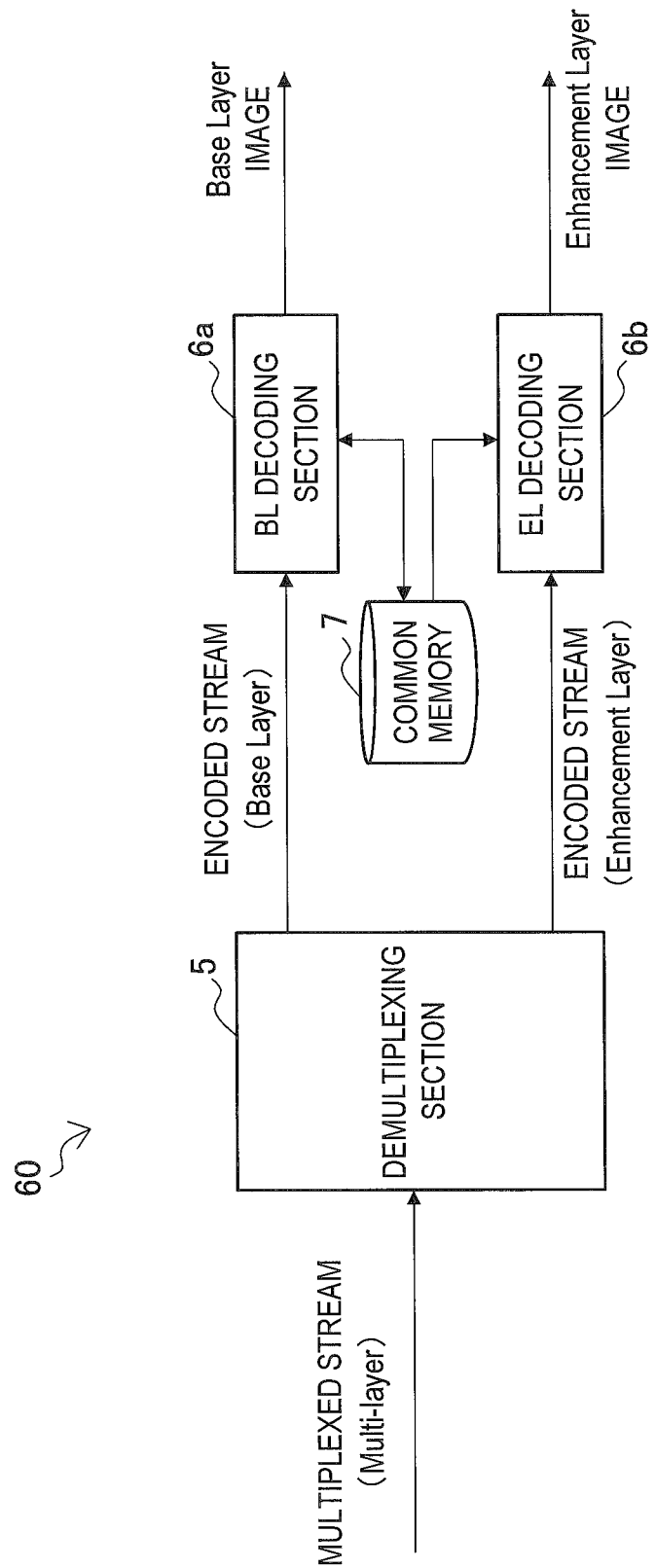
FIG. 6 is a block diagram showing a schematic configuration of an image decoding device according to an embodiment.

FIG. 6 is a block diagram showing a schematic configuration of an image decoding device 60 according to an embodiment supporting scalable video coding. Referring to FIG. 6, the image decoding device 60 includes a demultiplexing section 5, a base layer (BL) decoding section 6a, an enhancement layer (EL) decoding section 6b, and a common memory 7.

The demultiplexing section 5 demultiplexes a multilayer multiplexed stream into an encoded stream of the base layer and an encoded stream of one or more enhancement layers. The BL decoding section 6a decodes a base layer image from an encoded stream of the base layer. The EL decoding section 6b decodes an enhancement layer image from an encoded stream of an enhancement layer. The common memory 7 stores information commonly used between layers.

In the image encoding device 10 illustrated in FIG. 5, the configuration of the BL encoding section 1a to encode the base layer and that of the EL encoding section 1b to encode an enhancement layer are similar to each other. Some parameters generated or acquired by the BL encoding section 1a may be buffered by using the common memory 2 and reused by the EL encoding section 1b. In the next section, such a configuration of the EL encoding section 1b will be described in detail.

Similarly, in the image decoding device 60 illustrated in FIG. 6, the configuration of the BL decoding section 6a to decode the base layer and that of the EL decoding section 6b to decode an enhancement layer are similar to each other. Some parameters generated or acquired by the BL decoding section 6a may be buffered by using the common memory 7 and reused by the EL decoding section 6b. Further in the next section, such a configuration of the EL decoding section 6b will be described in detail.

2. Configuration Example of an EL Encoding Section According to an Embodiment

2-1. Overall Configuration

Figure 7:
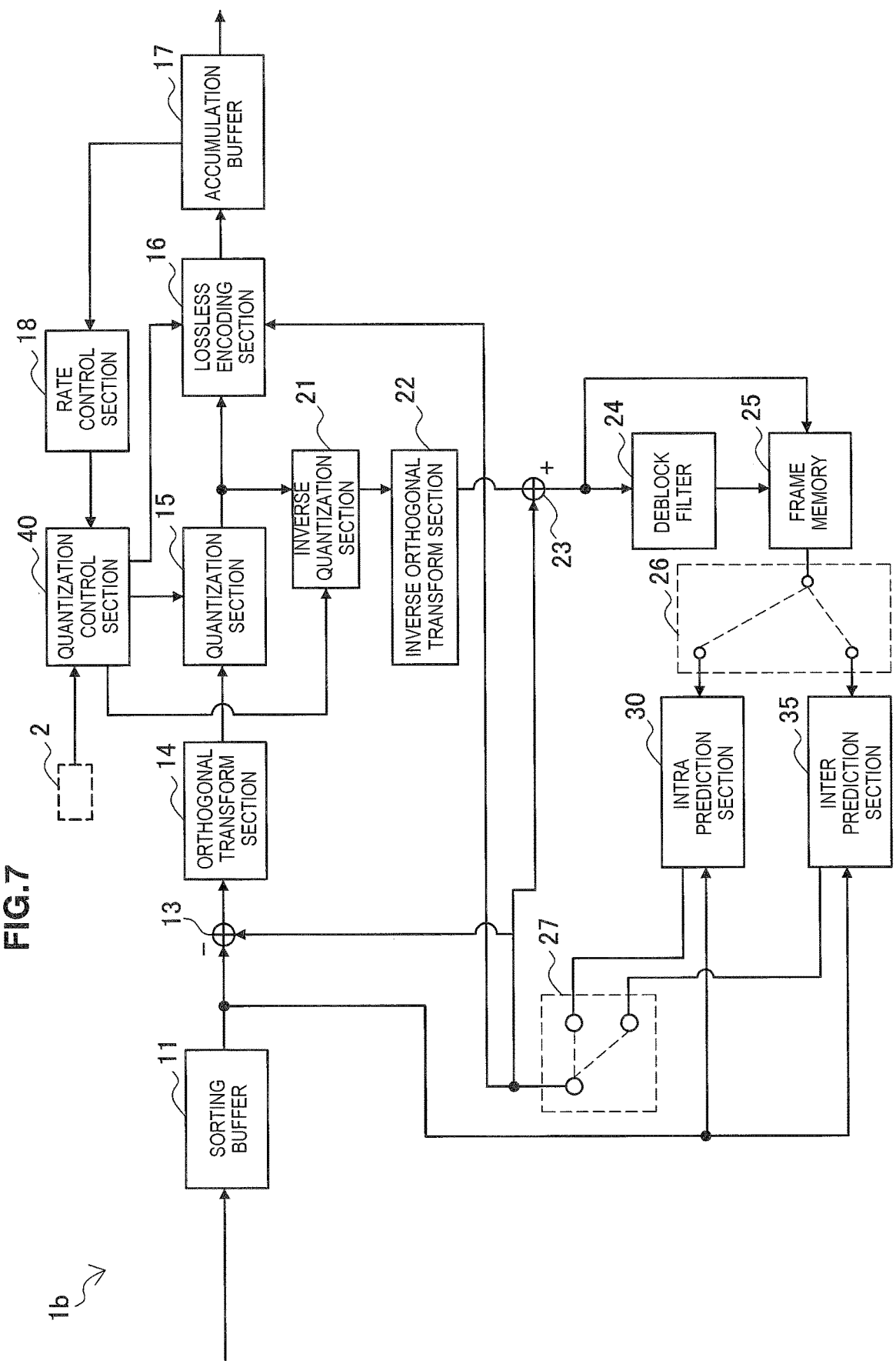
FIG. 7 is a block diagram showing an example of a configuration of an EL encoding section illustrated in FIG. 5

FIG. 7 is a block diagram showing an example of the configuration of the EL encoding section 1b illustrated in FIG. 5. Referring to FIG. 7, the EL encoding section 1b includes a sorting buffer 11, a subtraction section 13, an orthogonal transform section 14, a quantization section 15, a lossless encoding section 16, an accumulation buffer 17, a rate control section 18, an inverse quantization section 21, an inverse orthogonal transform section 22, an addition section 23, a deblock filter 24, a frame memory 25, selectors 26 and 27, an intra prediction section 30, an inter prediction section 35, and a quantization control section 40.

The sorting buffer 11 sorts the images included in the series of image data. After sorting the images according to a GOP (Group of Pictures) structure according to the encoding process, the sorting buffer 11 outputs the image data which has been sorted to the subtraction section 13, the intra prediction section 30, and the inter prediction section 35.

The image data input from the sorting buffer 11 and predicted image data input by the intra prediction section 30 or the inter prediction section 35 to be described later are supplied to the subtraction section 13. The subtraction section 13 computes predicted error data which is a difference between the image data input from the sorting buffer 11 and the predicted image data and outputs the computed predicted error data to the orthogonal transform section 14.

The orthogonal transform section 14 performs orthogonal transform on the predicted error data input from the subtraction section 13. The orthogonal transform to be performed by the orthogonal transform section 14 may be discrete cosine transform (DCT) or Karhunen-Loeve transform, for example. The orthogonal transform section 14 outputs transform coefficient data acquired by the orthogonal transform process to the quantization section 15.

The quantization section 15 receives the transform coefficient data from the orthogonal transform section 14 and receives a quantization parameter from the quantization control section 40 to be described later. The quantization section 15 can also receive a quantization matrix from the quantization control section 40. Using a quantization step decided from the input quantization parameter (and the quantization matrix), the quantization section 15 quantizes the transform coefficient data of an enhancement layer and thereby generates quantized data (quantized transform coefficient data). Then, the quantization section 15 outputs the quantized data to the lossless encoding section 16 and the inverse quantization section 21.

The lossless encoding section 16 performs a lossless encoding process on the quantized data input from the quantization section 15 to generate an encoded stream of the enhancement layer. The lossless encoding section 16 encodes various parameters referred to when the encoded stream is decoded and inserts the encoded parameters into a header region of the encoded stream. The parameters encoded by the lossless encoding section 16 can include information regarding intra prediction to be described later, information regarding inter prediction, and quantization relevant parameters. Then, the lossless encoding section 16 outputs the generated encoded stream to the accumulation buffer 17.

The accumulation buffer 17 temporarily accumulates the encoded stream input from the lossless encoding section 16 using a storage medium such as a semiconductor memory. Then, the accumulation buffer 17 outputs the accumulated encoded stream to a transmission section that is not shown (for example, a communication interface or a connection interface to peripheral devices) at a rate in accordance with the band of a transmission path.

The rate control section 18 monitors vacant capacity of the accumulation buffer 17. Then the rate control section 18 generates a rate control signal according to the vacant capacity of the accumulation buffer 17 and outputs the generated rate control signal to the quantization control section 40. The rate control section 18 may control the rate of the encoded stream according to the same rate control scheme as the above-described MPEG2 test model and other rate control schemes. The rate control signal output to the quantization control section 40 can include the quantization parameter and the quantization matrix.

The inverse quantization section 21, the inverse orthogonal transform section 22, and the addition section 23 constitute a local decoder. The inverse quantization section 21 receives the quantized data from the quantization section 15 and receives the quantization parameter from the quantization control section 40 to be described later. The inverse quantization section 21 can also receive the quantization matrix from the quantization control section 40. The inverse quantization section 21 performs inverse quantization on the quantized data of the enhancement layer to restore the transform coefficient data using the quantization step decided from the input quantization parameter (and the quantization matrix). Then the inverse quantization section 21 outputs the restored transform coefficient data to the inverse orthogonal transform section 22.

The inverse orthogonal transform section 22 restores predicted error data by performing an inverse orthogonal transform process on the transform coefficient data input from the inverse quantization section 21. Then, the inverse orthogonal transform section 22 outputs the restored predicted error data to the addition section 23.

The addition section 23 adds the restored predicted error data input from the inverse orthogonal transform section 22 and the predicted image data input from the intra prediction section 30 or the inter prediction section 35 to thereby generate decoded image data (reconstructed image of the enhancement layer). Then, the addition section 23 outputs the generated decoded image data to the deblock filter 24 and the frame memory 25.

The deblock filter 24 performs a filtering process for reducing block distortion that occurs during encoding of an image. The deblock filter 24 performs filtering on the decoded image data input from the addition section 23 to remove block distortion, and then outputs the filtered decoded image data to the frame memory 25.

The frame memory 25 stores the decoded image data input from the addition section 23 and the filtered decoded image data input from the deblock filter 24 using a storage medium.

The selector 26 reads the decoded image data before the filtering used for the intra prediction from the frame memory 25 and supplies the read decoded image data as reference image data to the intra prediction section 30. Further, the selector 26 reads the filtered decoded image data used for the inter prediction from the frame memory 25 and supplies the read decoded image data as reference image data to the inter prediction section 35.

In the intra prediction mode, the selector 27 outputs predicted image data as a result of intra prediction output from the intra prediction section 30 to the subtraction section 13 and also outputs information about the intra prediction to the lossless encoding section 16. Further, in the inter prediction mode, the selector 27 outputs predicted image data as a result of inter prediction output from the inter prediction section 35 to the subtraction section 13 and also outputs information about the inter prediction to the lossless encoding section 16. The selector 27 switches the inter prediction mode and the intra prediction mode in accordance with the magnitude of a cost function value.

The intra prediction section 30 performs an intra prediction process on each prediction unit (PU) of the HEVC scheme based on the original image data and the decoded image data of the enhancement layer. For example, the intra prediction section 30 evaluates a prediction result according to each candidate mode in a prediction mode set using a predetermined cost function. Next, the intra prediction section 30 selects a prediction mode in which a cost function value is the minimum, i.e., a prediction mode in which a compression ratio is the highest, as an optimum prediction mode. In addition, the intra prediction section 30 generates predicted image data of the enhancement layer according to the optimum prediction mode. Further, the intra prediction section 30 outputs information regarding the intra prediction including prediction mode information indicating the selected optimum prediction mode, the cost function value, and the predicted image data to the selector 27.

The inter prediction section 35 performs an inter prediction process on each prediction unit of the HEVC scheme based on the original image data and the decoded image data of the enhancement layer. For example, the inter prediction section 35 evaluates a prediction result according to each candidate mode in a prediction mode set using a predetermined cost function. Next, the inter prediction section 35 selects a prediction mode in which a cost function value is the minimum, i.e., a prediction mode in which a compression ratio is the highest, as an optimum prediction mode. In addition, the inter prediction section 35 generates predicted image data of the enhancement layer according to the optimum prediction mode. Further, the inter prediction section 35 outputs information regarding the inter prediction including prediction mode information and motion information indicating the selected optimum prediction mode, the cost function value, and the predicted image data to the selector 27.

The quantization control section 40 controls a quantization process and an inverse quantization process performed in the EL encoding section 1b using information buffered by the common memory 2. In addition, the quantization control section 40 generates a quantization relevant parameter. In the present embodiment, the quantization relevant parameter generated by the quantization control section 40 can include a parameter used when deciding a quantization parameter and a parameter used when deciding a quantization matrix. In the present specification, the parameter used when deciding a quantization parameter will be referred to as a quantization parameter (QP) parameter, and the parameter used when deciding a quantization matrix will be referred to as a scaling list (SL) parameter.

A QP parameter mainly includes a parameter group relating to luma components and a parameter group relating to chroma components. As an example, the parameter group relating to luma components can include pic_init_qp_minus26 that is a parameter of a picture unit, slice_qp_delta that is a parameter of a slice unit, and cu_qp_delta_abs and cu_qp_delta_sign that are parameters of a CU unit. The parameter group relating to chroma components can include slice_cbE_qp_offset and slice_crE_qp_offset that are parameters of the slice unit. pic_cb_qp_offset and pic_cr_qp_offset that are parameters of the picture unit relating to chroma components generated in a known technique are not generated in the present embodiment.

When a quantization matrix set in a base layer is not reused in an enhancement layer, an SL parameter which designates quantization matrixes having one or more sizes to be set for the enhancement layer is generated. When a quantization matrix is reused in layers, if the base layer is encoded in the HEVC scheme, the SL parameter may not be generated. When quantization matrixes are reused in layers, if the base layer is encoded in the AVC scheme, the SL parameter which designates quantization matrixes having the sizes of 16×16 pixels and 32×32 pixels to be set for the enhancement layer can be generated. When quantization matrixes are reused in layers, a flag that indicates reuse of the quantization matrix and information that indicates a layer whose quantization matrix should be reused may be generated as the SL parameter.

Note that a quantization step (or a quantization parameter) that is actually used for quantizing and inversely quantizing transform coefficient data may be designated based on, for example, a rate control signal input from the rate control section 18. Instead, a quantization step (or a quantization parameter) that is actually used may be designated in advance by a user.

2-2. Detailed Configuration of a Quantization Control Section

Figure 8:
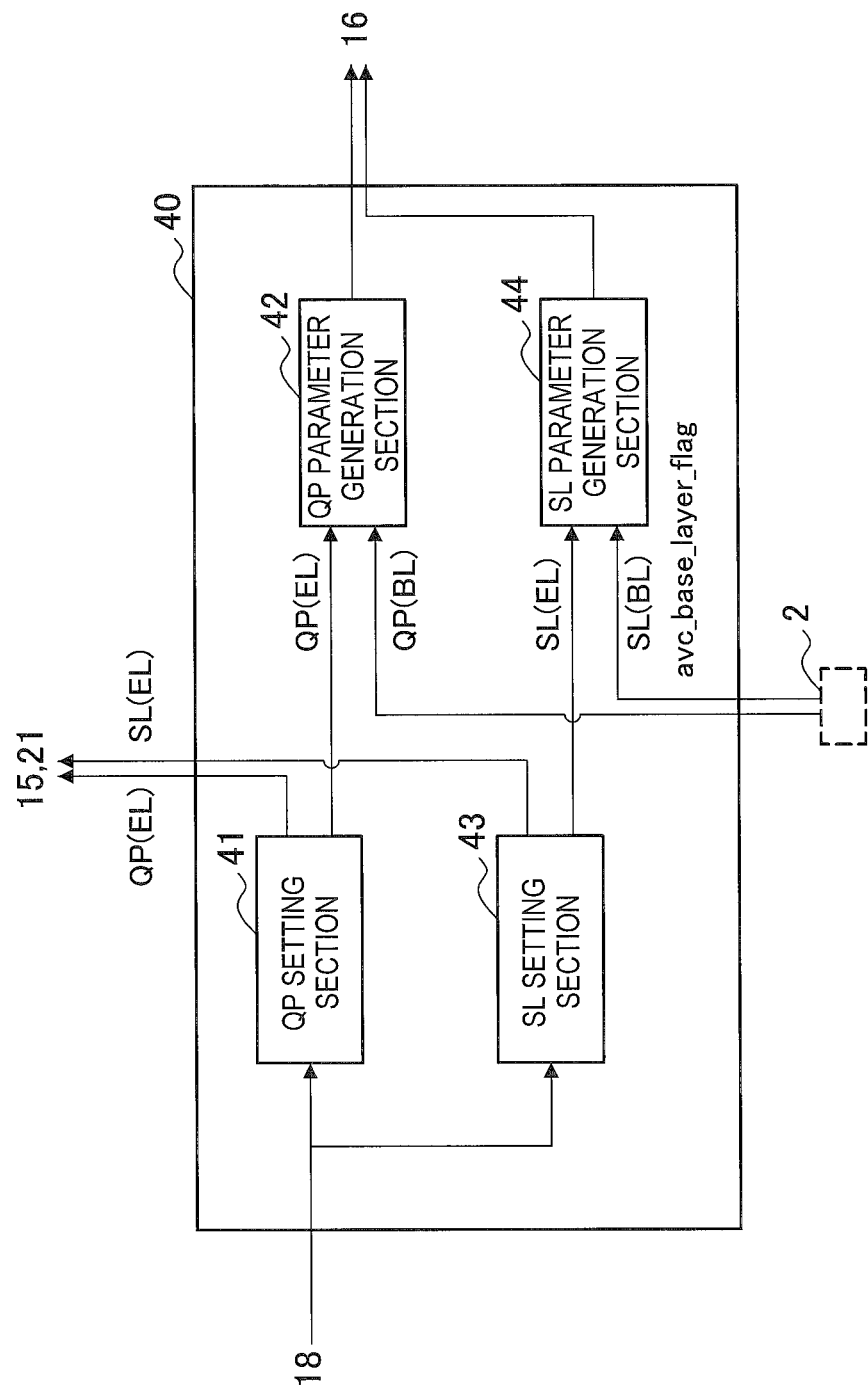
FIG. 8 is a block diagram showing an example of a configuration of a quantization control section illustrated in FIG. 7.

FIG. 8 is a block diagram showing an example of a configuration of the quantization control section 40 illustrated in FIG. 7. Referring to FIG. 8, the quantization control section 40 has a QP setting section 41, a QP parameter generation section 42, an SL setting section 43, and an SL parameter generation section 44.

(1) QP Setting Section

The QP setting section 41 sets quantization parameters that are actually used by the quantization section 15 when quantizing transform coefficient data of a luma component and chroma components of an enhancement layer for respective blocks of the enhancement layer. The quantization parameters set by the QP setting section 41 are also used when the inverse quantization section 21 inversely quantizes quantized data. Here, a block can have a size that is equal to or smaller than that of an LCU. For example, the QP setting section 41 may set a quantization parameter of the luma component (Y) and quantization parameters of chroma components (Cb and Cr) according to a rate control signal input from the rate control section 18. Instead, the QP setting section 41 may set a quantization parameter of the luma component and quantization parameters of the chroma components designated in advance by a user. Then, the QP setting section 41 outputs the quantization parameters (QP (EL)) set for the respective blocks of the enhancement layer to the quantization section 15, the inverse quantization section 21, and the QP parameter generation section 42.

(2) QP Parameter Generation Section

The QP parameter generation section 42 generates a QP parameter of an enhancement layer based on the quantization parameters of the enhancement layer input from the QP setting section 41 and a QP parameter of the base layer buffered by the common memory 2. A QP parameter of the lama component may be generated according to the specification described in Non-Patent Literature 1 described above.

For example, when the base layer is encoded in the HEVC scheme, the QP parameter of the Cb component of the base layer can include pic_cb_qp_offset and slice_cb_qp_offset. When a quantization parameter offset corresponding to a given quantization parameter that is actually used for the Cb component of the enhancement layer is set to cbE_qp_offset, the QP parameter slice_cbE_qp_offset of the Cb component of the enhancement layer may be generated according to, for example, the following expression:

[Math 2]

$$\text{slice}\_cbE\_qp\_offset=cbE\_qp\_offset-\\cbB\_qp\_offset=cbE\_qp\_offset-(\text{pic}\_cb\_qp\_offset+\text{slice}\_cb\_qp\_offset) \quad (2)$$

Likewise, when the base layer is encoded in the HEVC scheme, the QP parameter of the Cr component of the base layer can include pic_cr_qp_offset and slice_cr_qp_offset. When a quantization parameter offset corresponding to a given quantization parameter that is actually used for the Cr component of the enhancement layer is set to crE_qp_offset, the QP parameter slice_crE_qp_offset of the Cr component of the enhancement layer may be generated according to, for example, the following expression:

[Math 3]

$$\text{slice}\_crE\_qp\_offset=crE\_qp\_offset-\\crB\_qp\_offset=crE\_qp\_offset-(\text{pic}\_cr\_qp\_offset+\text{slice}\_cr\_qp\_offset) \quad (3)$$

According to the expressions (2) and (3), the QP parameters slice_cbE_qp_offset and slice_crE_qp_offset generated by the QP parameter generation section 42 are equal to the difference between the quantization parameter offset (cbE_qp_offset/crE_qp_offset) of the enhancement layer and the quantization parameter offset (cbB_qp_offset/crB_qp_offset) of the base layer. Here, the quantization parameter offset (cbB_qp_offset/crB_qp_offset) of the base layer is the sum of an offset of the picture unit and an offset of the slice unit.

In order to generate the QP parameters slice_cbE_qp_offset and slice_crE_qp_offset, the following expressions (4) and (5) may be used, instead of the expressions (2) and (3).

[Math 4]

$$\text{slice}\_cbE\_qp\_offset=cbE\_qp\_offset-\text{pic}\_cb\_qp\_offset \quad (4)$$

$$\text{slice}\_crE\_qp\_offset=crE\_qp\_offset-\text{pic}\_cr\_qp\_offset \quad (5)$$

According to the expressions (4) and (5), the QP parameters slice_cbE_qp_offset and slice_crE_qp_offset generated by the QP parameter generation section 42 is equal to the difference between the quantization parameter offset of the enhancement layer and the quantization parameter offset (pic_cb_qp_offset/pic_cr_qp_offset) of the picture unit of the base layer.

When the base layer is encoded in the AVC scheme, the QP parameters of the chroma components of the base layer do not include the quantization parameter offset of the slice unit, but can include chroma_qp_index_offset and second_chroma_qp_index_offset of the picture unit. When there is no second_chroma_qp_index_offset, the QP parameters slice_cbE_qp_offset and slice_crE_qp_offset of the enhancement layer can be respectively generated according to, for example, the following expressions (6) and (7).

[Math 5]

$$\text{slice\_}cbE\text{\_qp\_offset}=cbE\text{\_qp\_offset}-\text{chroma\_qp\_index\_offset} \quad (6)$$

$$\text{slice\_}crE\text{\_qp\_offset}=crE\text{\_qp\_offset}-\text{chroma\_qp\_index\_offset} \quad (7)$$

When there is second_chroma_qp_index_offset, the above-described expression (7) is replaced by the following expression (8).

[Math 6]

$$\text{slice\_}crE\text{\_qp\_offset}=crE\text{\_qp\_offset}-\text{second\_chroma\_qp\_index\_offset} \quad (8)$$

The QP parameter generation section 42 outputs the QP parameters slice_cbE_qp_offset and slice_crE_qp_offset of the enhancement layer generated as above to the lossless encoding section 16.

Note that the technology is not limited to the above example, and the quantization control section 40 may not reuse the QP parameters in the layers. In addition, the QP parameter generation section 42 may generate a QP parameter reuse flag that indicates whether the QP parameters of the chroma components should be reused in the layers, i.e., a quantization parameter offset of the enhancement layer should be set based on the quantization parameter offset of the base layer. The QP parameter reuse flag is typically encoded in a PPS by the lossless encoding section 16. When the QP parameter reuse flag indicates "true," only slice_cbE_qp_offset and slice_crE_qp_offset of the slice unit of the enhancement layer can be encoded within the slice header. When the QP parameter reuse flag indicates "false," pic_cb_qp_offset and pic_cr_qp_offset of the picture unit of the enhancement layer can be encoded in the PPS.

(3) SL Setting Section

The SL setting section 43 sets quantization matrixes that can be actually used by the quantization section 15 when quantizing the transform coefficient data of the luma component and the chroma components of an enhancement layer for respective blocks of the enhancement layer. The quantization matrixes set by the SL setting section 43 can also be used when the inverse quantization section 21 inversely quantizes quantized data. For example, the SL setting section 43 may set respective quantization matrixes having the sizes of 4×4 pixels. 8×8 pixels. 16×16 pixels, and 32×32 pixels of respective (intra and inter) prediction modes of the respective color components (Y, Cb, and Cr) according to a rate control signal input from the rate control section 18. Instead, the SL setting section 43 may set quantization matrixes designated in advance by a user. Then, the SL setting section 43 outputs the quantization matrixes (SL (EL)) set for the respective blocks of the enhancement layer to the quantization section 15, the inverse quantization section 21, and the SL parameter generation section 44.

(4) SL Parameter Generation Section

When quantization matrixes are reused in the layers, a process performed by the SL parameter generation section 44 is different depending on whether or not the base layer is encoded in the HEVC scheme. According to Non-Patent Literature 2 described above, whether or not the base layer is encoded in the HEVC scheme is indicated by a flag avc_base_layer_flag that is encoded in a video parameter set (VPS). FIGS. 9A to 9D are illustrative diagrams for describing reuse of quantization matrixes.

Figure 9A:
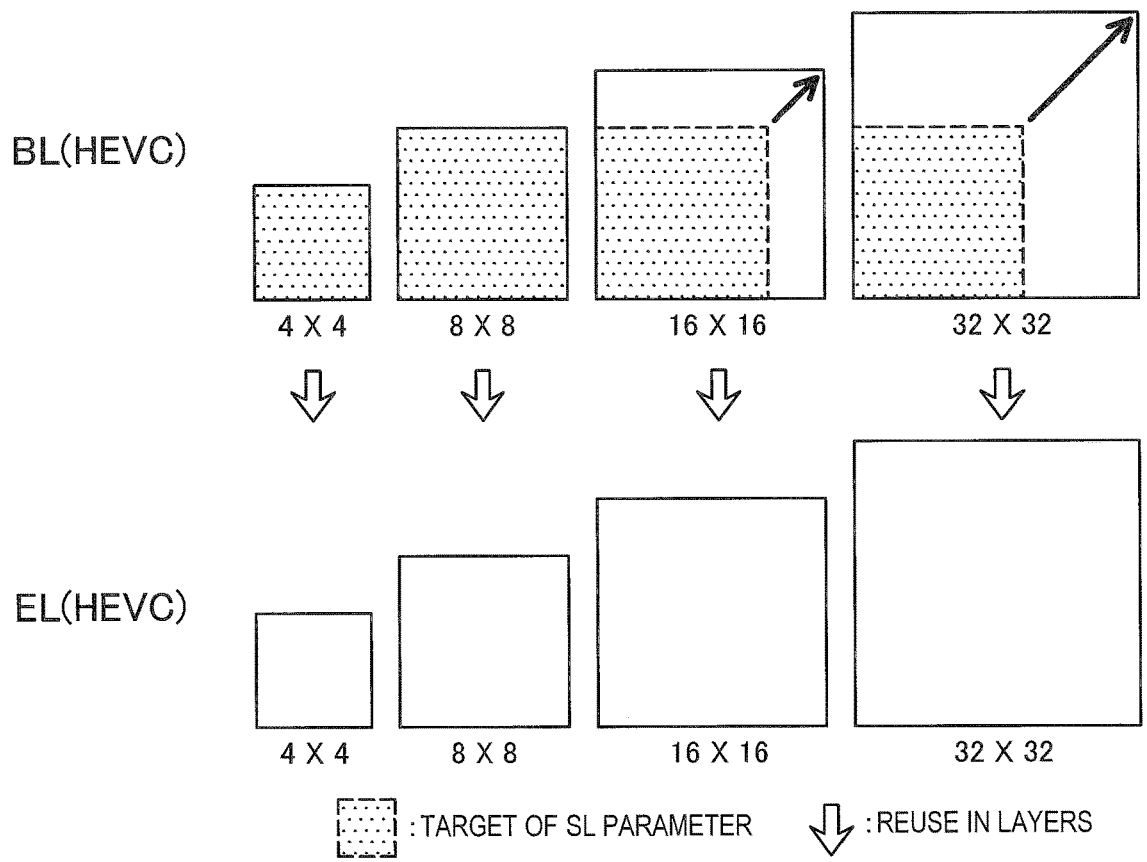
FIG. 9A is a first illustrative diagram for describing reuse of quantization matrixes.

In the example of FIG. 9A, the base layer is encoded in the HEVC scheme. In this case, quantization matrixes having the sizes of 4×4 pixels, 8×8 pixels, 16×16 pixels, and 32×32 pixels are set in the base layer. Thus, because the quantization matrixes may be reused in the enhancement layer, the SL parameter generation section 44 does not generate an SL parameter of the enhancement layer. This means that the lossless encoding section 16 does not encode a quantization matrix of the enhancement layer. Note that, in the base layer, SL parameters that designate the quantization matrixes are each generated using a technique such as zigzag scanning. The SL parameters for the quantization matrixes having the size of 16×16 pixels and 32×32 pixels, however, are generated after down-sampling the quantization matrixes to have the size of 8×8 pixels (the shaded portion in the drawing).

Figure 9B:
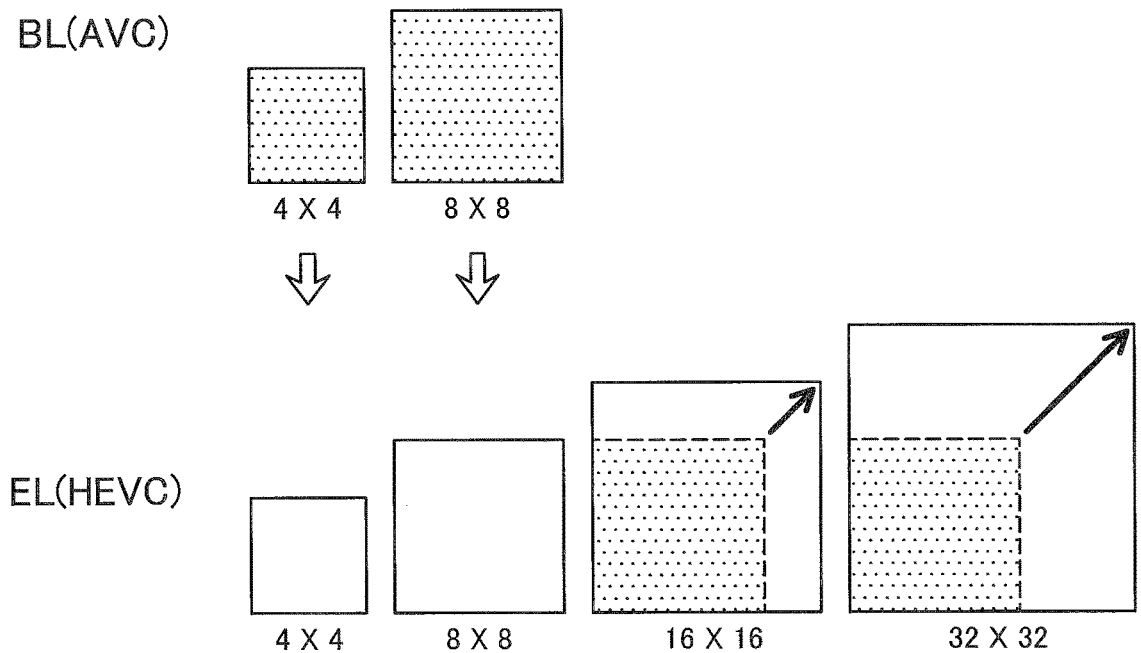
FIG. 9B is a second illustrative diagram for describing reuse of quantization matrixes.

In the example of FIG. 9B, the base layer is encoded in the AVC scheme. In this case, the quantization matrixes having the sizes of 4×4 pixels and 8×8 pixels are set for respective blocks in the base layer, and reused in the enhancement layer. Thus, the SL parameter generation section 44 does not generate an SL parameter that designates the quantization matrixes having the sizes of 4×4 pixels and 8×8 pixels. On the other hand, the quantization matrixes having the sizes of 16×16 pixels and 32×32 pixels are not set in the base layer. Thus, the SL parameter generation section 44 generates SL parameters that designate the quantization matrixes having the sizes of 16×16 pixels and 32×32 pixels of the enhancement layer set by the SL setting section 43. Note that these SL parameters are generated after down-sampling each quantization matrix to have the size of 8×8 pixels (the shaded portion in the drawing).

In the example of FIG. 9C, the base layer is encoded in the AVC scheme. Different from the example of FIG. 9B, the quantization matrixes of the base layer are not reused in the enhancement layer regardless of their sizes. Thus, the SL parameter generation section 44 generates SL parameters which designate the quantization matrixes having the sizes of 4×4 pixels, 8×8 pixels, 16×16 pixels, and 32×32 pixels of the enhancement layer set by the SL setting section 43. Note that the SL parameters for the quantization matrixes having the sizes of 16×16 pixels and 32×32 pixels are generated after down-sampling each quantization matrix to have the size of 8×8 pixels.

According to the technique exemplified in FIG. 9B, since quantization matrixes can be reused regardless of an image coding scheme, a code amount necessary for designating the quantization matrixes can be minimized. On the other hand, according to the technique illustrated in FIG. 9C, the quantization matrixes are reused only in the layers whose image coding scheme is the same. In the latter case, coding efficiency can be enhanced by reusing an optimum quantization matrix to an extent possible while the quantization matrix that is suitable for the characteristic of the image coding scheme is used.

In the HEVC scheme, there can be one or more subordinate layers in a certain enhancement layer. Thus, an SL parameter generated by the SL parameter generation section 44 may include reference layer information which designates a layer whose quantization matrix should be reused. In the example of FIG. 9D, a layer BL0 and a layer BL1 are superior layers of an enhancement layer EL2, and are commonly encoded in the HEVC scheme. In the enhancement layer EL2, the quantization matrixes having the sizes of 4×4 pixels and 8×8 pixels are reused in the layer BL0. In addition, the quantization matrixes having the sizes of 16×16 pixels and 32×32 pixels are reused in the layer BL1. Thus, the reference layer information (ref_layer) generated by the SL parameter generation section 44 designates the layer BL0 with respect to the sizes of 4×4 pixels and 8×8 pixels, and the layer BL1 with respect to the sizes of 16×16 pixels and 32×32 pixels. The reference layer information may be separately generated and encoded according to the different sizes and different types of the quantization matrixes (a combination of a color component and a (intra or inter) prediction mode). Instead, a single kind of reference layer information common for a plurality of sizes or a plurality of types may be generated and encoded.

When a quantization matrix of a certain size and type is not reused in layers, the SL parameter generation section 44 generates an SL parameter which designates a quantization matrix that is unique to an enhancement layer of the size and type set by the SL setting section 43.

When the SL parameter of the enhancement layer is generated, the SL setting section 43 outputs the generated SL parameter to the lossless encoding section 16.

Note that the quantization control section 40 may not reuse a quantization matrix in the layers as described above. The SL parameter generation section 44 may generate a quantization matrix reuse flag which indicates whether a quantization matrix should be reused in the layers, i.e., whether a quantization matrix of the enhancement layer should be generated based on the quantization matrix of the base layer. The quantization matrix reuse flag is typically encoded within an SPS or a PPS by the lossless encoding section 16. When the quantization matrix reuse flag indicates "true," a quantization matrix of the enhancement layer is duplicated or predicted from the quantization matrix of the base layer. A residual of the prediction of the quantization matrix may be additionally encoded in the enhancement layer. The SL parameter generation section 44 may generate a setting technique flag for setting a quantization matrix of the enhancement layer. The setting technique flag can indicate either duplication or prediction. The SL parameter generation section 44 may separately generate such a quantization matrix reuse flag and setting technique flag for different sizes or different types of quantization matrixes.

3. Flow of a Process for Encoding According to an Embodiment

3-1. Schematic Flow

Figure 10:
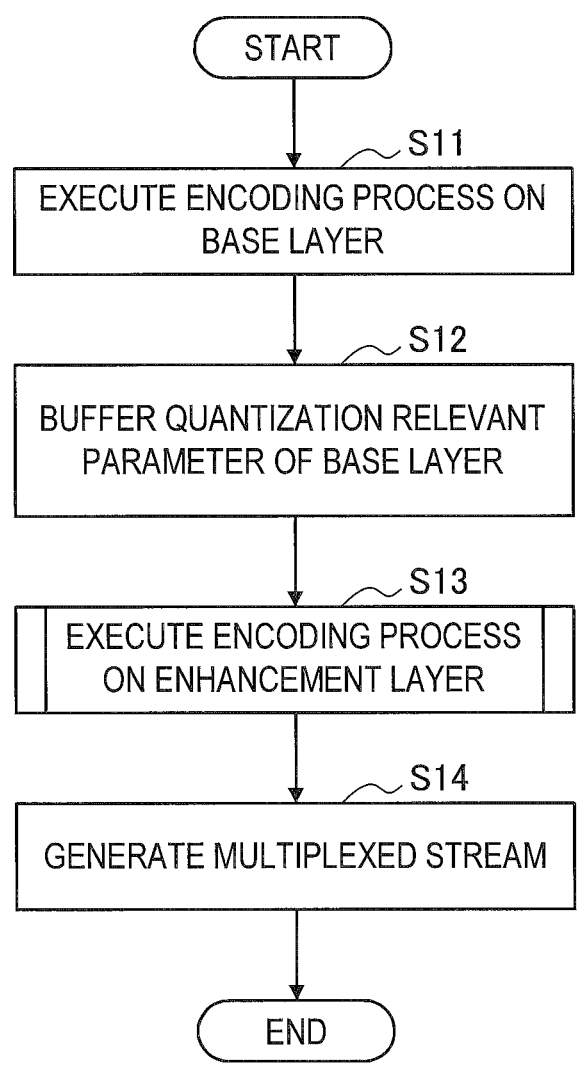
FIG. 10 is a flow chart showing an example of the flow of a schematic process for encoding according to an embodiment.

FIG. 10 is a flow chart showing an example of a schematic process flow for encoding according to an embodiment. For the sake of brevity of description, process steps that are not directly related to the technology according to the present disclosure are omitted from the drawing.

Referring to FIG. 10, the BL encoding section 1a first performs an encoding process for a base layer to generate an encoded stream of the base layer (Step S11).

The common memory 2 buffers quantization relevant parameters generated in the encoding process of the base layer (Step S12). Here, the buffered quantization relevant parameters can include quantization parameter offsets of the chroma components set for each block of the base layer and a quantization matrix.

Next, the EL encoding section 1b executes an encoding process of an enhancement layer using the information buffered by the common memory 2 to generate an encoded stream of the enhancement layer (Step S13).

Then, the multiplexing section 4 multiplexes the encoded stream of the base layer generated by the BL encoding section 1a and the encoded stream of the enhancement layer generated by the EL encoding section 1b to generate a multilayer multiplexed stream (Step S14).

3-2. Process Relating to Quantization

Figure 11:
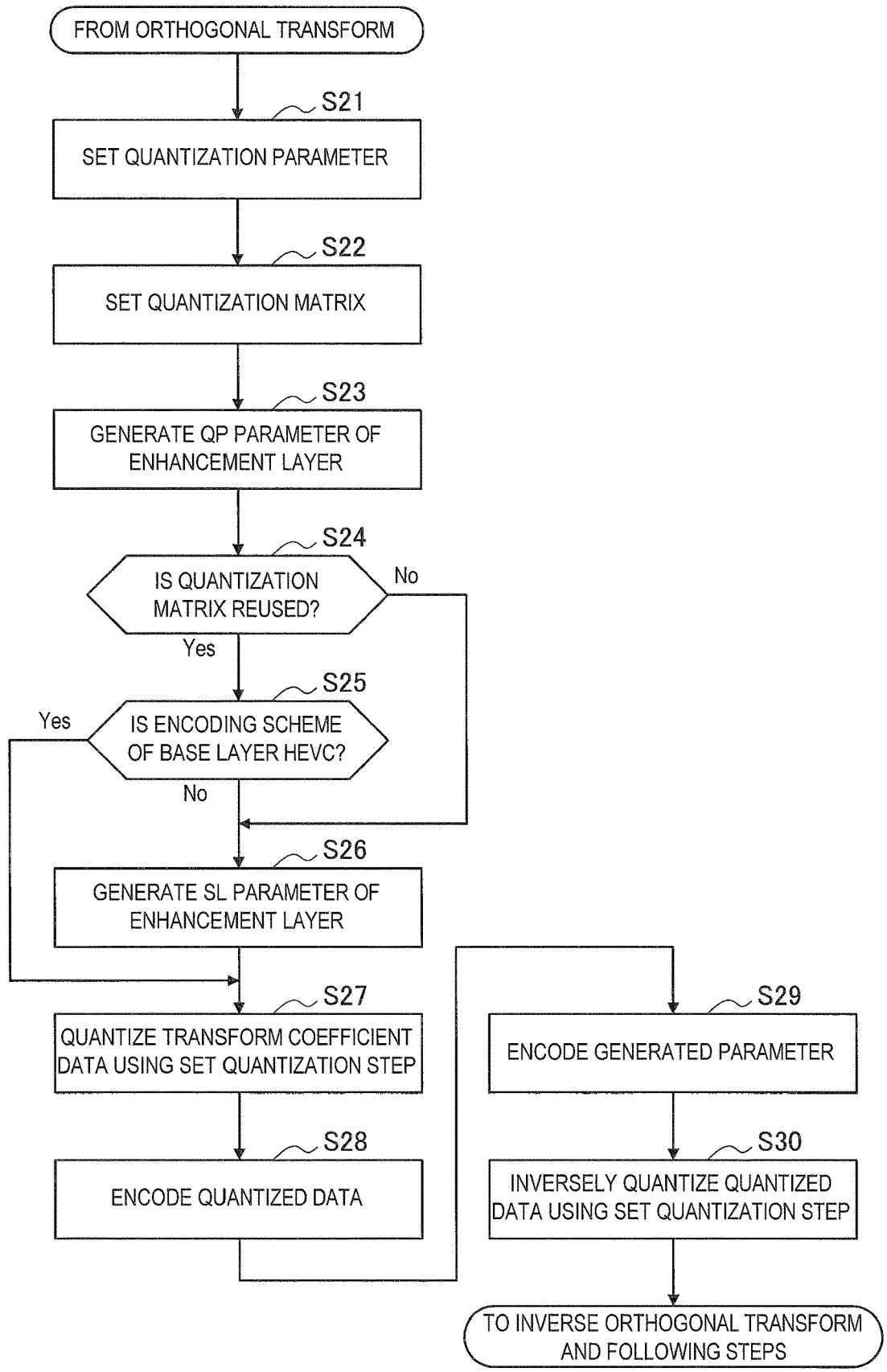
FIG. 11 is a flow chart showing an example of the flow of a process relating to quantization in an encoding process of an enhancement layer.

FIG. 11 is a flow chart showing an example of the flow of a process relating to quantization in the encoding process of the enhancement layer (Step S13 of FIG. 10). The process described in FIG. 11 can be repeated for each slice within, for example, an enhancement layer image.

Referring to FIG. 11, the QP setting section 41 first sets quantization parameters of respective color components that are decided by the rate control section 18 or designated by a user for respective blocks of a slice (Step S21). In addition, the SL setting section 43 sets one or more quantization matrixes which are decided by the rate control section 18 or designated by the user for the respective blocks of the slice (Step S22).

Next, the QP parameter generation section 42 generates QP parameters of the enhancement layer based on the quantization parameters set for the enhancement layer by the QP setting section 41 using the information buffered by the common memory 2 (Step S23). For example, as the QP parameters of the chroma components, the QP parameter generation section 42 generates quantization parameter offset differences slice_cbE_qp_offset and slice_crE_qp_offset according to the above-described expressions (2) and (3) or (4) and (5).

In addition, the SL parameter generation section 44 determines whether or not the quantization matrixes are reused in the layers (Step S24). When the quantization matrixes are reused in the layers, the SL parameter generation section 44 further determines whether or not the encoding scheme of the base layer is the HEVC scheme (Step S25). When the quantization matrixes are not reused in the layers, or when the encoding scheme of the base layer is not the HEVC scheme, the SL parameter generation section 44 generates SL parameters of the enhancement layer (Step S26). For example, when the quantization matrixes are not reused in the layers, the SL parameter generation section 44 can generate SL parameters that designate all necessary quantization matrixes of the enhancement layer. In addition, when the quantization matrixes are reused in the layers, and when the encoding scheme of the base layer is the AVC scheme, the SL parameter generation section 44 can generate SL parameters which designate quantization matrixes having the size of 16×16 pixels and 32×32 pixels of the enhancement layer.

Next, the quantization section 15 quantizes transform coefficient data of the enhancement layer to generate quantized data using a quantization step decided from the quantization parameters (and the quantization matrixes) set by the quantization control section 40 (Step S27). Then, the quantization section 15 outputs the quantized data to the lossless encoding section 16 and the inverse quantization section 21.

Next, the lossless encoding section 16 encodes the quantized data input from the quantization section 15 to generate an encoded stream of the enhancement layer (Step S28). In addition, the lossless encoding section 16 encodes the quantization relevant parameters input from the quantization control section 40 (which can include the QP parameters and the SL parameters), thereby inserting the encoded parameters into a header region of the encoded stream (Step S29). Then, the lossless encoding section 16 outputs the encoded stream of the enhancement layer to the accumulation buffer 17.

Next, the inverse quantization section 21 inversely quantizes the quantized data of the enhancement layer using the quantization step decided from the quantization parameters (and the quantization matrixes) set by the quantization control section 40 to restore transform coefficient data (Step S30). Then, the inverse quantization section 21 outputs the restored transform coefficient data to the inverse orthogonal transform section 22.

Then, successive processes such as inverse orthogonal transform, filtering, intra prediction, and inter prediction are executed.

4. Configuration Example of an EL Decoding Section According to an Embodiment

4-1. Overall Configuration

Figure 12:
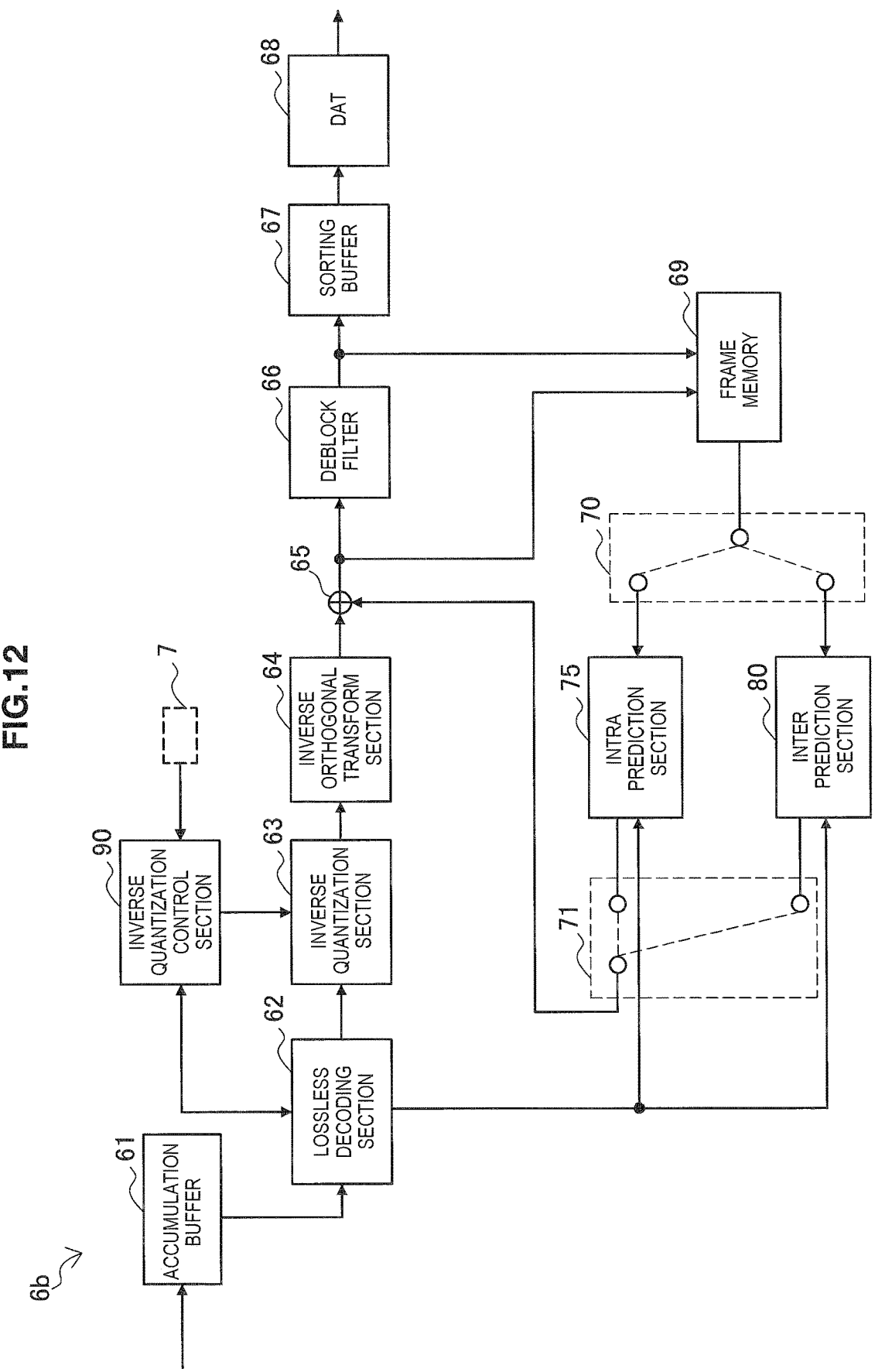
FIG. 12 is a block diagram showing an example of a configuration of an EL decoding section illustrated in FIG. 6.

FIG. 12 is a block diagram showing an example of the configuration of the EL decoding section 6b illustrated in FIG. 6. Referring to FIG. 12, the EL decoding section 6b includes an accumulation buffer 61, a lossless decoding section 62, an inverse quantization section 63, an inverse orthogonal transform section 64, an addition section 65, a deblock filter 66, a sorting buffer 67, a digital-to-analog (D/A) conversion section 68, a frame memory 69, selectors 70 and 71, an intra prediction section 75, an inter prediction section 80, and an inverse quantization control section 90.

The accumulation buffer 61 temporarily accumulates the encoded stream of the enhancement layer input from the demultiplexing section 5 using a storage medium.

The lossless decoding section 62 decodes the quantized data of the enhancement layer from the encoded stream of the enhancement layer input from the accumulation buffer 61 according to the encoding scheme used at the time of the encoding. In addition, the lossless decoding section 62 decodes the information inserted into the header region of the encoded stream. The information decoded by the lossless decoding section 62 can include, for example, information relating to intra prediction, information relating to inter prediction, and the quantization relevant parameters. The lossless decoding section 62 outputs the information relating to intra prediction to the intra prediction section 75. In addition, the lossless decoding section 62 outputs the information relating to inter prediction to the inter prediction section 80. In addition, the lossless decoding section 62 outputs the quantized data to the inverse quantization section 63 and outputs the quantization relevant parameters to the inverse quantization control section 90.

The inverse quantization section 63 inversely quantizes the quantized data input from the lossless decoding section 62 using a quantization step decided from quantization parameters (and quantization matrixes) input from the inverse quantization control section 90 to restore the transform coefficient data of the enhancement layer. Then, the inverse quantization section 63 outputs the restored transform coefficient data to the inverse orthogonal transform section 64.

The inverse orthogonal transform section 64 performs an inverse orthogonal transform on the transform coefficient data input from the inverse quantization section 63 according to the orthogonal transform scheme used at the time of the encoding to generate predicted error data. The inverse orthogonal transform section 64 outputs the generated predicted error data to the addition section 65.

The addition section 65 adds the predicted error data input from the inverse orthogonal transform section 64 and predicted image data input from the selector 71 to generate decoded image data. Then, the addition section 65 outputs the generated decoded image data to the deblock filter 66 and the frame memory 69.

The deblock filter 66 removes block distortion by filtering the decoded image data input from the addition section 65, and then outputs the filtered decoded image data to the sorting buffer 67 and the frame memory 69.

The sorting buffer 67 sorts the images input from the deblock filter 66 to generate a chronological series of image data. Then, the sorting buffer 67 outputs the generated image data to the D/A conversion section 68.

The D/A conversion section 68 converts the image data in a digital format input from the sorting buffer 67 into an image signal in an analog format. Then, the D/A conversion section 68 causes the image of the enhancement layer to be displayed by outputting the analog image signal to, for example, a display (not illustrated) connected to the image decoding device 60.

The frame memory 69 stores the decoded image data before the filtering input from the addition section 65, and the decoded image data after the filtering input from the deblock filter 66 using a storage medium, The selector 70 switches an output destination of the image data from the frame memory 69 between the intra prediction section 75 and the inter prediction section 80 for each block in the image according to the mode information acquired by the lossless decoding section 62. For example, when the intra prediction mode is designated, the selector 70 outputs the decoded image data before the filtering supplied from the frame memory 69 as the reference image data to the intra prediction section 75. In addition, when the inter prediction mode is designated, the selector 70 outputs the decoded image data after the filtering as the reference image data to the inter prediction section 80.

The selector 71 switches an output source of the predicted image data to be supplied to the addition section 65 between the intra prediction section 75 and the inter prediction section 80 according to the mode information acquired by the lossless decoding section 62. For example, when the intra prediction mode is designated, the selector 71 supplies the predicted image data output from the intra prediction section 75 to the addition section 65. In addition, when the inter prediction mode is designated, the selector 71 supplies the predicted image data output from the inter prediction section 80 to the addition section 65.

The intra prediction section 75 performs an intra prediction process of the enhancement layer based on the information regarding the intra prediction input from the lossless decoding section 62 and the reference image data from the frame memory 69 to generate predicted image data. In addition, the intra prediction section 75 outputs the generated predicted image data of the enhancement layer to the selector 71.

The inter prediction section 80 performs a motion compensation process of the enhancement layer based on the information regarding the inter prediction input from the lossless decoding section 62 and the reference image data from the frame memory 69 to generate predicted image data. The inter prediction section 80 outputs the generated predicted image data of the enhancement layer to the selector 71.

The inverse quantization control section 90 controls an inverse quantization process performed in the EL decoding section 6b using the quantization relevant parameters decoded by the lossless decoding section 62 and the information buffered by the common memory 7. In the present embodiment, the quantization relevant parameters can include a QP parameter that is used when deciding a quantization parameter and an SL parameter that is used when deciding a quantization matrix.

4-2. Detailed Configuration of an Inverse Quantization Control Section

Figure 13:
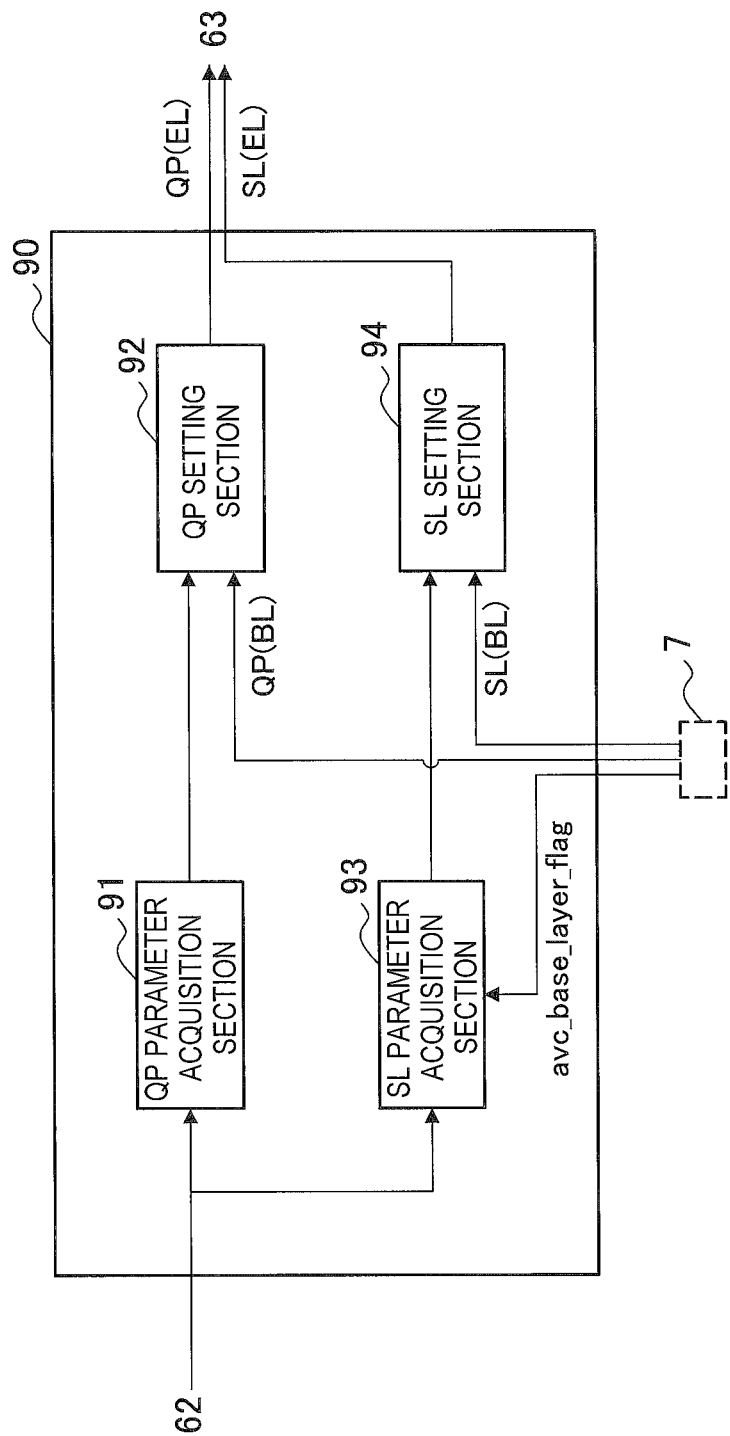
FIG. 13 is a block diagram showing an example of a configuration of an inverse quantization control section illustrated in FIG. 12.

FIG. 13 is a block diagram showing an example of a configuration of an inverse quantization control section 90 illustrated in FIG. 12. Referring to FIG. 13, the inverse quantization control section 90 has a QP parameter acquisition section 91, a QP setting section 92, an SL parameter acquisition section 93, and an SL setting section 94.

(1) QP Parameter Acquisition Section

The QP parameter acquisition section 91 acquires QP parameters decoded by the lossless decoding section 62 from the encoded stream of the enhancement layer. The QP parameters of the luma component acquired by the QP parameter acquisition section 91 can include the above-described pic_init_qp_minus26, slice_qp_delta, cu_qp_delta_abs, and cu_qp_delta_sign. In addition, the QP parameters of the chroma components acquired by the QP parameter acquisition section 91 can include the quantization parameter offset difference slice_cbE_qp_offset for the Cb component and the quantization parameter offset difference slice_crE_qp_offset for the Cr component.

Further, when a QP parameter reuse flag is decoded by the lossless decoding section 62, the QP parameter acquisition section 91 may acquire the decoded QP parameter reuse flag. The QP parameter acquisition section 91 outputs the acquired QP parameters of the enhancement layer to the QP setting section 92.

(2) QP Setting Section

The QP setting section 92 sets the quantization parameters used by the inverse quantization section 63 when inversely quantizing the transform coefficient data of the enhancement layer for the respective blocks of the enhancement layer. Here, the blocks can have a size equal to or smaller than that of the LCU.

For example, the QP setting section 92 computes the quantization parameter for the luma component by adding a residual indicated by cu_qp_delta_abs and cu_qp_delta_sign to a predicted value of the quantization parameter predicted for each CU using pic_init_qp_minus26 and slice_qp_delta. Then, the QP setting section 92 outputs the computed quantization parameter to the inverse quantization section 63.

In addition, the QP setting section 92 sets the quantization parameter offsets of the enhancement layer for the chroma components based on the quantization parameter offsets of the base layer. The quantization parameter offsets of the Cb component and the Cr component of the enhancement layer cbE_qp_offset and crE_qp_offset may be respectively generated according to, for example, the following expressions (9) and (10):

[Math 7]

$$cbE\_qp\_offset = slice\_cbE\_qp\_offset + cbB\_qp\_offset \quad (9)$$

$$crE\_qp\_offset = slice\_crE\_qp\_offset + crB\_qp\_offset \quad (10)$$

In the expressions (9) and 10), the first terms on the right sides are the quantization parameter offset differences slice_cbE_qp_offset and slice_crE_qp_offset acquired by the QP parameter acquisition section 91. The second terms on the right sides are the quantization parameter offsets cbB_qp_offset and crB_qp_offset of the base layer. In a first technique, the quantization parameter offsets cbB_qp_offset and crB_qp_offset of the base layer are each equal to the sum of the offset of the picture unit and the offset of the slice unit as shown in the following expressions (11) and (12).

[Math 8]

$$cbB\_qp\_offset = pic\_cb\_qp\_offset + slice\_cb\_qp\_offset \quad (11)$$

$$crB\_qp\_offset = pic\_cr\_qp\_offset + slice\_cr\_qp\_offset \quad (12)$$

In a second technique, the quantization parameter offsets cbB_qp_offset and crB_qp_offset of the base layer are each equal to the offsets of the picture unit as shown in the following expressions (13) and (14).

[Math 9]

$$cbB\_qp\_offset = pic\_cb\_qp\_offset \quad (13)$$

$$crB\_qp\_offset = pic\_cr\_qp\_offset \quad (14)$$

In both techniques, the quantization parameter offsets cbB_qp_offset and crB_qp_offset of the base layer are decided from the QP parameters of the base layer buffered by the common memory 7.

The QP setting section 92 computes the quantization parameters of the chroma components of the enhancement layer by inputting the sum of the quantization parameter offsets computed according to one of the above-described techniques and the quantization parameter of the luma component into a predetermined relational expression. The relational expression used here is described in Non-Patent Literature 1 described above. Then, the QP setting section 92 outputs the computed quantization parameter to the inverse quantization section 63.

Note that, when the QP parameter reuse flag acquired by the QP parameter acquisition section 91 indicates that the quantization parameter offsets should be reused for the chroma components (i.e., the quantization parameter offsets of the enhancement layer should be set based on the quantization parameter offsets of the base layer), the QP setting section 92 may execute the above-described process with respect to the chroma components. When the QP parameter reuse flag does not indicate that the quantization parameter offsets should be reused, the QP setting section 92 can set the quantization parameter offsets of the chroma components of the enhancement layer without referring to the quantization parameter offsets of the base layer.

(3) SL Parameter Acquisition Section

The SL parameter acquisition section 93 acquires an SL parameter decoded by the lossless decoding section 62 from an encoded stream of an enhancement layer when a base layer is encoded in an image coding scheme other than the HEVC scheme (for example, the AVC scheme). For example, when the base layer is encoded in the AVC scheme, the SL parameter acquisition section 93 acquires SL parameters which designate quantization matrixes having the sizes of 16×16 pixels and 32×32 pixels. In addition, even when the quantization matrixes are not reused in the layers, the SL parameter acquisition section 93 acquires the SL parameters decoded by the lossless decoding section 62 from the encoded stream of the enhancement layer. In this case, the SL parameters which designate the quantization matrixes having the sizes of 4×4 pixels to 32×32 pixels are acquired. Note that the SL parameters of the quantization matrixes having the sizes equal to or greater than 16×16 pixels are typically encoded after down-sampling each of the quantization matrixes to have the size of 8×8 pixels as described using FIG. 9B. The SL parameter acquisition section 93 outputs the acquired SL parameters of the enhancement layer to the SL setting section 94. Note that, when the quantization matrixes are reused in the layers and the base layer is encoded in the HEVC scheme, the SL parameter acquisition section 93 may not acquire the SL parameters of the enhancement layer. The SL parameter acquisition section 93 can determine whether or not the base layer has been encoded in the HEVC scheme with reference to a flag avc_base_layer_flag decoded from a VPS.

Furthermore, when a quantization matrix reuse flag and a setting technique flag have been decoded by the lossless decoding section 62, the SL parameter acquisition section 93 may output the decoded quantization matrix reuse flag and setting technique flag to the SL setting section 94.

(4) SL Setting Section

The SL setting section 94 sets quantization matrixes to be used by the inverse quantization section 63 when the transform coefficient data of the luma component and the chroma components of the enhancement layer is inversely quantized for the enhancement layer.

For example, the SL setting section 94 acquires the quantization matrixes of the base layer having the sizes of 4×4 pixels and 8×8 pixels from the common memory 7 when the base layer is encoded in the HEVC scheme or the AVC scheme. For example, the SL setting section 94 may duplicate the corresponding quantization matrixes of the enhancement layer from the acquired quantization matrixes of the base layer. Instead, the SL setting section 94 may predict the corresponding quantization matrixes of the enhancement layer from the acquired quantization matrixes of the base layer. In the latter case, a residual of the prediction of the quantization matrixes is additionally decoded from the encoded stream of the enhancement layer, and the residual can be added to the predicted quantization matrixes. The SL setting section 94 may choose whether the quantization matrixes of the enhancement layer should be duplicated or predicted according to the setting technique flag acquired by the SL parameter acquisition section 93.

When the base layer has been encoded in the HEVC scheme, the SL setting section 94 also acquires the quantization matrixes of the base layer having the sizes of 16×16 pixels and 32×32 pixels from the common memory 7. Then, the SL setting section 94 duplicates or predicts the corresponding quantization matrixes of the enhancement layer from the acquired quantization matrixes of the base layer. When the base layer has been encoded in the AVC scheme, the SL setting section 94 generates the respective quantization matrixes of the enhancement layer having the sizes of 16×16 pixels and 32×32 pixels according to the SL parameters input from the SL parameter acquisition section 93, not based on the quantization matrixes of the base layer.

Note that, when the quantization matrix reuse flag that can be acquired by the SL parameter acquisition section 93 indicates that the quantization matrixes are not reused (i.e., the quantization matrixes should be decoded from the encoded stream of the enhancement layer), the SL setting section 94 can generate all necessary quantization matrixes according to the SL parameters of the enhancement layer, not based on the quantization matrixes of the base layer. The quantization matrix reuse flag and the setting technique flag may be decoded from the encoded stream of the enhancement layer separately for different quantization matrix sizes, different prediction modes, or different color components.

5. Flow of a Process of Decoding According to an Embodiment 5-1. Schematic Flow

Figure 14:
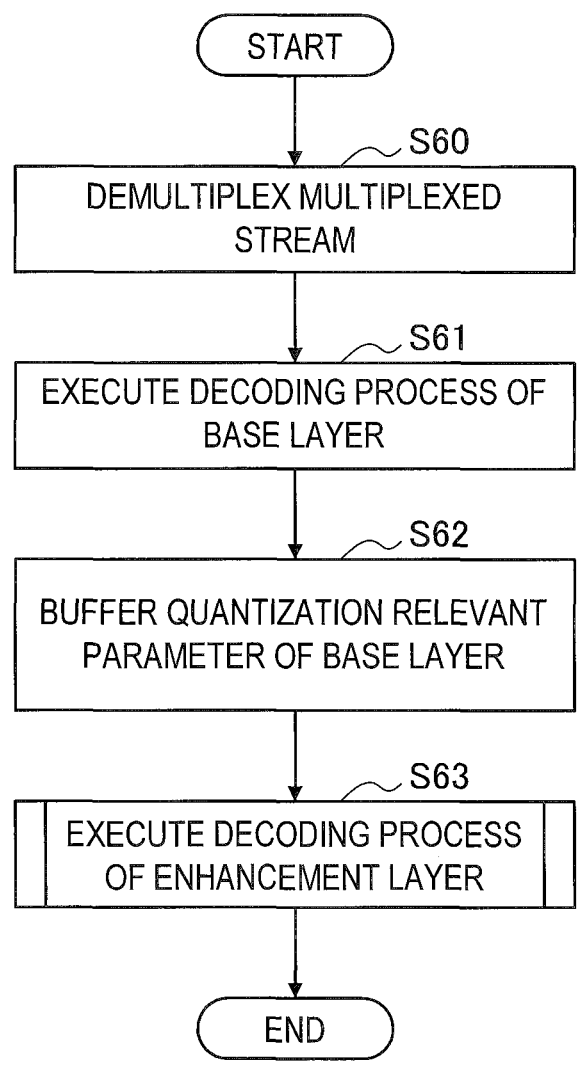
FIG. 14 is a flow chart showing an example of the flow of a schematic process for decoding according to an embodiment.

FIG. 14 is a flow chart showing an example of the flow of a schematic process for decoding according to an embodiment. For the sake of brevity of description, process steps not directly relevant to the technology in the present disclosure are omitted from the drawing.

Referring to FIG. 14, the demultiplexing section 5 first demultiplexes a multilayer multiplexed stream into an encoded stream of the base layer and an encoded stream of the enhancement layer (Step S60).

Next, the BL decoding section 6a performs a decoding process on the base layer to reconstruct a base layer image from the encoded steam of the base layer (Step S61).

The common memory 7 buffers quantization relevant parameters decoded in the decoding process of the base layer (Step S62). The quantization relevant parameters buffered here can include, for example, the quantization parameter offsets of the chroma components set for each block of the base layer and quantization matrixes.

Next, the EL decoding section 6b executes a decoding process of the enhancement layer using the information buffered by the common memory 7 to reconstruct an enhancement layer image (Step S63).

5-2. Process Relating to Inverse Quantization

Figure 15:
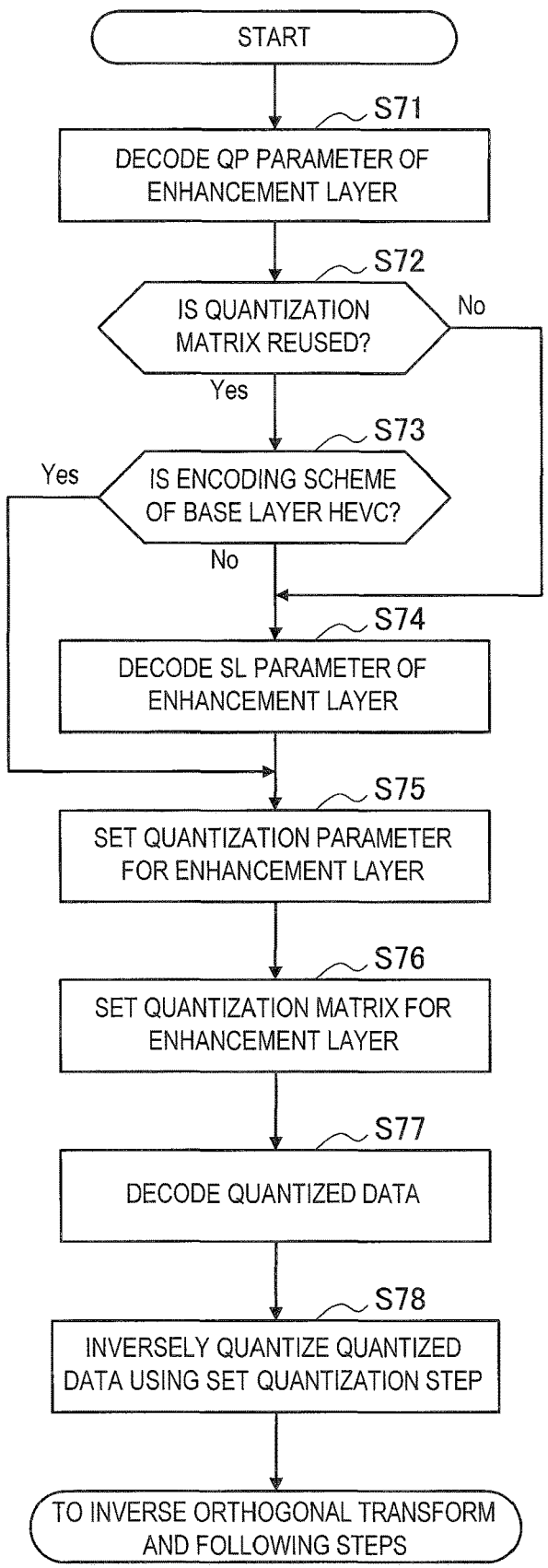
FIG. 15 is a flow chart showing an example of the flow of a process relating to inverse quantization in a decoding process on an enhancement layer.

FIG. 15 is a flow chart showing an example of the flow of a process relating to inverse quantization in the decoding process (Step S63 of FIG. 14) on the enhancement layer. The process shown in FIG. 15 can be repeated for, for example, each slice of the enhancement layer image.

Referring to FIG. 15, first, the QP parameter acquisition section 91 acquires QP parameters decoded by the lossless decoding section 62 from the encoded stream of the enhancement layer (Step S71). Then, the QP parameter acquisition section 91 outputs the acquired QP parameters of the enhancement layer to the QP setting section 92.

In addition, the SL parameter acquisition section 93 determines whether or not the quantization matrixes are reused in the layers by, for example, referring to the quantization matrix reuse flag (Step S72). When the quantization matrixes are reused in the layers, the SL parameter acquisition section 93 further determines whether or not the encoding scheme of the base layer is the HEVC scheme (Step S73). When the quantization matrixes are not reused in the layers or when the encoding scheme of the base layer is not the HEVC scheme, the SL parameter acquisition section 93 acquires SL parameters of the enhancement layer decoded by the lossless decoding section 62 from the encoded stream of the enhancement layer (Step S74). Then, the SL parameter acquisition section 93 outputs the acquired SL parameters of the enhancement layer to the SL setting section 94.

Next, the QP setting section 92 sets quantization parameters of the enhancement layer for each block of the enhancement layer (Step S75). For example, the QP setting section 92 computes quantization parameter offsets of the enhancement layer for the chroma components based on the quantization parameter offset differences indicated by the quantization parameter offsets and the QP parameters of the base layer. In addition, the QP setting section 92 inputs the sums of the computed quantization parameter offsets and the quantization parameter of the luma component into a predetermined relational expression to compute the quantization parameters of the enhancement layer. Then, the QP setting section 92 outputs the computed quantization parameters to the inverse quantization section 63.

Note that, when a QP parameter reuse flag does not indicate that the quantization parameter offsets of the base layer should be reused, the QP setting section 92 can set a quantization parameter offset indicated by the QP parameters for the enhancement layer without referring to the quantization parameter offsets of the base layer for the chroma components.

In addition, the SL setting section 94 sets quantization matrixes of the enhancement layer for each block of the enhancement layer (Step S76). For example, when the base layer has been encoded in the HEVC scheme or the AVC scheme, the SL setting section 94 can acquire the quantization matrixes of the base layer having the sizes of 4×4 pixels and 8×8 pixels from the common memory 7. In addition, when the base layer has been encoded in the HEVC scheme, the SL setting section 94 also acquires the quantization matrixes of the base layer having the sizes of 16×16 pixels and 32×32 pixels from the common memory 7. Then, the SL setting section 94 duplicates or predicts the corresponding quantization matrixes of the enhancement layer from the acquired quantization matrixes of the base layer to set the quantization matrixes of the enhancement layer. When the base layer has been encoded in the AVC scheme, the SL setting section 94 sets the quantization matrixes of the enhancement layer having the sizes of 16×16 pixels and 32×32 pixels according to the SL parameters input from the SL parameter acquisition section 93. Then, the SL setting section 94 outputs the set quantization matrixes to the inverse quantization section 63.

Note that, when the quantization matrix reuse flag indicates that the quantization matrixes of the base layer are not reused, the SL setting section 94 can set all necessary quantization matrixes of the enhancement layer according to the SL parameters input from the SL parameter acquisition section 93.

Next, the lossless decoding section 62 decodes the quantized data of the enhancement layer from the encoded stream of the enhancement layer (Step S77). Then, the lossless decoding section 62 outputs the decoded quantized data to the inverse quantization section 63.

Next, the inverse quantization section 63 inversely quantizes the quantized data of the enhancement layer using a quantization step decided from the quantization parameters (and the quantization matrixes) input from the inverse quantization control section 90 to restore the transform coefficient data (Step S78). Then, the inverse quantization section 63 outputs the restored transform coefficient data to the inverse orthogonal transform section 64.

Then, successive processes such as an inverse orthogonal transform, addition of a predicted image and a predicted error, and filtering are executed.

5-3. Example of Syntax (1) Basic Example

FIGS. 16A to 16C are illustrative diagrams for describing examples of syntax of an enhancement layer that can be employed for the technology according to the present disclosure. Herein, a QP parameter reuse flag and a quantization matrix reuse flag are encoded in a PPS of the enhancement layer.

FIGS. 16A and 16B illustrate syntax of a PPS as an example. In FIG. 16A, a QP parameter reuse flag "BL_chroma_qp_offset_flag is in the $15^{th}$ row. When the QP parameter reuse flag indicates "false," quantization parameter offsets are not reused in the layers, and the quantization parameter offsets "pic_cb_qp_offset" and "pic_cr_qp_offset" of the picture unit are encoded in the $18^{th}$ and $19^{th}$ rows. When the QP parameter reuse flag indicates "true," encoding of the quantization parameter offsets "pic_cb_qp_offset" and "pic_cr_qp_offset" of the picture unit is skipped.

In FIG. 16B, a function "scaling_list_data( )" for SL parameters of the enhancement layer is present in the $52^{nd}$ row. In FIG. 16C, specific syntax of the function "scaling_list_data( )" is shown. In FIG. 16C, a quantization matrix reuse flag "BL_scaling_list_flag" is present in the $2^{nd}$ row. When the quantization matrix reuse flag indicates "true," the quantization matrixes are reused in the layers. When the quantization matrix reuse flag indicates "true" and the base layer is encoded in the AVC scheme, however, only the quantization matrixes having the sizes of 4×4 pixels and 8×8 pixels are reused (see the $7^{th}$ row; "sizeID=0" means the size of 4×4 pixels and "sizeID=1" means the size of 8×8 pixels). When the quantization matrixes are not reused, the SL parameter which designates a quantization matrix of the enhancement layer is encoded from the $8^{th}$ row.

Note that the syntax described herein is merely an example. The QP parameter reuse flag and the quantization matrix reuse flag, for example, may each be encoded in the header region other than the PPS (for example, an SPS or the like). In addition, when the quantization matrixes are reused, the PPS may include the above-described setting technique flag or residual data obtained when the quantization matrixes are predicted.

(2) Modified Examples

FIGS. 16D and 16E each illustrate modified examples of syntax of the enhancement layer. In these modified examples, SL parameters encoded by the EL encoding section 1b and decoded by the EL decoding section 6b include reference layer information as described using FIG. 9D.

In the first modified example shown in FIG. 16D, a single common piece of the reference layer information is encoded in a plurality of sizes and a plurality of types of the quantization matrixes. The flag copy_scaling_list_from_ref_layer_flag in the $3^{rd}$ row of the extension of the SPS (sps_extension( )) of FIG. 16D is a quantization matrix reuse flag indicating whether or not a quantization matrix of the enhancement layer should be generated based on a quantization matrix of a subordinate layer designated by the reference layer information. When the quantization matrix reuse flag indicates "true," the reference layer information scaling_list_ref_layer in the $5^{th}$ row is further encoded. As an example, the reference layer information scaling_list_ref_layer may designate a subordinate layer which serves as a basis of duplication or prediction of a quantization matrix using a layer number (for example, a 6-bit integer with no symbol or the like) given to a reference target layer. Extension of a PPS (pps_extension( )) can also include the same reference layer information of the syntax as the extension of the SPS.

In the second modified example shown in FIG. 16E, different kinds of reference layer information are encoded for each size and type of the quantization matrixes. The functions scaling_list_extension( )) in the $3^{rd}$ row of the extension of the SPS and in the $3^{rd}$ row of the extension of the PPS of FIG. 16E define syntax for reference layer information. The $2^{nd}$ row of the function scaling_list_extension( ) means iteration with respect to about 4 sizes of quantization matrixes specified by a variable sizeId. The following $3^{rd}$ row means iteration with respect to about 6 types of quantization matrixes specified by a variable matrixId (since a maximum size of a chroma component is 16×16 pixels, there are only about two types thereof with respect to 32×32 pixels). The flag copy_scaling_list_from_ref_layer_flag[sizeId][matrixId] in the $4^{th}$ row in each iteration is a quantization matrix reuse flag indicating that a quantization matrix should be reused in the layers. When the quantization matrix reuse flag indicates "true," the reference layer information scaling_list_ref_layer[sizeId][matrixId] in the $6^{th}$ row is further encoded. Here, the reference layer information may also designate a subordinate layer which serves as a basis of duplication or prediction of the quantization matrix using, for example, a layer number given to the reference target layer.

Note that when the quantization matrixes are reused only in layers which share an image coding scheme as described using FIG. 9C, and the lowermost base layer is encoded in the AVC scheme, the reference layer information can indicate a layer number other than the number of the lowermost base layer (for example, zero) (generally in SHVC, only the lowermost layer is a layer that can be encoded in the AVC scheme).

If the reference layer information as described above is introduced here, by flexibly selecting a quantization matrix to be reused from a plurality of subordinate layers, an optimum quantization matrix can be used in enhancement layers and thus coding efficiency can be effectively enhanced.

6. Example of a Combination of Codecs

The technology according to the present disclosure can be applied to scalable video coding with various combinations of codecs. The number of layers to be multiplexed may be any number equal to or greater than 2. When a combination of codecs which are not standardized is used, however, there can be a possibility of the decoder not operating normally. Thus, only combinations of codecs which are defined in advance may be permitted to be hierarchically encoded. Instead, several combinations of codecs may be prohibited from being hierarchically encoded.

Figure 17A:
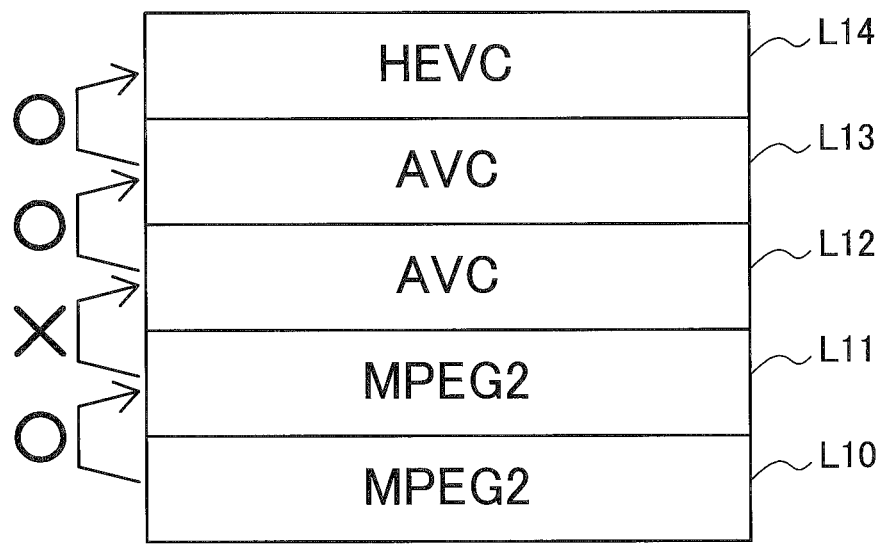
FIG. 17A is a first illustrative diagram for describing a combination of codecs which can be permitted or prohibited.
Figure 17B:
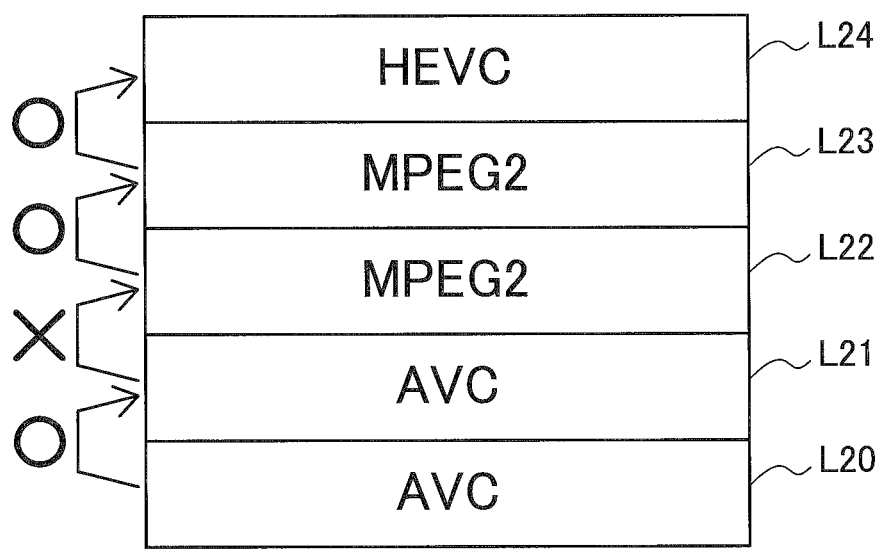
FIG. 17B is a second illustrative diagram for describing a combination of codecs which can be permitted or prohibited.

FIGS. 17A and 17B are illustrative diagrams for describing combinations of codecs which can be permitted or prohibited.

Referring to FIG. 17A, five layers from a lowermost first layer L10 to an uppermost fifth layer L14 are shown. The first layer L10 and the second layer L11 are encoded in the MPEG2 scheme. The third layer L12 and the fourth layer L13 are encoded in the AVC scheme. The fifth layer L14 is encoded in the HEVC scheme. Among these layers, hierarchical encoding of the first layer L10 and the second layer L11 is permitted due to their shared codec. Hierarchical encoding of the second layer L11 and the third layer L12 can be prohibited due to the fact that the combination of the MPEG2 scheme and the AVC scheme is not standardized. Hierarchical encoding of the third layer L12 and the fourth layer L13 is permitted due to their shared codec. Hierarchical encoding of the fourth layer L13 and the fifth layer L14 is permitted due to the fact that the combination of the AVC scheme and the HEVC scheme is standardized. In the example of FIG. 17A, a multiplexed stream of the first layer L10 and the second layer L11 and a multiplexed stream of the third layer L12, the fourth layer L13 and the fifth layer L14 can be multiplexed using simulcast coding, rather than scalable video coding.

Referring to FIG. 17B, five layers from a lowermost first layer L20 to an uppermost fifth layer L24 are shown. The first layer L20 and the second layer L21 are encoded in the AVC scheme. The third layer L22 and the fourth layer L23 are encoded in the MPEG2 scheme. The fifth layer L24 is encoded in the HEVC scheme. Among these layers, hierarchical encoding of the first layer L20 and the second layer L21 is permitted due to their shared codec. Hierarchical encoding of the second layer L21 and the third layer L22 can be prohibited due to the fact that the combination of the AVC scheme and the MPEG2 scheme is not standardized. Hierarchical encoding of the third layer L22 and the fourth layer L23 is permitted due to their shared codec. Hierarchical encoding of the fourth layer L23 and the fifth layer L24 is permitted due to the fact that the combination of the MPEG2 scheme and the HEVC scheme is standardized. In the example of FIG. 17B, a multiplexed stream of the first layer L20 and the second layer L21 and a multiplexed stream of the third layer L22, the fourth layer L23 and the fifth layer L24 can be multiplexed using simulcast coding rather than scalable video coding.

7. Application Example

7-1. Application to Various Products

The image encoding device 10 and the image decoding device 60 according to the embodiment described above can be applied to various electronic appliances such as a transmitter and a receiver for satellite broadcasting, cable broadcasting of a cable TV, distribution on the Internet, distribution to terminals via cellular communication, and the like, a recording device that records images in a medium such as an optical disc, a magnetic disk or a flash memory, a reproduction device that reproduces images from such storage media, and the like. Four application examples will be described below

(1) First Application Example

Figure 18:
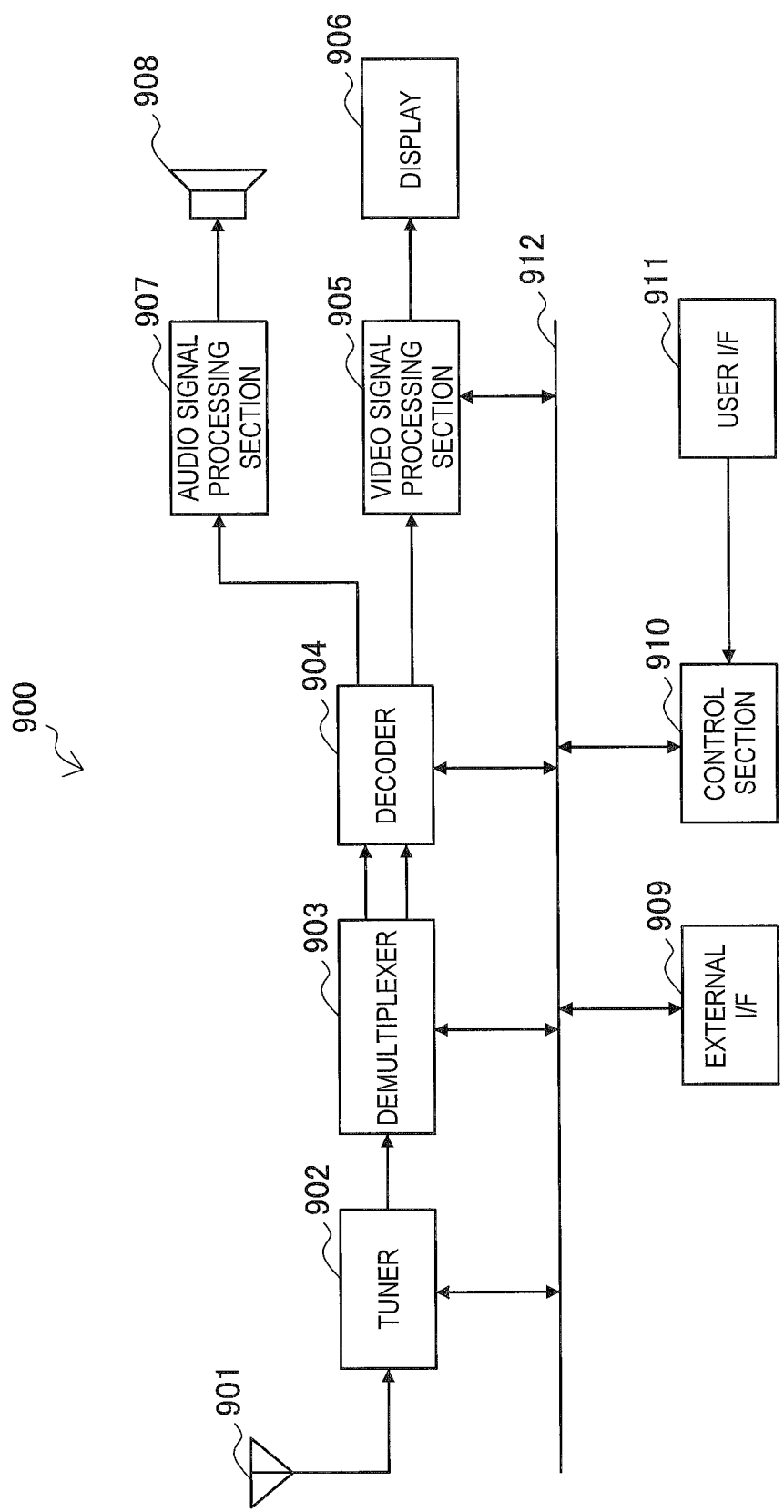
FIG. 18 is a block diagram showing an example of a schematic configuration of a television.

FIG. 18 illustrates an example of a schematic configuration of a television device to which the aforementioned embodiment is applied. A television device 900 includes an antenna 901, a tuner 902, a demultiplexer 903, a decoder 904, a video signal processing section 905, a display 906, an audio signal processing section 907, a speaker 908, an external interface 909, a control section 910, a user interface 911, and a bus 912.

The tuner 902 extracts a signal of a desired channel from a broadcast signal received through the antenna 901 and demodulates the extracted signal. The tuner 902 then outputs an encoded bit stream obtained by the demodulation to the demultiplexer 903. That is, the tuner 902 has a role as a transmission means receiving the encoded stream in which an image is encoded, in the television device 900.

The demultiplexer 903 separates a video stream and an audio stream of a program to be viewed from the encoded bit stream and outputs each of the separated streams to the decoder 904. The demultiplexer 903 also extracts auxiliary data such as an electronic program guide (GEP) from the encoded bit stream and supplies the extracted data to the control section 910. Here, the demultiplexer 903 may descramble the encoded bit stream when it is scrambled.

The decoder 904 decodes the video stream and the audio stream that are input from the demultiplexer 903. The decoder 904 then outputs video data generated by the decoding process to the video signal processing section 905. Furthermore, the decoder 904 outputs audio data generated in the decoding process to the audio signal processing section 907.

The video signal processing section 905 reproduces the video data input from the decoder 904 and displays the video on the display 906. The video signal processing section 905 may also display an application screen supplied through the network on the display 906. The video signal processing section 905 may further perform an additional process, for example, noise reduction on the video data according to the setting. Furthermore, the video signal processing section 905 may generate an image of a graphical user interface (GUI) such as a menu, a button, or a cursor and superpose the generated image onto the output image.

The display 906 is driven by a drive signal supplied from the video signal processing section 905 and displays video or an image on a video screen of a display device (such as a liquid crystal display, a plasma display, or an OLED).

The audio signal processing section 907 performs a reproduction process such as D-A conversion and amplification on the audio data input from the decoder 904 and outputs the audio from the speaker 908. The audio signal processing section 907 may also perform an additional process such as noise reduction on the audio data.

The external interface 909 is an interface for connecting the television device 900 with an external device or a network. For example, the decoder 904 may decode a video stream or an audio stream received through, for example, the external interface 909. In other words, the external interface 909 also has a role as the transmission means receiving the encoded stream in which an image is encoded, in the television device 900.

The control section 910 includes a processor such as a central processing unit (CPU) and a memory such as a random access memory (RAM) and a read only memory (ROM). The memory stores a program executed by the CPU, program data, EPG data, and data acquired through the network. The program stored in the memory is read by the CPU at the start-up of the television device 900 and executed, for example. By executing the program, the CPU controls operations of the television device 900 in accordance with an operation signal that is input from the user interface 911, for example.

The user interface 911 is connected to the control section 910. The user interface 911 includes a button and a switch for a user to operate the television device 900 as well as a reception part of a remote control signal, for example. The user interface 911 detects a user operation through these components, generates the operation signal, and outputs the generated operation signal to the control section 910.

The bus 912 connects the tuner 902, the demultiplexer 903, the decoder 904, the video signal processing section 905, the audio signal processing section 907, the external interface 909, and the control section 910 to each other.

The decoder 904 in the television device 900 configured in the aforementioned manner has a function of the image decoding device 60 according to the aforementioned embodiment. Thus, when the television device 900 decodes an image with a multi-layer codec, coding efficiency can be enhanced by reusing quantization relevant parameters in layers.

(2) Second Application Example

Figure 19:
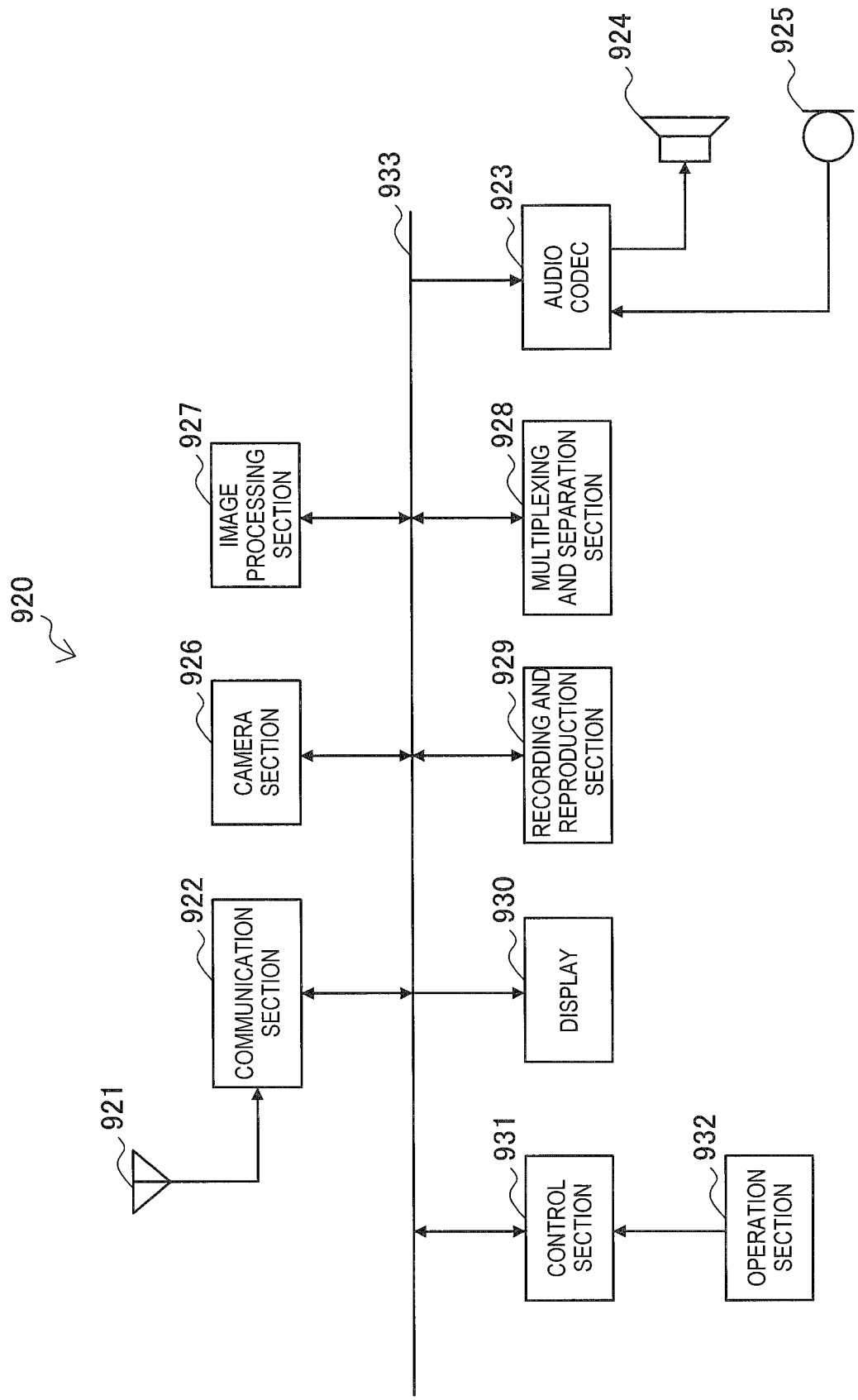
FIG. 19 is a block diagram showing an example of a schematic configuration of a mobile phone.

FIG. 19 illustrates an example of a schematic configuration of a mobile telephone to which the aforementioned embodiment is applied. A mobile telephone 920 includes an antenna 921, a communication section 922, an audio codec 923, a speaker 924, a microphone 925, a camera section 926, an image processing section 927, a multiplexing and separation section 928, a recording and reproduction section 929, a display 930, a control section 931, an operation section 932, and a bus 933.

The antenna 921 is connected to the communication section 922. The speaker 924 and the microphone 925 are connected to the audio codec 923. The operation section 932 is connected to the control section 931. The bus 933 connects the communication section 922, the audio codec 923, the camera section 926, the image processing section 927, the multiplexing and separation section 928, the recording and reproduction section 929, the display 930, and the control section 931 to each other.

The mobile telephone 920 performs operations such as transmitting/receiving an audio signal, transmitting/receiving an electronic mail or image data, imaging an image, and recording data in various operation modes including an audio call mode, a data communication mode, a photography mode, and a videophone mode.

In the audio call mode, an analog audio signal generated by the microphone 925 is supplied to the audio codec 923. The audio codec 923 then converts the analog audio signal into audio data, performs A-D conversion on the converted audio data, and compresses the data. The audio codec 923 thereafter outputs the compressed audio data to the communication section 922. The communication section 922 encodes and modulates the audio data to generate a transmission signal. The communication section 922 then transmits the generated transmission signal to a base station (not illustrated) through the antenna 921. Furthermore, the communication section 922 amplifies a radio signal received through the antenna 921, converts a frequency of the signal, and acquires a reception signal. The communication section 922 thereafter demodulates and decodes the reception signal to generate the audio data and output the generated audio data to the audio codec 923. The audio codec 923 decompresses the audio data, performs D-A conversion on the data, and generates the analog audio signal. The audio codec 923 then outputs the audio by supplying the generated audio signal to the speaker 924.

In addition, in the data communication mode, for example, the control section 931 generates character data constituting an electronic mail, in accordance with a user operation through the operation section 932. The control section 931 further causes characters to be displayed on the display 930. Moreover, the control section 931 generates electronic mail data in accordance with a transmission instruction from a user through the operation section 932 and outputs the generated electronic mail data to the communication section 922. The communication section 922 encodes and modulates the electronic mail data to generate a transmission signal. Then, the communication section 922 transmits the generated transmission signal to the base station (not illustrated) through the antenna 921. The communication section 922 further amplifies a radio signal received through the antenna 921, converts a frequency of the signal, and acquires a reception signal. The communication section 922 thereafter demodulates and decodes the reception signal, restores the electronic mail data, and outputs the restored electronic mail data to the control section 931. The control section 931 causes the content of the electronic mail to be displayed on the display 930 as well as the electronic mail data to be stored in a storage medium of the recording and reproduction section 929.

The recording and reproduction section 929 includes an arbitrary readable and writable storage medium. For example, the storage medium may be a built-in storage medium such as a RAM or a flash memory, or may be an externally-mounted storage medium such as a hard disk, a magnetic disk, a magneto-optical disc, an optical disc, a USB memory, or a memory card.

In the photography mode, for example, the camera section 926 images an object, generates image data, and outputs the generated image data to the image processing section 927. The image processing section 927 encodes the image data input from the camera section 926 and stores an encoded stream in the storage medium of the recording and reproduction section 929.

In addition, in the videophone mode, for example, the multiplexing and separation section 928 multiplexes a video stream encoded by the image processing section 927 and an audio stream input from the audio codec 923, and outputs the multiplexed streams to the communication section 922. The communication section 922 encodes and modulates the streams to generate a transmission signal. The communication section 922 then transmits the generated transmission signal to the base station (not illustrated) through the antenna 921. Moreover, the communication section 922 amplifies a radio signal received through the antenna 921, converts a frequency of the signal, and acquires a reception signal. The transmission signal and the reception signal can include an encoded bit stream. Then, the communication section 922 demodulates and decodes the reception signal to restore the stream, and outputs the restored stream to the multiplexing and separation section 928. The multiplexing and separation section 928 separates the video stream and the audio stream from the input stream and outputs the video stream and the audio stream to the image processing section 927 and the audio codec 923, respectively. The image processing section 927 decodes the video stream to generate video data. The video data is then supplied to the display 930, and thereby the display 930 displays a series of images. The audio codec 923 decompresses and performs D-A conversion on the audio stream to generate an analog audio signal. The audio codec 923 then supplies the generated audio signal to the speaker 924 to output the audio.

The image processing section 927 in the mobile telephone 920 configured in the aforementioned manner has a function of the image encoding device 10 and the image decoding device 60 according to the aforementioned embodiment. Thus, when the mobile telephone 920 encodes or decodes an image with a multi-layer codec, coding efficiency can be enhanced by reusing quantization relevant parameters in layers.

(3) Third Application Example

Figure 20:
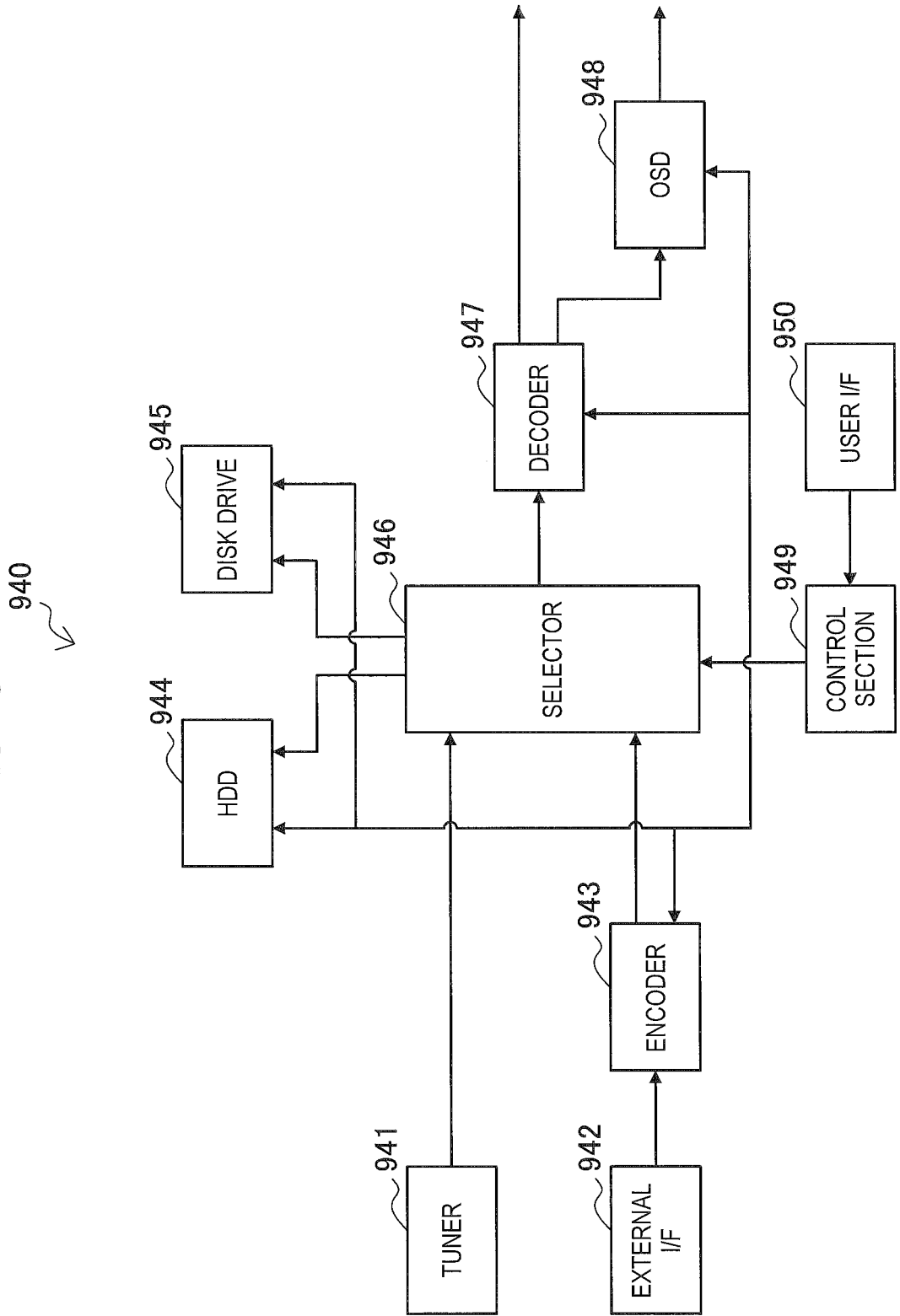
FIG. 20 is a block diagram showing an example of a schematic configuration of a recording and reproduction device.

FIG. 20 illustrates an example of a schematic configuration of a recording and reproduction device to which the aforementioned embodiment is applied. The recording and reproduction device 940 encodes audio data and video data of a received broadcast program and records the data into a recording medium, for example. The recording and reproduction device 940 may also encode audio data and video data acquired from another device and record the data into the recording medium, for example. In addition, in response to a user instruction, for example, the recording and reproduction device 940 reproduces the data recorded in the recording medium on a monitor and from a speaker. The recording and reproduction device 940 at this time decodes the audio data and the video data.

The recording and reproduction device 940 includes a tuner 941, an external interface 942, an encoder 943, a hard disk drive (HDD) 944, a disk drive 945, a selector 946, a decoder 947, an on-screen display (OSD) 948, a control section 949, and a user interface 950.

The tuner 941 extracts a signal of a desired channel from a broadcast signal received through an antenna (not illustrated) and demodulates the extracted signal. The tuner 941 then outputs an encoded bit stream obtained from the demodulation to the selector 946. That is, the tuner 941 has a role as a transmission means in the recording and reproduction device 940.

The external interface 942 is an interface for connecting the recording and reproduction device 940 with an external device or a network. The external interface 942 may be, for example, an IEEE 1394 interface, a network interface, a USB interface, or a flash memory interface. The video data and the audio data received through the external interface 942 are input to the encoder 943, for example. That is, the external interface 942 has a role as a transmission means in the recording and reproduction device 940.

The encoder 943 encodes the video data and the audio data when the video data and the audio data input from the external interface 942 are not encoded. The encoder 943 thereafter outputs an encoded bit stream to the selector 946.

The HDD 944 records the encoded bit stream in which content data such as video and audio is compressed, various programs, and other data into an internal hard disk. In addition, the HDD 944 reads these data from the hard disk when reproducing the video and the audio.

The disk drive 945 records and reads data into and from a recording medium which is mounted to the disk drive. The recording medium mounted to the disk drive 945 may be, for example, a DVD disk (such as DVD-Video, DVD-RAM, DVD-R, DVD-RW, DVD+R, or DVD+RW) or a Blu-ray (registered trademark) disk.

The selector 946 selects the encoded bit stream input from the tuner 941 or the encoder 943 when recording the video and audio, and outputs the selected encoded bit stream to the HDD 944 or the disk drive 945. In addition, when reproducing the video and audio, the selector 946 outputs the encoded bit stream input from the HDD 944 or the disk drive 945 to the decoder 947.

The decoder 947 decodes the encoded bit stream to generate the video data and the audio data. Then, the decoder 947 outputs the generated video data to the OSD 948. In addition, the decoder 904 outputs the generated audio data to an external speaker.

The OSD 948 reproduces the video data input from the decoder 947 and displays the video. The OSD 948 may also superpose an image of a GUI, for example, a menu, a button, or a cursor on the displayed video.

The control section 949 includes a processor such as a CPU and a memory such as a RAM and a ROM. The memory stores a program executed by the CPU as well as program data. The program stored in the memory is read by the CPU at the start-up of the recording and reproduction device 940 and executed, for example. By executing the program, the CPU controls operations of the recording and reproduction device 940 in accordance with an operation signal that is input from the user interface 950, for example.

The user interface 950 is connected to the control section 949. The user interface 950 includes a button and a switch for a user to operate the recording and reproduction device 940 as well as a reception part of a remote control signal, for example. The user interface 950 detects a user operation through these components, generates the operation signal, and outputs the generated operation signal to the control section 949.

The encoder 943 in the recording and reproduction device 940 configured in the aforementioned manner has a function of the image encoding device 10 according to the aforementioned embodiment. In addition, the decoder 947 has a function of the image decoding device 60 according to the aforementioned embodiment. Thus, when the recording and reproduction device 940 encodes or decodes an image with a multi-layer codec, coding efficiency can be enhanced by reusing quantization relevant parameters in layers.

(4) Fourth Application Example

Figure 21:
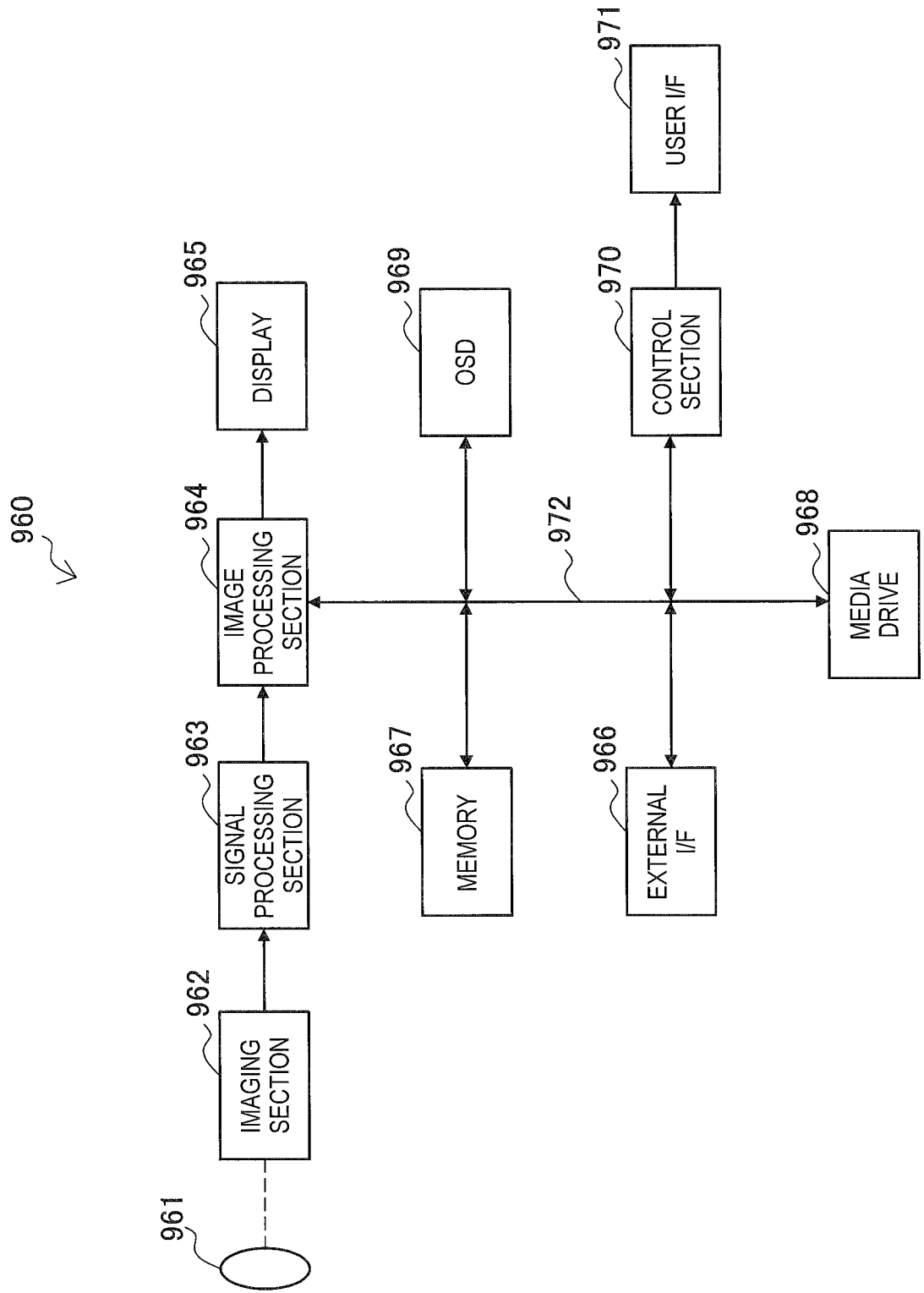
FIG. 21 is a block diagram showing an example of a schematic configuration of an imaging device.

FIG. 21 illustrates an example of a schematic configuration of an imaging device to which the aforementioned embodiment is applied. The imaging device 960 images an object, generates an image, encodes image data, and records the data into a recording medium.

The imaging device 960 includes an optical block 961, an imaging section 962, a signal processing section 963, an image processing section 964, a display 965, an external interface 966, a memory 967, a media drive 968, an OSD 969, a control section 970, a user interface 971, and a bus 972.

The optical block 961 is connected to the imaging section 962. The imaging section 962 is connected to the signal processing section 963. The display 965 is connected to the image processing section 964. The user interface 971 is connected to the control section 970. The bus 972 connects the image processing section 964, the external interface 966, the memory 967, the media drive 968, the OSD 969, and the control section 970 to each other.

The optical block 961 includes a focus lens and a diaphragm mechanism. The optical block 961 forms an optical image of a subject on an imaging surface of the imaging section 962. The imaging section 962 includes an image sensor such as a CCD or a CMOS and performs photoelectric conversion to convert the optical image formed on the imaging surface into an image signal as an electric signal. Then, the imaging section 962 outputs the image signal to the signal processing section 963.

The signal processing section 963 performs various camera signal processes such as knee correction, gamma correction and color correction on the image signal input from the imaging section 962. The signal processing section 963 outputs the image data, on which the camera signal process has been performed, to the image processing section 964.

The image processing section 964 encodes the image data input from the signal processing section 963 to generate the encoded data. The image processing section 964 then outputs the generated encoded data to the external interface 966 or the media drive 968. The image processing section 964 also decodes the encoded data input from the external interface 966 or the media drive 968 to generate image data. The image processing section 964 then outputs the generated image data to the display 965. Moreover, the image processing section 964 may output to the display 965 the image data input from the signal processing section 963 to display the image. Furthermore, the image processing section 964 may superpose display data acquired from the OSD 969 on the image that is output on the display 965.

The OSD 969 generates an image of a GUI, for example, a menu, a button, or a cursor and outputs the generated image to the image processing section 964.

The external interface 966 is configured as a USB input and output terminal, for example. The external interface 966 connects the imaging device 960 with a printer when printing an image, for example. Moreover, a drive is connected to the external interface 966 as needed. A removable medium such as a magnetic disk or an optical disc is mounted to the drive, for example, so that a program read from the removable medium can be installed in the imaging device 960. The external interface 966 may also be configured as a network interface that is connected to a network such as a LAN or the Internet. That is, the external interface 966 has a role as a transmission means in the imaging device 960.

The recording medium mounted to the media drive 968 may be an arbitrary readable and writable removable medium, for example, a magnetic disk, a magneto-optical disc, an optical disc, or a semiconductor memory. Furthermore, the recording medium may be fixedly mounted to the media drive 968 so that a non-transportable storage unit such as a built-in hard disk drive or a solid state drive (SSD) is configured, for example.

The control section 970 includes a processor such as a CPU and a memory such as a RAM and a ROM. The memory stores a program executed by the CPU as well as program data. The program stored in the memory is read by the CPU at, for example, the start-up of the imaging device 960 and then executed. By executing the program, the CPU controls operations of the imaging device 960 in accordance with an operation signal that is input from the user interface 971, for example.

The user interface 971 is connected to the control section 970. The user interface 971 includes a button and a switch for a user to operate the imaging device 960, for example. The user interface 971 detects a user operation through these components, generates the operation signal, and outputs the generated operation signal to the control section 970.

The image processing section 964 in the imaging device 960 configured in the aforementioned manner has the functions of the image encoding device 10 and the image decoding device 60 according to the aforementioned embodiment. Thus, when the imaging device 960 encodes or decodes an image with a multi-layer codec, coding efficiency can be enhanced by reusing quantization relevant parameters in layers.

7-2. Various Uses of Scalable Video Coding

Advantages of scalable video coding described above can be brought to various uses. Three use examples will be described below.

(1) First Example

Figure 22:
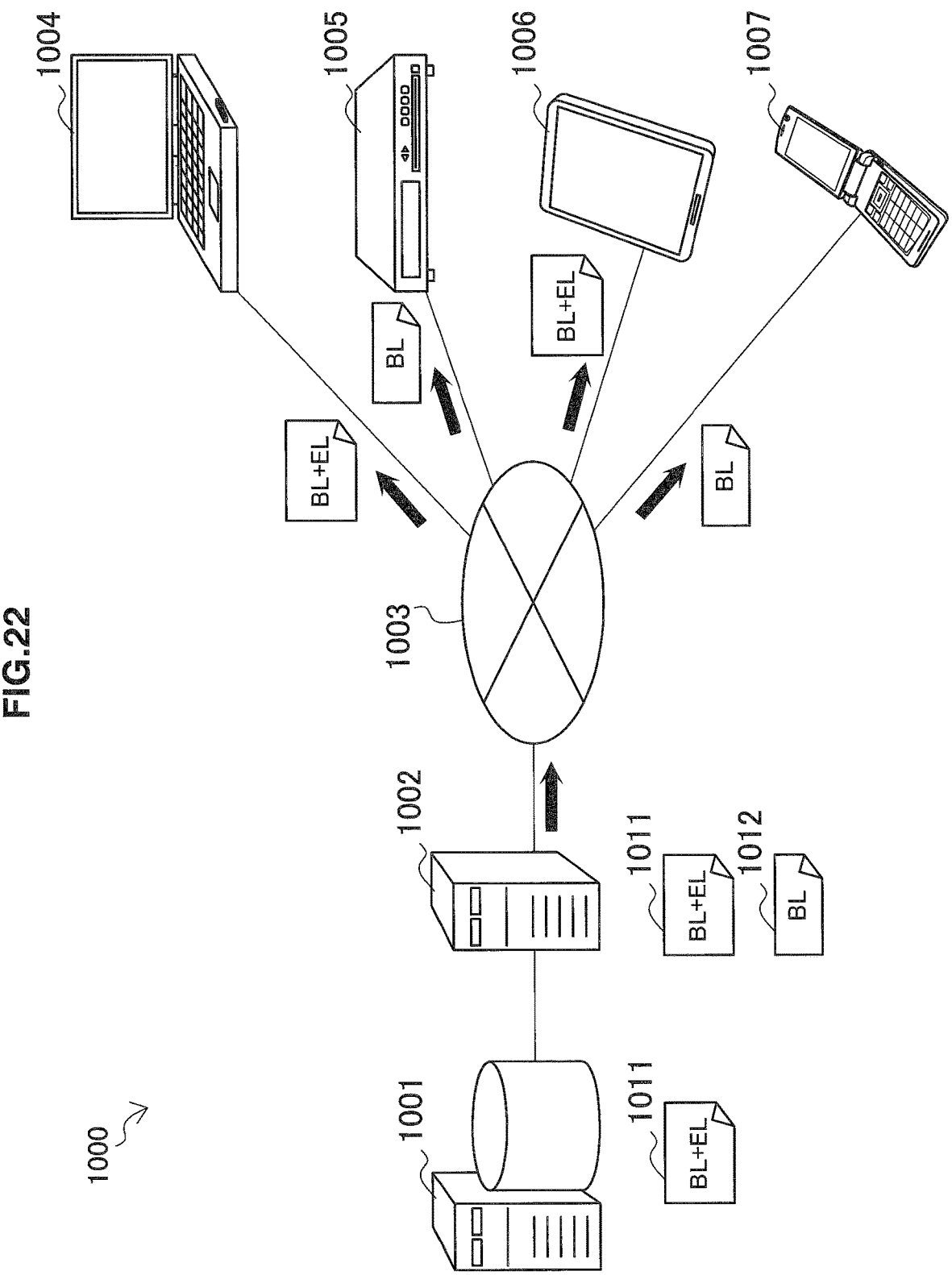
FIG. 22 is an illustrative diagram for describing a first example of use of the scalable video coding.

In the first example, scalable video coding is used for selective transmission of data. Referring to FIG. 22, a data transmission system 1000 includes a stream storage device 1001 and a delivery server 1002. The delivery server 1002 is connected to some terminal devices via a network 1003. The network 1003 may be a wired network or a wireless network or a combination thereof. FIG. 22 shows a personal computer (PC) 1004, an AV device 1005, a tablet device 1006, and a mobile phone 1007 as examples of the terminal devices.

The stream storage device 1001 stores, for example, stream data 1011 including a multiplexed stream generated by the image encoding device 10. The multiplexed stream includes an encoded stream of the base layer (BL) and an encoded stream of an enhancement layer (EL). The delivery server 1002 reads the stream data 1011 stored in the stream storage device 1001 and delivers at least a portion of the read stream data 1011 to the PC 1004, the AV device 1005, the tablet device 1006, and the mobile phone 1007 via the network 1003.

When a stream is delivered to a terminal device, the delivery server 1002 selects the stream to be delivered based on some conditions such as capabilities of the terminal device or a communication environment. For example, the delivery server 1002 may avoid a delay in a terminal device or an occurrence of overflow or overload of a processor by delivering no encoded stream having high image quality exceeding image quality that can be handled by the terminal device. In addition, the delivery server 1002 may also avoid occupation of communication bands of the network 1003 by delivering no encoded stream having high image quality. On the other hand, when there is no risk to be avoided or it is considered to be appropriate based on a user's contract or some conditions, the delivery server 1002 may deliver an entire multiplexed stream to a terminal device.

In the example of FIG. 22, the delivery server 1002 reads the stream data 1011 from the stream storage device 1001. Then, the delivery server 1002 delivers the stream data 1011 directly to the PC 1004 having high processing capabilities. Because the AV device 1005 has low processing capabilities, the delivery server 1002 generates stream data 1012 containing only an encoded stream of the base layer extracted from the stream data 1011 and delivers the stream data 1012 to the AV device 1005. The delivery server 1002 delivers the stream data 1011 directly to the tablet device 1006 capable of communication at a high communication rate without change. Because the mobile phone 1007 can communicate only at a low communication rate, the delivery server 1002 delivers the stream data 1012 containing only an encoded stream of the base layer to the mobile phone 1007.

By using the multiplexed stream in this manner, the amount of traffic to be transmitted can be adaptively adjusted. In addition, the code amount of the stream data 1011 is reduced when compared with a case when each layer is individually encoded and thus, even if the whole stream data 1011 is delivered, the load on the network 1003 can be lessened. Further, memory resources of the stream storage device 1001 are saved.

Hardware performance of the terminal devices is different from device to device. In addition, capabilities of applications run on the terminal devices are diverse. Further, communication capacities of the network 1003 are varied. Capacities available for data transmission may change every moment due to other traffic. Thus, before starting delivery of stream data, the delivery server 1002 may acquire terminal information about hardware performance and application capabilities of terminal devices and network information about communication capacities of the network 1003 through signaling with the delivery destination terminal device. Then, the delivery server 1002 can select the stream to be delivered based on the acquired information.

Incidentally, the layer to be decoded may be extracted by the terminal device. For example, the PC 1004 may display a base layer image extracted and decoded from a received multiplexed stream on the screen thereof. In addition, after generating the stream data 1012 by extracting an encoded stream of the base layer from the received multiplexed stream, the PC 1004 may cause a storage medium to store the generated stream data 1012 or transfer the stream data to another device.

The configuration of the data transmission system 1000 shown in FIG. 22 is only an example. The data transmission system 1000 may include any number of the stream storage device 1001, the delivery server 1002, the network 1003, and the terminal devices.

(2) Second Example

Figure 23:
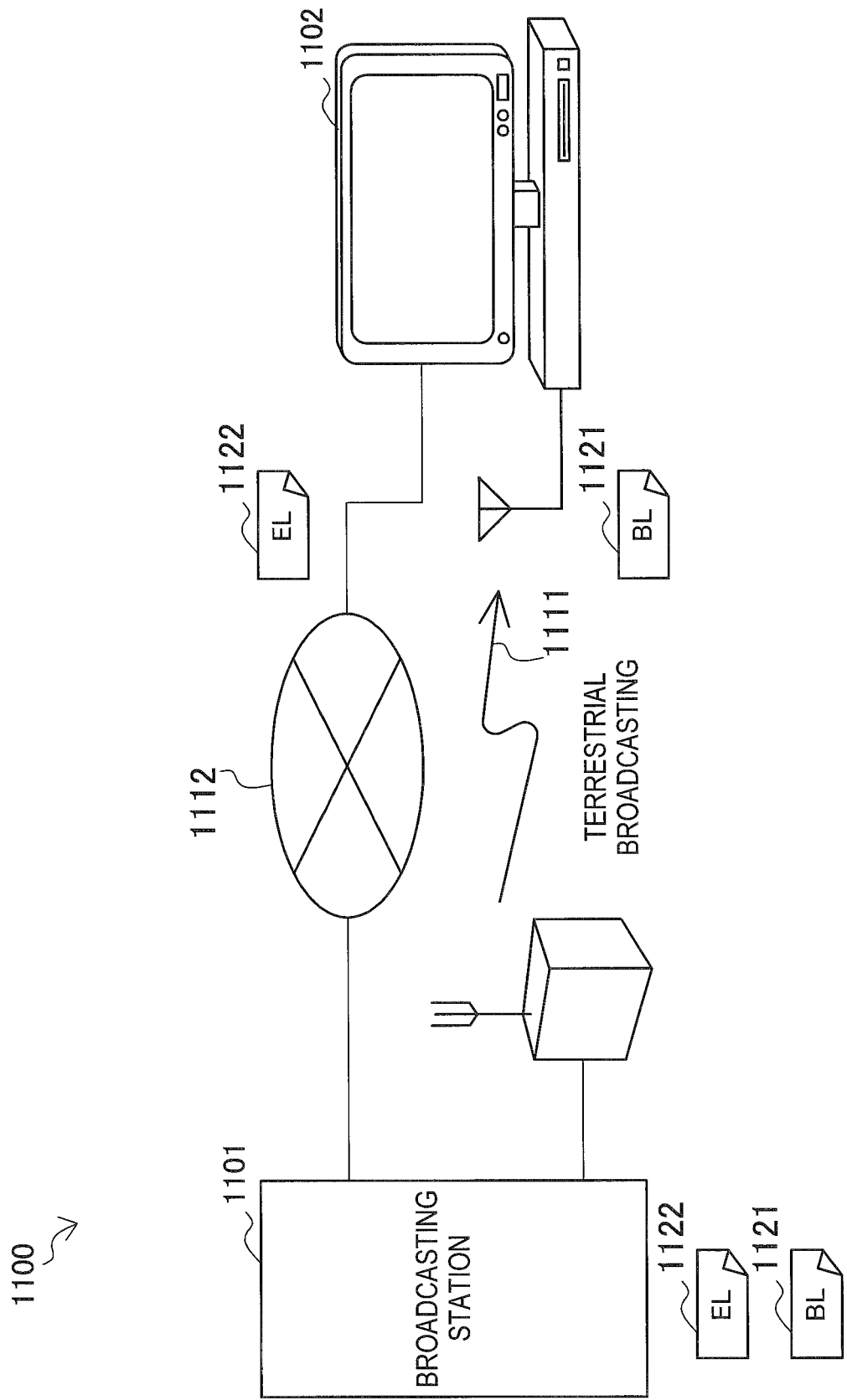
FIG. 23 is an illustrative diagram for describing a second example of use of the scalable video coding.

In the second example, scalable video coding is used for transmission of data via a plurality of communication channels. Referring to FIG. 23, a data transmission system 1100 includes a broadcasting station 1101 and a terminal device 1102. The broadcasting station 1101 broadcasts an encoded stream 1121 of the base layer on a terrestrial channel 1111. The broadcasting station 1101 also transmits an encoded stream 1122 of an enhancement layer to the terminal device 1102 via a network 1112.

The terminal device 1102 has a receiving function to receive terrestrial broadcasting broadcast by the broadcasting station 1101 and receives the encoded stream 1121 of the base layer via the terrestrial channel 1111. In addition, the terminal device 1102 also has a communication function to communicate with the broadcasting station 1101 and receives the encoded stream 1122 of the enhancement layer via the network 1112.

After receiving the encoded stream 1121 of the base layer, for example, in response to user's instructions, the terminal device 1102 may decode a base layer image from the received encoded stream 1121 and display the base layer image on the screen. Alternatively, the terminal device 1102 may cause a storage medium to store the decoded base layer image or transfer the base layer image to another device.

In addition, after receiving the encoded stream 1122 of the enhancement layer via the network 1112, for example, in response to user's instructions, the terminal device 1102 may generate a multiplexed stream by multiplexing the encoded stream 1121 of the base layer and the encoded stream 1122 of the enhancement layer. The terminal device 1102 may also decode an enhancement layer image from the encoded stream 1122 of an enhancement layer to display the enhancement layer image on the screen. Alternatively, the terminal device 1102 may cause a storage medium to store the decoded enhancement layer image or transfer the enhancement layer image to another device.

As described above, an encoded stream of each layer contained in a multiplexed stream can be transmitted via a different communication channel for each layer. Accordingly, a communication delay or an occurrence of overflow can be suppressed by distributing loads exerted on individual channels.

Furthermore, the communication channel to be used for transmission may be dynamically selected in accordance with some conditions. For example, the encoded stream 1121 of the base layer whose data amount is relatively large may be transmitted via a communication channel having a wider bandwidth and the encoded stream 1122 of the enhancement layer whose data amount is relatively small may be transmitted via a communication channel having a narrower bandwidth. In addition, the communication channel on which the encoded stream 1122 of a specific layer is transmitted may be switched in accordance with the bandwidth of the communication channel. Accordingly, the load exerted on individual channels can be suppressed more effectively.

Note that the configuration of the data transmission system 1100 illustrated in FIG. 23 is only an example. The data transmission system 1100 may include any number of communication channels and terminal devices. The configuration of the system described herein may also be applied to uses other than broadcasting.

(3) Third Example

Figure 24:
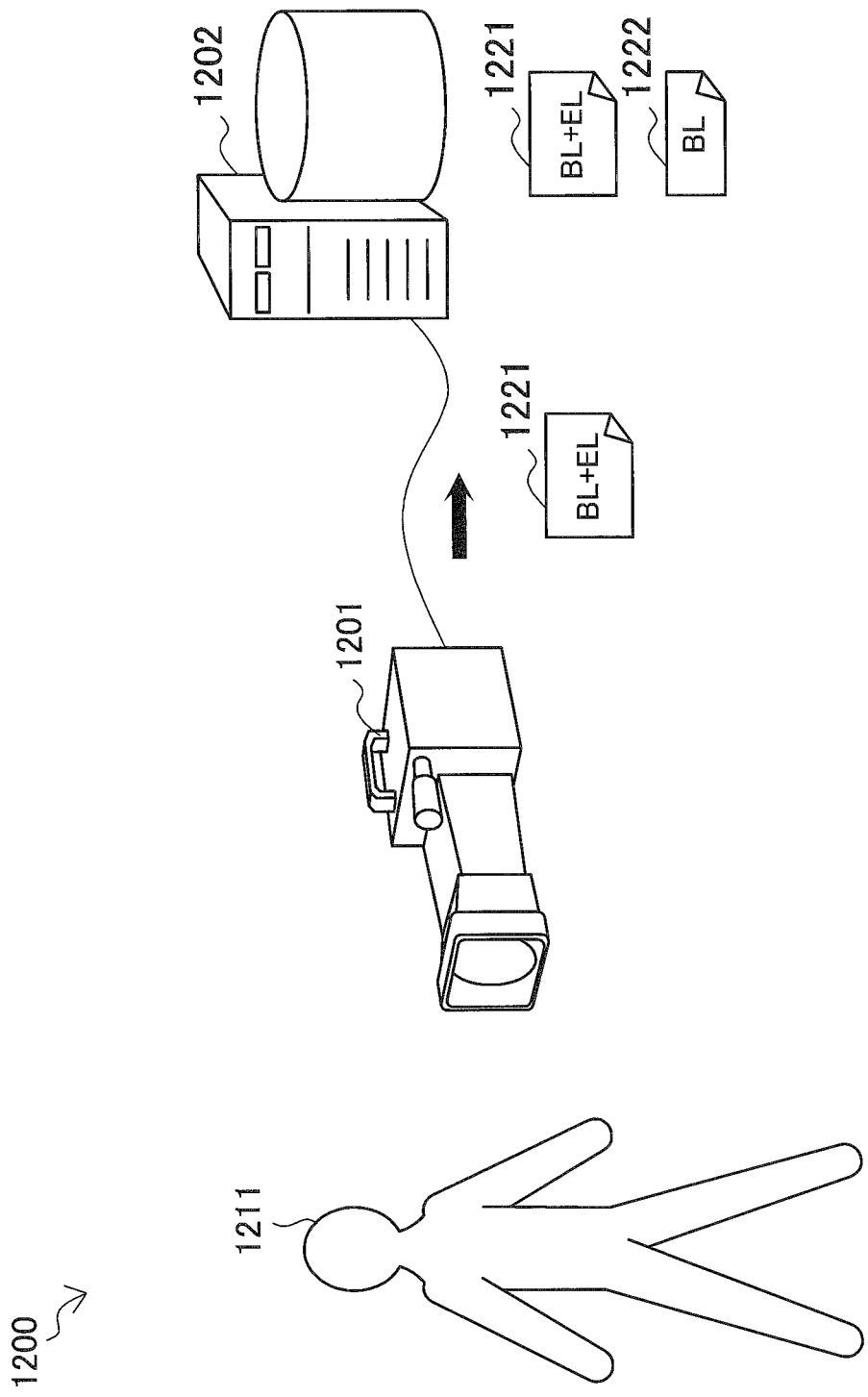
FIG. 24 is an illustrative diagram for describing a third example of use of the scalable video coding.

In the third example, scalable video coding is used for storage of videos. Referring to FIG. 24, a data transmission system 1200 includes an imaging device 1201 and a stream storage device 1202. The imaging device 1201 scalable-encodes image data generated with a subject 1211 being imaged to generate a multiplexed stream 1221. The multiplexed stream 1221 includes an encoded stream of the base layer and an encoded stream of an enhancement layer. Then, the imaging device 1201 supplies the multiplexed stream 1221 to the stream storage device 1202.

The stream storage device 1202 stores the multiplexed stream 1221 supplied from the imaging device 1201 in different image quality for each mode. For example, the stream storage device 1202 extracts the encoded stream 1222 of the base layer from the multiplexed stream 1221 in a normal mode and stores the extracted encoded stream 1222 of the base layer. On the other hand, in a high quality mode, the stream storage device 1202 stores the multiplexed stream 1221 as it is. Accordingly, the stream storage device 1202 can record a high-quality stream with a large amount of data only when recording of a video in high image quality is desired. Therefore, memory resources can be saved while the influence of image quality degradation on users is curbed.

For example, the imaging device 1201 is assumed to be a surveillance camera. When no surveillance object (for example, an intruder) appears in a captured image, the normal mode is selected. In this case, the captured image is likely to be unimportant and priority is given to the reduction of the amount of data so that the video is recorded in low image quality (that is, only the encoded stream 1222 of the base layer is stored). On the other hand, when a surveillance object (for example, the subject 1211 as an intruder) appears in a captured image, the high-quality mode is selected. In this case, the captured image is likely to be important and priority is given to high image quality so that the video is recorded in high image quality (that is, the multiplexed stream 1221 is stored).

In the example of FIG. 24, a mode is selected by the stream storage device 1202 based on, for example, an image analysis result. However, the present embodiment is not limited to such an example and the imaging device 1201 may select a mode. In the latter case, the imaging device 1201 may supply the encoded stream 1222 of the base layer to the stream storage device 1202 in the normal mode and the multiplexed stream 1221 to the stream storage device 1202 in the high-quality mode.

Any criteria are possible to select a mode. For example, a mode may be switched in accordance with the loudness of voice acquired through a microphone or the waveform of voice. In addition, a mode may also be periodically switched. Also, a mode may be switched in response to user's instructions. Further, the number of selectable modes may be any number as long as it does not exceed the number of hierarchized layers.

The configuration of the data transmission system 1200 illustrated in FIG. 24 is only an example. The data transmission system 1200 may include any number of the imaging device 1201. The configuration of the system described herein may also be applied to uses other than the surveillance camera.

7-3. Application to Other Codec (1) Application to a Multi-View Codec

Figure 25:
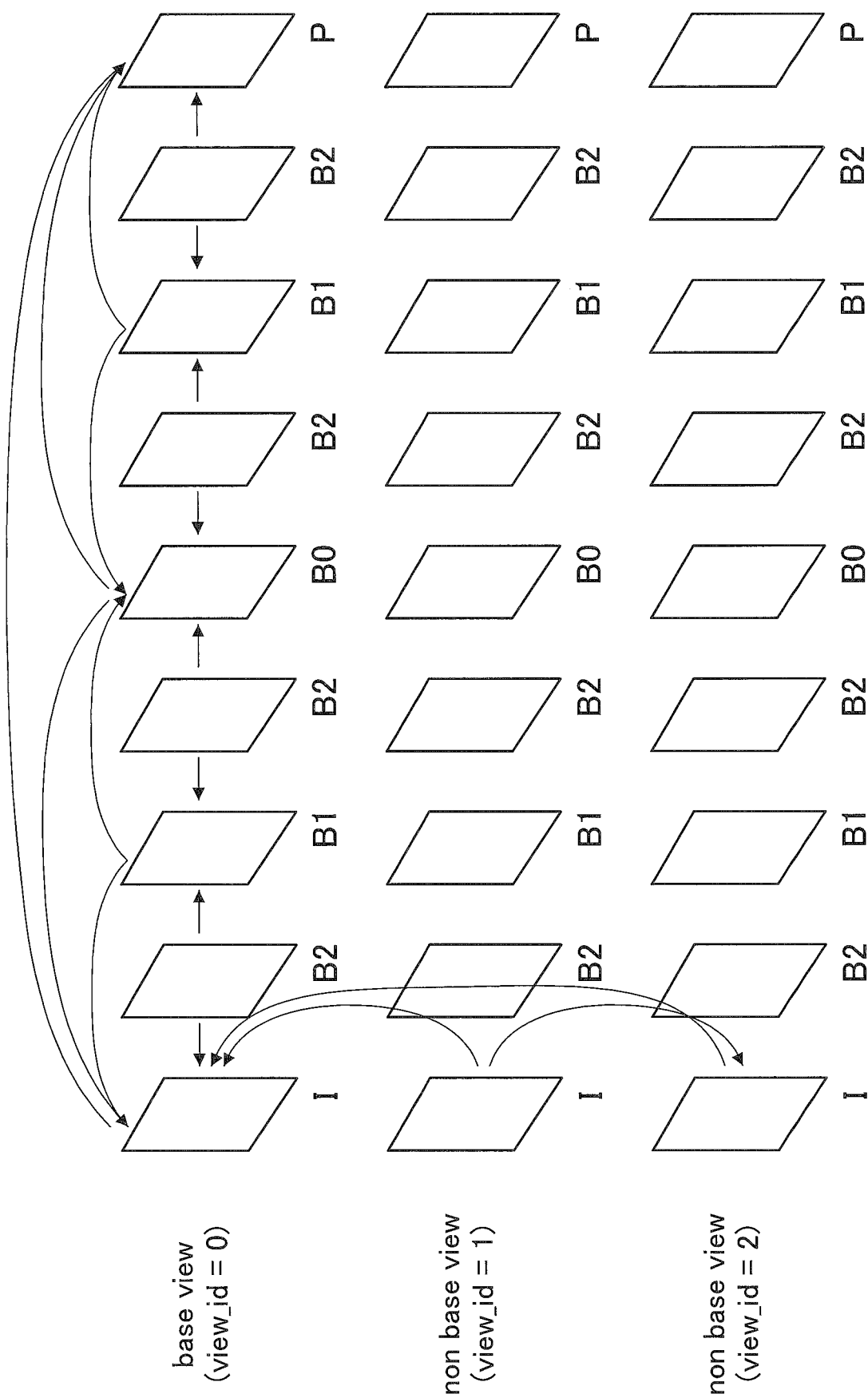
FIG. 25 is an illustrative diagram for describing a multi-view codec.

The multi-view codec is a kind of multi-layer codecs and is an image coding scheme to encode and decode so-called multi-view videos. FIG. 25 is an illustrative diagram for describing a multi-view codec. Referring to FIG. 25, sequences of three view frames captured from three viewpoints are shown. A view ID (view_id) is given to each view. Among a plurality of these views, one view is specified as the base view. Views other than the base view are called non-base views. In the example of FIG. 25, the view whose view ID is "0" is the base view and two views whose view ID is "1" or "2" are non-base views. When these views are hierarchically encoded, each view may correspond to a layer. As indicated by arrows in FIG. 25, an image of a non-base view is encoded and decoded by referring to an image of the base view (an image of the other non-base views may also be referred to).

Figure 26:
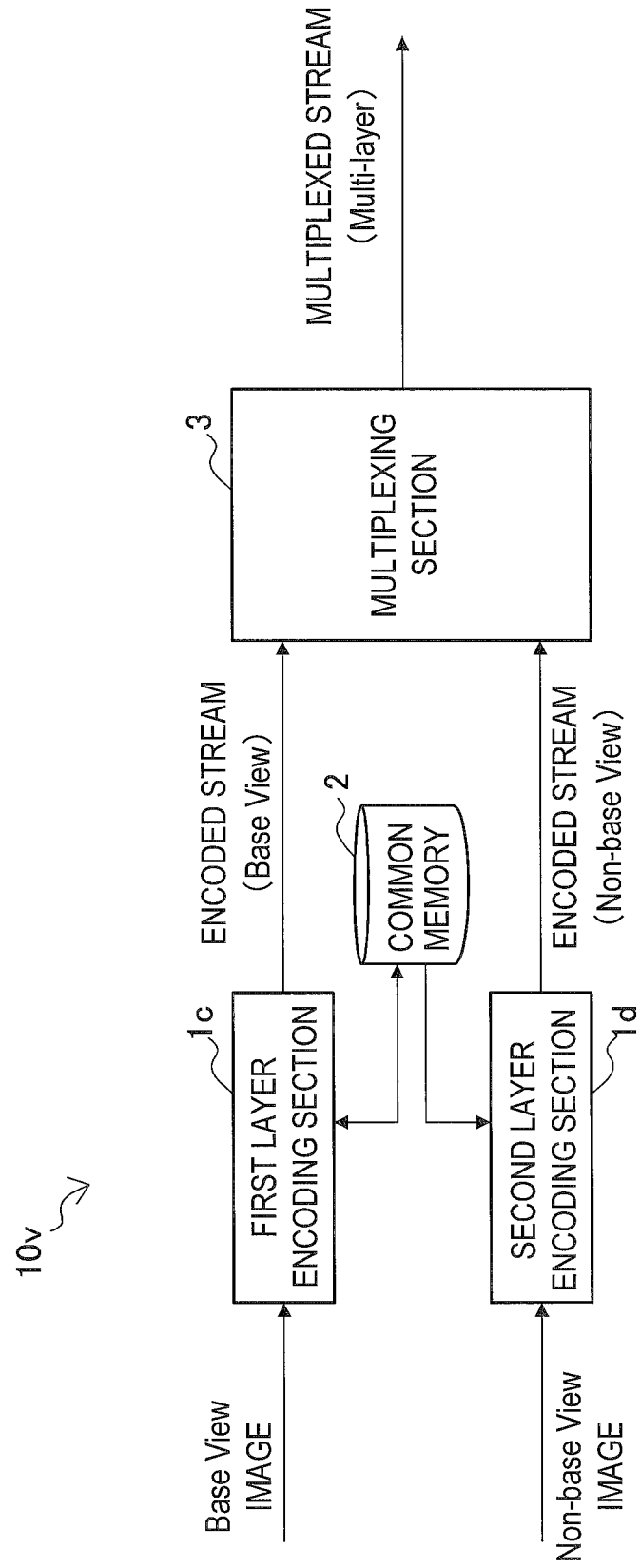
FIG. 26 is a block diagram showing a schematic configuration of an image encoding device for the multi-view codec.

FIG. 26 is a block diagram showing a schematic configuration of an image encoding device 10v supporting the multi-view codec. Referring to FIG. 26, the image encoding device 10v is provided with a first layer encoding section 1c, a second layer encoding section 1d, the common memory 2, and the multiplexing section 3.

The function of the first layer encoding section 1c is the same as that of the BL encoding section 1a described using FIG. 5 except that, instead of a base layer image, a base view image is received as input. The first layer encoding section 1c encodes the base view image to generate an encoded stream of a first layer. The function of the second layer encoding section 1d is the same as that of the EL encoding section 1b described using FIG. 5 except that, instead of an enhancement layer image, a non-base view image is received as input. The second layer encoding section 1d encodes the non-base view image to generate an encoded stream of a second layer. The common memory 2 stores information commonly used in the layers. The multiplexing section 3 multiplexes an encoded stream of the first layer generated by the first layer encoding section 1c and an encoded stream of the second layer generated by the second layer encoding section 1d to generate a multilayer multiplexed stream.

Figure 27:
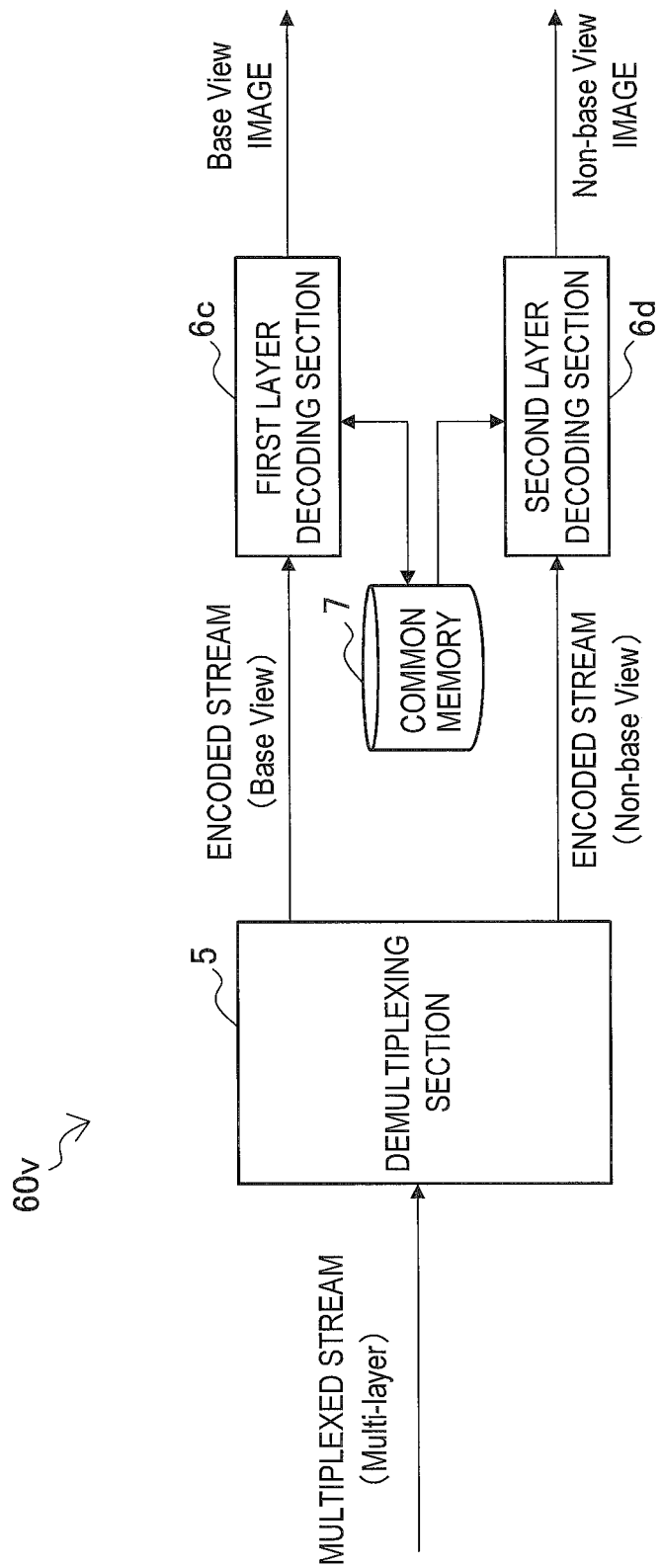
FIG. 27 is a block diagram showing a schematic configuration of an image decoding device for the multi-view codec.

FIG. 27 is a block diagram showing a schematic configuration of an image decoding device 60v supporting the multi-view codec. Referring to FIG. 27, the image decoding device 60v is provided with the demultiplexing section 5, a first layer decoding section 6c, a second layer decoding section 6d, and the common memory 7.

The demultiplexing section 5 demultiplexes a multilayer multiplexed stream into an encoded stream of the first layer and an encoded stream of the second layer. The function of the first layer decoding section 6c is the same as that of the BL decoding section 6a described using FIG. 6 except that an encoded stream in which, instead of a base layer image, a base view image is encoded is received as input. The first layer decoding section 6c decodes a base view image from the encoded stream of the first layer. The function of the second layer decoding section 6d is the same as that of the EL decoding section 6b described using FIG. 6 except that an encoded stream in which, instead of an enhancement layer image, a non-base view image is encoded is received as input. The second layer decoding section 6d decodes a non-base view image from the encoded stream of the second layer. The common memory 7 stores information commonly used in layers.

According to the technology of the present disclosure, when multi-view image data is encoded or decoded, an overall code amount can be reduced by reusing parameters relating to quantization of the base view in the non-base view. Accordingly, coding efficiency in a multi-view codec can be further improved as in cases of scalable video coding.

(2) Application to Streaming Technology

The technology of the present disclosure may also be applied to a streaming protocol. In Dynamic Adaptive Streaming over HTTP (MPEG-DASH), for example, a plurality of encoded streams having mutually different parameters such as resolution are prepared in a streaming server in advance. Then, the streaming server dynamically selects appropriate data to be streamed from the plurality of encoded streams in units of segments and delivers the selected data. Using such a streaming protocol, parameters relating to quantization of one encoded stream may be reused for other encoded streams.

7-4. Various Mounting Levels

The technology according to the present disclosure may be realized in various mounting levels, for example, a processor such as a system large scale integration (LSI), a module which uses a plurality of processors, a unit which uses a plurality of modules, or a set to which other functions are further added to a unit.

(1) Video Set

Figure 28:
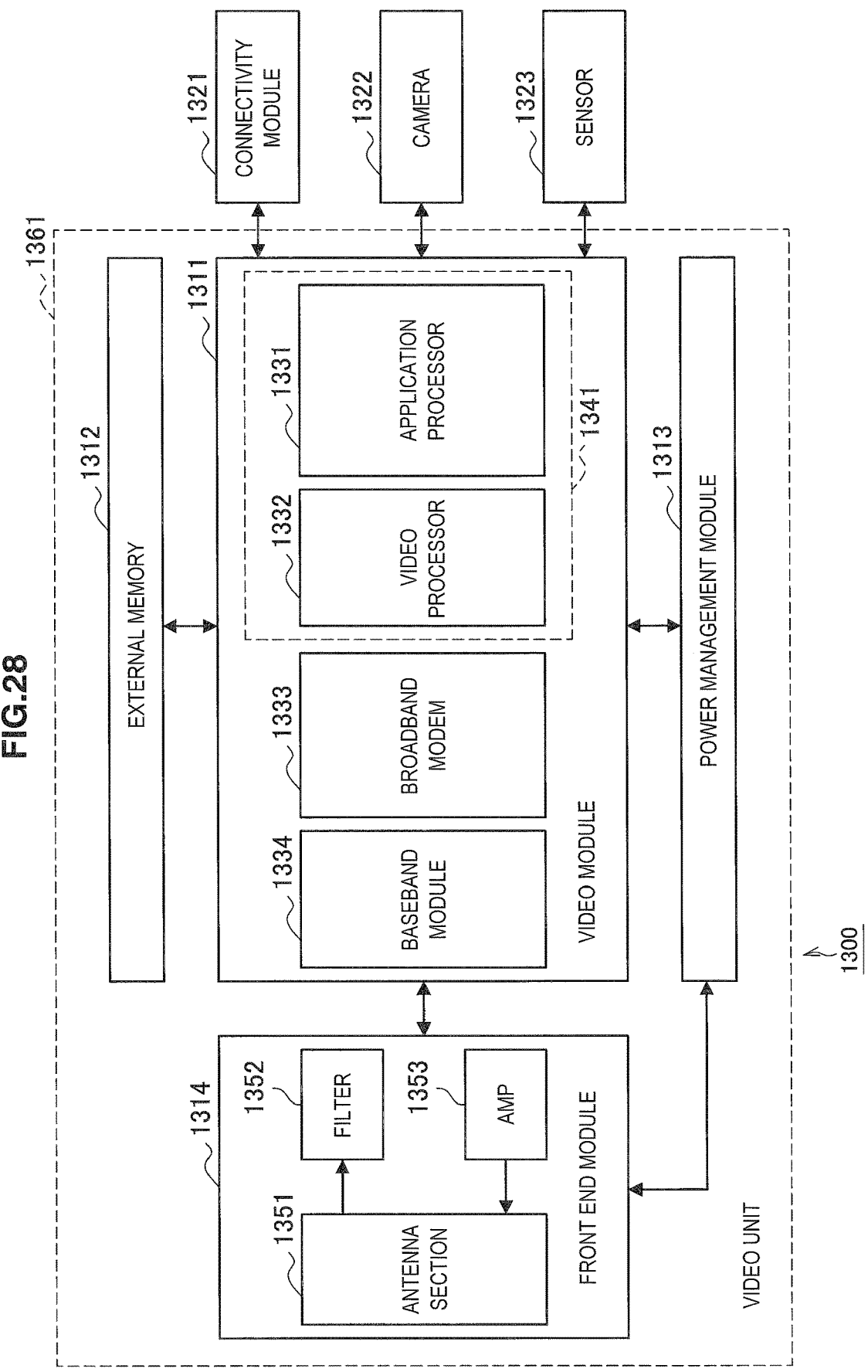
FIG. 28 is a block diagram showing an example of a schematic configuration of a video set.

An example in which the technology according to the present disclosure is realized as a set will be described with reference to FIG. 28. FIG. 28 is a block diagram showing an example of a schematic configuration of a video set.

In recent years, electronic apparatuses have become multifunctional. Development and manufacturing of an electronic apparatus are conducted with respect to individual functions, and then progress to a state in which the plurality of functions are integrated. Thus, there are business operators who manufacture or sell only parts of electronic apparatuses. Such a business operator provides a constituent element which has a single function or a plurality of functions which are related to each other, or provides a set which has an integrated function group. The video set 1300 illustrated in FIG. 28 is a set which integrally includes constituent elements for encoding and decoding (either of which is possible) of an image and constituent elements having other functions relating to the aforementioned functions.

Referring to FIG. 28, the video set 1300 has a module group which includes a video module 1311, an external memory 1312, a power management module 1313, and a front end module 1314, and a device group for relevant functions which includes a connectivity module 1321, a camera 1322, and a sensor 1323.

A module is a constituent element that is formed by integrating components for several functions relating to each other. A module may have any physical constitution. As an example, a module can be formed by integrally disposing a plurality of processors each having the same or different functions, an electric circuit element such as a resist or capacitor, and other devices on a circuit board. A different module may be formed by combining another module or a processor with the module.

In the example of FIG. 28, components for functions relating to image processing are integrated in the video module 1311. The video module 1311 has an application processor 1331, a video processor 1332, a broadband modem 1333, and a baseband module 1334.

A processor may be, for example, a system-on-a-chip (SOC) or system large scale integration (LSI). SoC or system LSI may include hardware in which predetermined logic is established. In addition, SoC or system LSI may include a CPU and a non-transitory tangible medium which stores a program for causing the CPU to execute predetermined functions. A program can be stored in, for example, a ROM, and executed by a CPU after being read by a random access memory (RAM) for its execution.

The application processor 1331 is a processor which executes an application relating to image processing. The application executed in the application processor 1331 may perform control of, for example, the video processor 1332 and other constituent elements, in addition to any arithmetic operation for image processing. The video processor 1332 is a processor having functions relating to encoding and decoding of images. Note that the application processor 1331 and the video processor 1332 may be integrated as one processor (see the dashed line 1341 in the drawing).

The broadband modem 1333 is a module which performs a process relating to communication via a network such as the Internet or a public switched telephone network. For example, the broadband modem 1333 executes digital modulation for converting a digital signal which includes transmission data into an analog signal and digital demodulation for converting an analog signal which includes reception data into a digital signal. The transmission data and the reception data processed by the broadband modem 1333 can include arbitrary information, for example, image data, an encoded stream of image data, application data, an application program, and setting data.

The baseband module 1334 is a module that performs baseband processing for radio frequency (RF) signals transmitted and received via the front end module 1314. For example, the baseband module 1334 modulates a transmitted baseband signal including transmission data and converts frequency thereof into an RF and then outputs the RF signal to the front end module 1314. In addition, the baseband module 1334 converts the frequency of an RF signal input from the front end module 1314 and demodulates the signal to generate a received baseband signal including reception data.

The external memory 1312 is a memory device which is provided outside the video module 1311 and is accessible from the video module 1311. When large-scale data such as video data which includes a large number of frames is stored in the external memory 1312, the external memory 1312 can include a relatively inexpensive and large-capacity semiconductor memory, for example, a dynamic random access memory (DRAM).

The power management module 1313 is a module which controls power supply to the video module 1311 and the front end module 1314.

The front end module 1314 is a module which is connected with the baseband module 1334 and provides front end functions. In the example of FIG. 28, the front end module 1314 has an antenna section 1351, a filter 1352, and an amplification section 1353. The antenna section 1351 has one or more antenna elements which transmit or receive radio signals and constituent elements relating to antenna switching and the like. The antenna section 1351 transmits an RF signal amplified by the amplification section 1353 as a radio signal. In addition, the antenna section 1351 outputs the RF signal received as a radio signal to the filter 1352, and then the RF signal is filtered by the filter 1352.

The connectivity module 1321 is a module having a function relating to external connection of the video set 1300. The connectivity module 1321 may support an arbitrary external connection protocol. The connectivity module 1321 may have, for example, a sub-module which supports a wireless connection protocol such as Bluetooth (registered trademark), IEEE802.11 (for example, Wi-Fi (registered trademark)), near field communication (NFC), or Infrared Data Association (IrDA) and a corresponding antenna. In addition, the connectivity module 1321 may have a submodule which supports a wired connection protocol such as a Universal Serial Bus (USB) or a High-Definition Multimedia Interface (HDMI) and a corresponding connection terminal.

In addition, the connectivity module 1321 may include a drive which performs writing of data on a storage medium such as a magnetic disk, an optical disc, a magneto-optical disc, or a semiconductor memory or a storage device such as a solid-state drive (SSD) or a network-attached storage (NAS) and reading of data from the storage medium. The connectivity module 1321 may include such a storage medium or storage device. In addition, the connectivity module 1321 may provide connectivity to a display which outputs images or a speaker which outputs sounds.

The camera 1322 is a module which acquires captured images by imaging subjects. A series of captured images acquired by the camera 1322 constitutes video data. The video data generated by the camera 1322 can be encoded by, for example, the video processor 1332 if necessary, and stored in the external memory 1312 or in a storage medium that is connected to the connectivity module 1321.

The sensor 1323 is a module which can include one or more of, for example, a GPS sensor, a sound sensor, an ultrasonic sensor, an optical sensor, an illuminance sensor, an infrared sensor, an angular velocity sensor, an angular acceleration sensor, a speed sensor, an acceleration sensor, a gyro sensor, a geomagnetic sensor, an impact sensor, and a temperature sensor. Sensor data generated by the sensor 1323 can be used for, for example, execution of an application by the application processor 1331.

In the video set 1300 configured as described above, the technology according to the present disclosure can be used in, for example, the video processor 1332. In this case, the video set 1300 is a set to which the technology according to the present disclosure is applied.

Note that the video set 1300 may be realized as different kinds of devices processing image data. For example, the video set 1300 may correspond to the television device 900, the mobile telephone 920, the recording and reproduction device 940 or the imaging device 960 described using FIGS. 18 to 21. In addition, the video set 1300 may correspond to a terminal device such as the PC 1004, the AV device 1005, the tablet device 1006 or the mobile phone 1007 in the data transmission system 1000 described using FIG. 22, the broadcasting station 1101 or the terminal device 1102 of the data transmission system 1100 described using FIG. 23, or the imaging device 1201 or the stream storage device 1202 of the data transmission system 1200 described using FIG. 24. Further, the video set 1300 may correspond to a content reproduction system to be exemplified in FIG. 31 or a device included in a wireless communication system to be exemplified in FIG. 40.

(2) Video Processor

Figure 29:
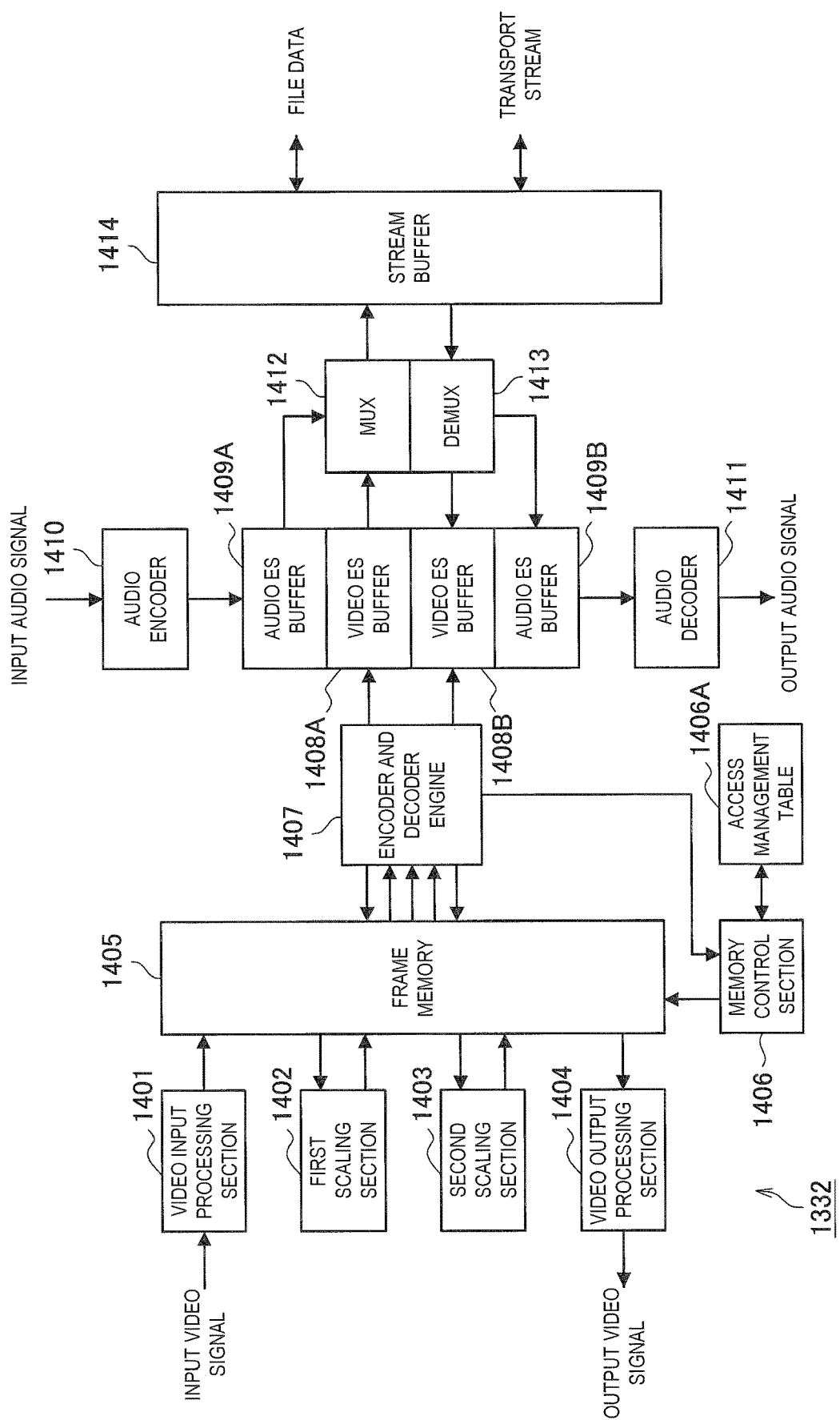
FIG. 29 is a block diagram showing an example of a schematic configuration of a video processor.

FIG. 29 is a block diagram showing an example of a schematic configuration of the video processor 1332. The video processor 1332 has a function of encoding an input video signal and an input audio signal and thereby generating video data and audio data, and a function of decoding the encoded video data and audio data and thereby generating an output video signal and an output audio signal.

Referring to FIG. 29, the video processor 1332 has a video input processing section 1401, a first scaling section 1402, a second scaling section 1403, a video output processing section 1404, a frame memory 1405, a memory control section 1406, an encoder and decoder engine 1407, video elementary stream (ES) buffers 1408A and 1408B, audio ES buffers 1409A and 1409B, an audio encoder 1410, an audio decoder 1411, a multiplexing section (MUX) 1412, a demultiplexing section (DEMUX) 1413, and a stream buffer 1414.

The video input processing section 1401 converts, for example, a video signal input from the connectivity module 1321 into digital image data. The first scaling section 1402 performs format conversion and scaling (enlargement or reduction) on the image data input from the video input processing section 1401. The second scaling section 1403 performs format conversion and scaling (enlargement or reduction) on the image data to be output to the video output processing section 1404. The format conversion performed by the first scaling section 1402 and the second scaling section 1403 may be conversion between, for example, the format of 4:2:2/Y-Cb-Cr and the format of 4:2:0/Y-Cb-Cr. The video output processing section 1404 converts digital image data into an output video signal, and outputs the output video signal to, for example, the connectivity module 1321.

The frame memory 1405 is a memory device for storing image data, and is shared by the video input processing section 1401, the first scaling section 1402, the second scaling section 1403, the video output processing section 1404, and the encoder and decoder engine 1407. The frame memory 1405 may be realized using, for example, a semiconductor memory such as a DRAM.

The memory control section 1406 controls access to the frame memory 1405 based on a synchronization signal input from the encoder and decoder engine 1407 according to an access schedule for the frame memory 1405 stored in an access management table 1406A. The access management table 1406A depends on processes executed by the encoder and decoder engine 1407, the first scaling section 1402, the second scaling section 1403, and the like, and is updated by the memory control section 1406.

The encoder and decoder engine 1407 performs an encoding process of encoding on image data to generate an encoded video stream and a decoding process for decoding image data from an encoded video stream. For example, the encoder and decoder engine 1407 encodes image data read from the frame memory 1405 and sequentially writes an encoded video stream on the video ES buffer 1408A. In addition, for example, the encoder and decoder engine sequentially reads an encoded video stream from the video ES buffer 1408B and writes the decoded image data on the frame memory 1405. The encoder and decoder engine 1407 can use the frame memory 1405 as a work area for the processes. The encoder and decoder engine 1407 outputs a synchronization signal to the memory control section 1406 at, for example, a timing at which a process of each largest coding unit (LCU) is started.

The video ES buffer 1408A buffers the encoded video stream generated by the encoder and decoder engine 1407. The encoded video stream buffered by the video ES buffer 1408A is output to the multiplexing section 1412. The video ES buffer 1408B buffers the encoded video stream input from the demultiplexing section 1413. The encoded video stream buffered by the video ES buffer 1408B is output to the encoder and decoder engine 1407.

The audio ES buffer 1409A buffers an encoded audio stream generated by the audio encoder 1410. The encoded audio stream buffered by the audio ES buffer 1409A is output to the multiplexing section 1412. The audio ES buffer 1409B buffers an encoded audio stream input from the demultiplexing section 1413. The encoded audio stream buffered by the audio ES buffer 1409B is output to the audio decoder 1411.

The audio encoder 1410 performs digital conversion on, for example, an input audio signal input from the connectivity module 1321, and encodes the input audio signal according to an audio encoding scheme, for example, an MPEG audio scheme or an audio code number 3 (AC3) scheme. The audio encoder 1410 sequentially writes an encoded audio stream on the audio ES buffer 1409A. The audio decoder 1411 decodes audio data from the encoded audio stream input from the audio ES buffer 1409B and converts the data into an analog signal. The audio decoder 1411 outputs, for example, an audio signal to the connectivity module 1321 as a reproduced analog audio signal.

The multiplexing section 1412 multiplexes an encoded video stream and an encoded audio stream to generate a multiplexed bit stream. A format of the multiplexed bit stream may be any format. The multiplexing section 1412 may add predetermined header information to the bit stream. In addition, the multiplexing section 1412 may convert the format of the stream. For example, the multiplexing section 1412 can generate a transport stream (a bit stream in a format for transport) obtained by multiplexing the encoded video stream and the encoded audio stream. In addition, the multiplexing section 1412 can generate file data (data in a format for recording) obtained by multiplexing the encoded video stream and the encoded audio stream.

The demultiplexing section 1413 demultiplexes an encoded video stream and an encoded audio stream from a multiplexed bit stream using a method opposite to multiplexing performed by the multiplexing section 1412. In other words, the demultiplexing section 1413 extracts (or separates) a video stream and an audio stream from a bit stream read from the stream buffer 1414. The demultiplexing section 1413 may convert (inversely convert) the format of a stream. For example, the demultiplexing section 1413 may acquire a transport stream which can be input from the connectivity module 1321 or the broadband modem 1333 via the stream buffer 1414, and convert the transport stream into a video stream and an audio stream. In addition, the demultiplexing section 1413 may acquire file data read from a storage medium by the connectivity module 1321 via the stream buffer 1414 and convert the file data into a video stream and an audio stream.

The stream buffer 1414 buffers a bit stream. For example, the stream buffer 1414 buffers a transport stream input from the multiplexing section 1412, and outputs the transport stream to, for example, the connectivity module 1321 or the broadband modem 1333 at a predetermined timing or according to a request from the outside. In addition, the stream buffer 1414, for example, buffers file data input from the multiplexing section 1412, and outputs the file data to, for example, the connectivity module 1321 for recording of the data at a predetermined timing or according to a request from the outside. Furthermore, the stream buffer 1414 buffers a transport stream acquired via, for example, the connectivity module 1321 or the broadband modem 1333, and outputs the transport stream to the demultiplexing section 1413 at a predetermined timing or according to a request from the outside. In addition, the stream buffer 1414 buffers file data read from a storage medium by, for example, the connectivity module 1321, and outputs the file data to the demultiplexing section 1413 at a predetermined timing or according to a request from the outside.

In the video processor 1332 configured as described above, the technology according to the present disclosure can be used in, for example, the encoder and decoder engine 1407. In this case, the video processor 1332 is a chip or a module to which the technology according to the present disclosure is applied.

Figure 30:
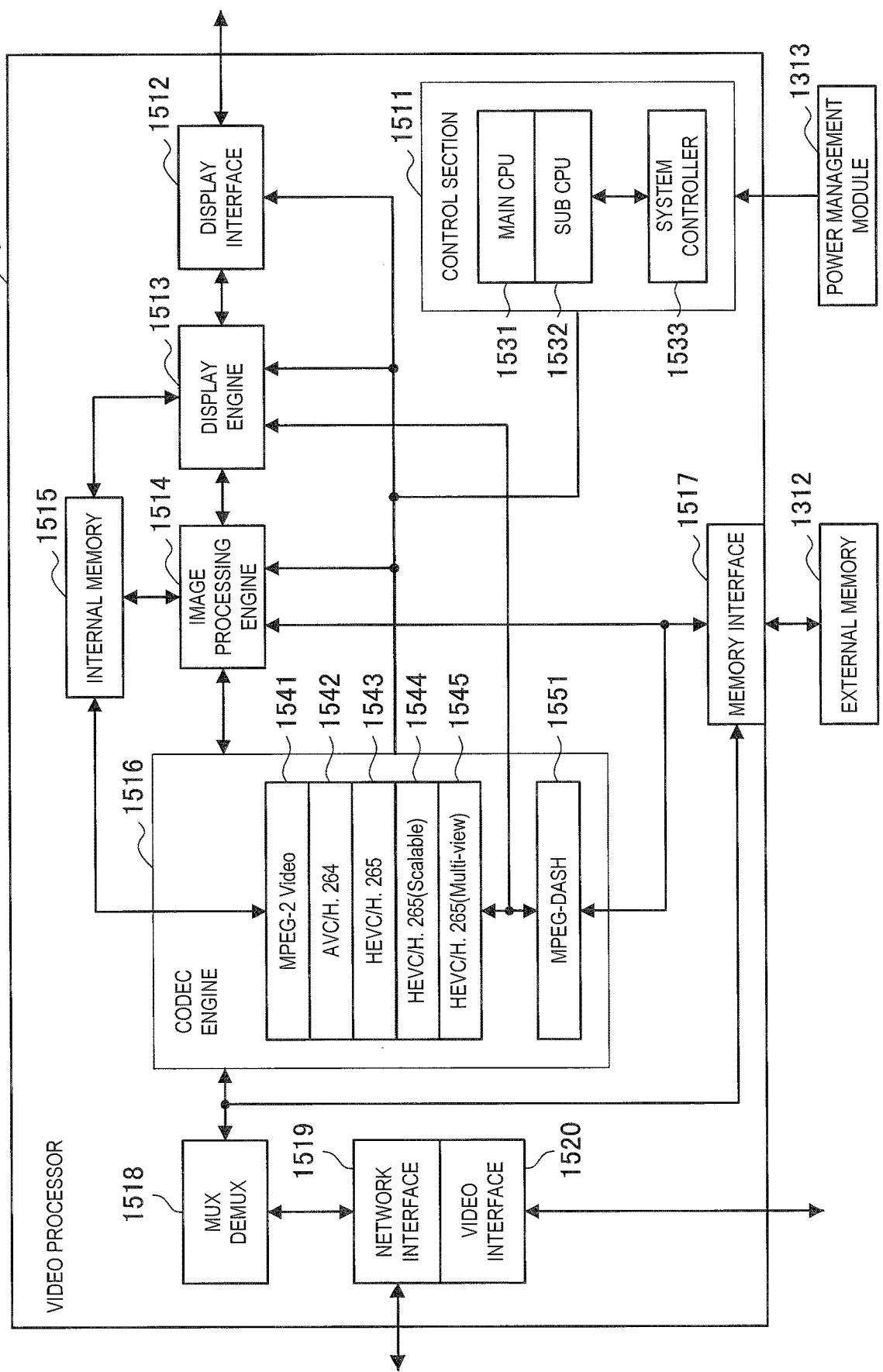
FIG. 30 is a block diagram showing another example of the schematic configuration of the video processor.

FIG. 30 is a block diagram showing another example of the schematic configuration of the video processor 1332. In the example of FIG. 30, the video processor 1332 has functions of encoding and decoding video data using a predetermined scheme.

Referring to FIG. 30, the video processor 1332 has a control section 1511, a display interface 1512, a display engine 1513, an image processing engine 1514, an internal memory 1515, a codec engine 1516, a memory interface 1517, a multiplexing and demultiplexing section 1518, a network interface 1519, and a video interface 1520.

The control section 1511 controls operations of various processing sections inside the video processor 1332 such as the display interface 1512, the display engine 1513, the image processing engine 1514, the codec engine 1516, and the like. The control section 1511 has, for example, a main CPU 1531, a sub CPU 1532, and a system controller 1533. The main CPU 1531 executes programs for controlling operations of each processing sections of the video processor 1332. The main CPU 1531 supplies generated control signals to each processing section through execution of the programs. The sub CPU 1532 plays an auxiliary role of the main CPU 1531. For example, the sub CPU 1532 executes child processes and subroutines of the programs executed by the main CPU 1531. The system controller 1533 manages execution of the programs by the main CPU 1531 and the sub CPU 1532.

The display interface 1512 outputs image data to, for example, connectivity module 1321 under control of the control section 1511. For example, the display interface 1512 outputs an analog image signal converted from digital image data or the digital image data itself to a display that is connected to the connectivity module 1321. The display engine 1513 executes format conversion, size conversion, and color space conversion on image data so that attributes of the image data fit specifications of the display that is an output destination under control of the control section 1511. The image processing engine 1514 executes image processing which can include a filtering process for the purpose of image quality improvement or the like on the image data under control of the control section 1511.

The internal memory 1515 is a memory device which is provided inside the video processor 1332 and shared by the display engine 1513, the image processing engine 1514, and the codec engine 1516. The internal memory 1515 is used when image data is input and output between, for example, the display engine 1513, the image processing engine 1514, and the codec engine 1516. The internal memory 1515 may be any type of memory device. For example, the internal memory 1515 may have a relatively small memory size for storing image data of a block unit and relevant parameters. The internal memory 1515 may be a memory which has a small capacity but a high response speed (for example, relatively to the external memory 1312), for example, a static random access memory (SRAM).

The codec engine 1516 performs an encoding process of encoding image data to generate an encoded video stream and a decoding process of decoding image data from an encoded video stream. An image coding scheme supported by the codec engine 1516 may be one or more arbitrary schemes. In the example illustrated in FIG. 30, the codec engine 1516 has an MPEG-2 video block 1541, an AVC/H.264 block 1542, an HEVC/H.265 block 1543, an HEVC/H.265 (scalable) block 1544, an HEVC/H.265 (multi-view) block 1545, and an MPEG-DASH block 1551. These respective functional blocks encode and decode image data according to a corresponding image coding scheme.

The MPEG-DASH block 1551 is a functional block which enables image data to be transmitted according to the MPEG-DASH scheme. The MPEG-DASH block 1551 executes generation of a stream based on a standard specification and control of transmission of the generated stream. Encoding and decoding of the transmitted image data may be executed by another functional block included in the codec engine 1516.

The memory interface 1517 is an interface for connecting the video processor 1332 to the external memory 1312. Data generated by the image processing engine 1514 or the codec engine 1516 is output to the external memory 1312 via the memory interface 1517. In addition, data input from the external memory 1312 is supplied to the image processing engine 1514 or the codec engine 1516 via the memory interface 1517.

The multiplexing and demultiplexing section 1518 performs multiplexing and demultiplexing of an encoded video stream and a relevant bit stream. During multiplexing, the multiplexing and demultiplexing section 1518 may add predetermined header information to a multiplexed stream. In addition, during demultiplexing, the multiplexing and demultiplexing section 1518 may add predetermined header information to separated individual streams. In other words, the multiplexing and demultiplexing section 1518 can execute format conversion together with multiplexing and demultiplexing. For example, the multiplexing and demultiplexing section 1518 may support conversion and inverse conversion between a plurality of bit streams and a transport stream which is a multiplexed stream in a transport format, and conversion and inverse conversion between a plurality of bit streams and file data in a recording format.

The network interface 1519 is an interface for connecting the video processor 1332 to, for example, the broadband modem 1333 or the connectivity module 1321. The video interface 1520 is an interface for connecting the video processor 1332 to, for example, the connectivity module 1321 or the camera 1322.

In the video processor 1332 configured as described above, the technology according to the present disclosure can be used in, for example, the codec engine 1516. In this case, the video processor 1332 is a chip or a module to which the technology according to the present disclosure is applied.

Note that a configuration of the video processor 1332 is not limited to the two examples described above. The video processor 1332, for example, may be realized as one semiconductor chip or a plurality of semiconductor chips. In addition, the video processor 1332 may be realized as a three-dimensional laminated LSI that is formed by laminating a plurality of semiconductors or a combination of a plurality of LSIs.

7-5. System that Uses MPEG-DASH (1) Overview of a Content Reproduction System

Figure 31:
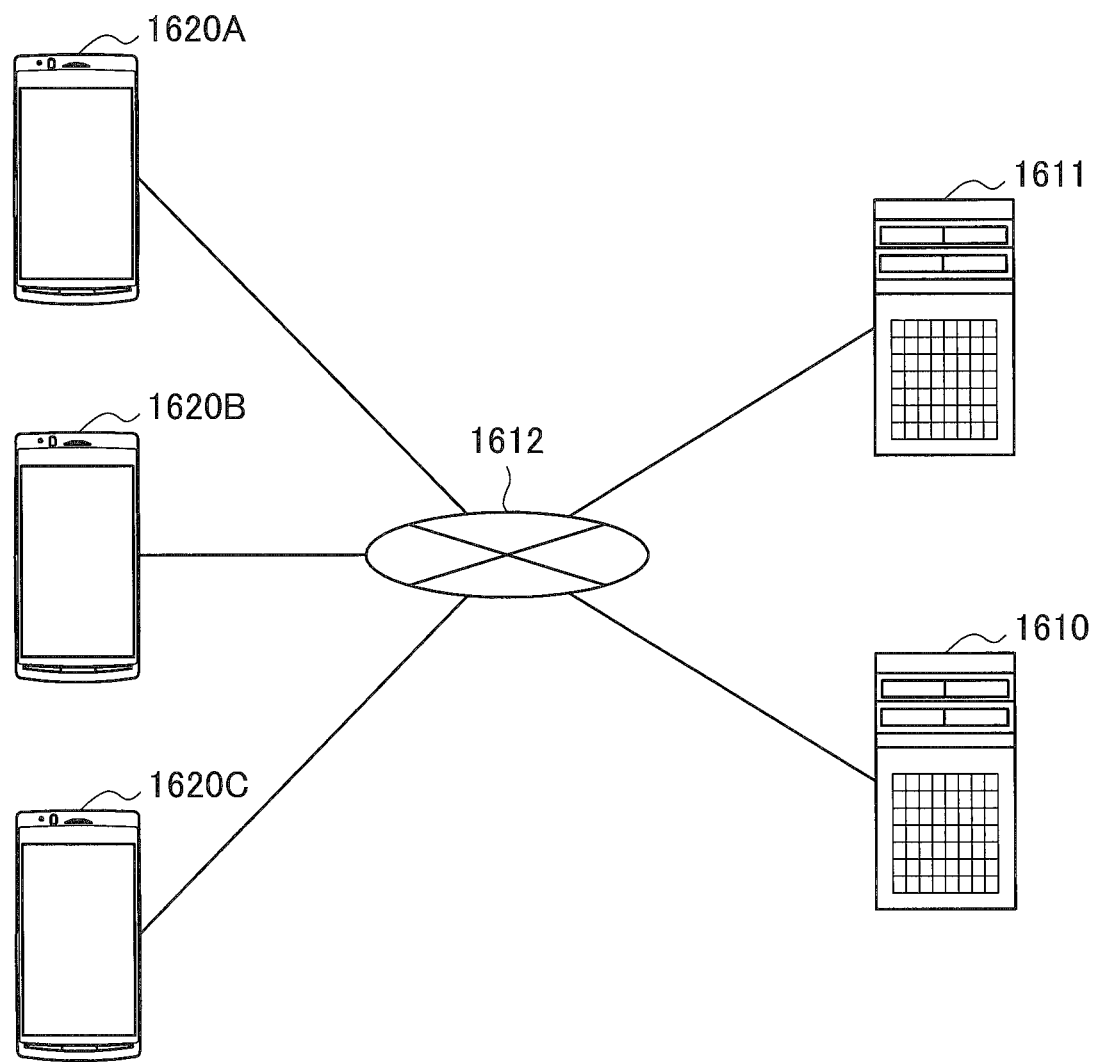
FIG. 31 is an illustrative diagram showing an overview of a content reproduction system.

First, a content reproduction system to which the technology according to the present disclosure can be applied will be briefly described using FIGS. 31 to 33. FIG. 31 is an illustrative diagram showing an overview of the content reproduction system. The content reproduction system illustrated in FIG. 31 includes content servers 1610 and 1611, a network 1612, and content reproduction devices (client devices) 1620 (1620A, 1620B, and 1620C).

The content servers 1610 and 1611 are connected to the content reproduction devices 1620 via the network 1612. The network 1612 is a wired or wireless transmission path for information transmitted or received by devices connected to the network 1612. The network 1612 may be, for example, a public network such as the Internet, a public switched telephone network, or a satellite communication network, or may be a private network such as a local area network (LAN) including Ethernet (registered trademark), a wide area network (WAN), or an Internet protocol-virtual private network (IP-VPN).

The content server 1610 is a server device which has a database in which data files including encoded data generated by encoding content data and relevant metadata are accumulated. When the content server 1610 generates a data file according to the MP4 file format, the encoded data can be stored in an "mdat" box and the metadata in a "moov" box. Content data may include audio content such as music, lectures, or radio programs. In addition, content data may include video content such as movies, television programs, or video programs. In addition, content data may include image content of photos, documents, drawings, or charts. Further, content data may include other types of content such as game data or software programs.

The content server 1610 generates a plurality of data files at different bit rates for the same content. In addition, as a response to a content reproduction request from the content reproduction devices 1620, the content server 1611 transmits the URL of the content server 1610 to the content reproduction device 1620 in addition to information relating to parameters to be attached to the URL.

FIG. 32 is an illustrative diagram showing an example of the flow of data in the above-described content reproduction system. The content server 1610 encodes the same content at different bit rates to generate, for example, a file A of 2 Mbps, a file B of 1.5 Mbps, and a file C of 1 Mbps illustrated in FIG. 32. The file A has a high bit rate, the file B a standard bit rate, and the file C a low bit rate relatively to each other.

In addition, as illustrated in FIG. 32, encoded data of each file is compartmentalized into a plurality of segments. For example, encoded data of the file A is compartmentalized into segments of "A1," "A2," "A3," . . . and "An," encoded data of the file B into segments of "B1," "B2," "B3," ... and "Bn," and encoded data of the file C into "C1," "C2," "C3," ... and "Cn."

Each segment may be a sequence of one or more samples which begins with, for example, a sync sample of MP4 (for example, a sample including IDR pictures) and can be reproduced for a single segment. For example, when video data of 30 frames per second is encoded using a GOP structure which has a fixed length of 15 frames, each segment may include 2 seconds of video and sound which is equivalent to 4 GOPs, or may include 10 seconds of video and sound which is equivalent to 20 GOPs. A temporal reproduction range of the segment at the same position in the file A, the file B, and the file C is typically the same. For example, the reproduction ranges of the segment "A2," the segment "B2," and the segment "C2" are the same. When each segment occupies a time length of two seconds in reproduction, the reproduction ranges of the segment "A2," the segment "B2," and the segment "C2" can all correspond to the range of the $2^{nd}$ second to the $4^{th}$ second of content.

The content server 1610 generates the files A to C which include the plurality of segments as above, and stores the generated files A to C. Then, the content server 1610 streams the segments included in each file to the content reproduction device 1620 as illustrated in FIG. 32. The content reproduction device 1620 reproduces content based on sequentially received segments.

The content server 1610 transmits a playlist file (which will be referred to as media presentation description (MPD)) which includes bit rate information and access information of each piece of encoded data to the content reproduction device 1620. Based on the MPD received from the content server 1610, the content reproduction device 1620 selects any bit rate from a plurality of bit rates, and requests transmission of segments corresponding to the selected bit rate to the content server 1610.

FIG. 33 is an illustrative diagram showing a specific example of an MPD. As shown in FIG. 33, the MPD includes access information relating to a plurality of pieces of encoded data having different bit rates (bandwidths). The MPD shown in FIG. 33 shows that there are about 6 pieces of encoded data having respective bit rates of 256 Kbps, 512 Kbps, 1.024 Mbps, 1.384 Mbps, 1.536 Mbps, and 2.048 Mbps. In addition, the MPD includes access information regarding each piece of encoded data. The content reproduction device 1620 can dynamically select a bit rate of content to be streamed for reproduction with reference to such an MPD.

Note that, although FIG. 31 illustrates mobile terminals as an example of the content reproduction devices 1620, the content reproduction devices 1620 are not limited thereto. The content reproduction devices 1620 may be terminal devices, for example, PCs, PDAs, smartphones, content recorders, content players, game devices, digital home appliances, and the like.

(2) Configuration Example of a Content Server

Figure 34:
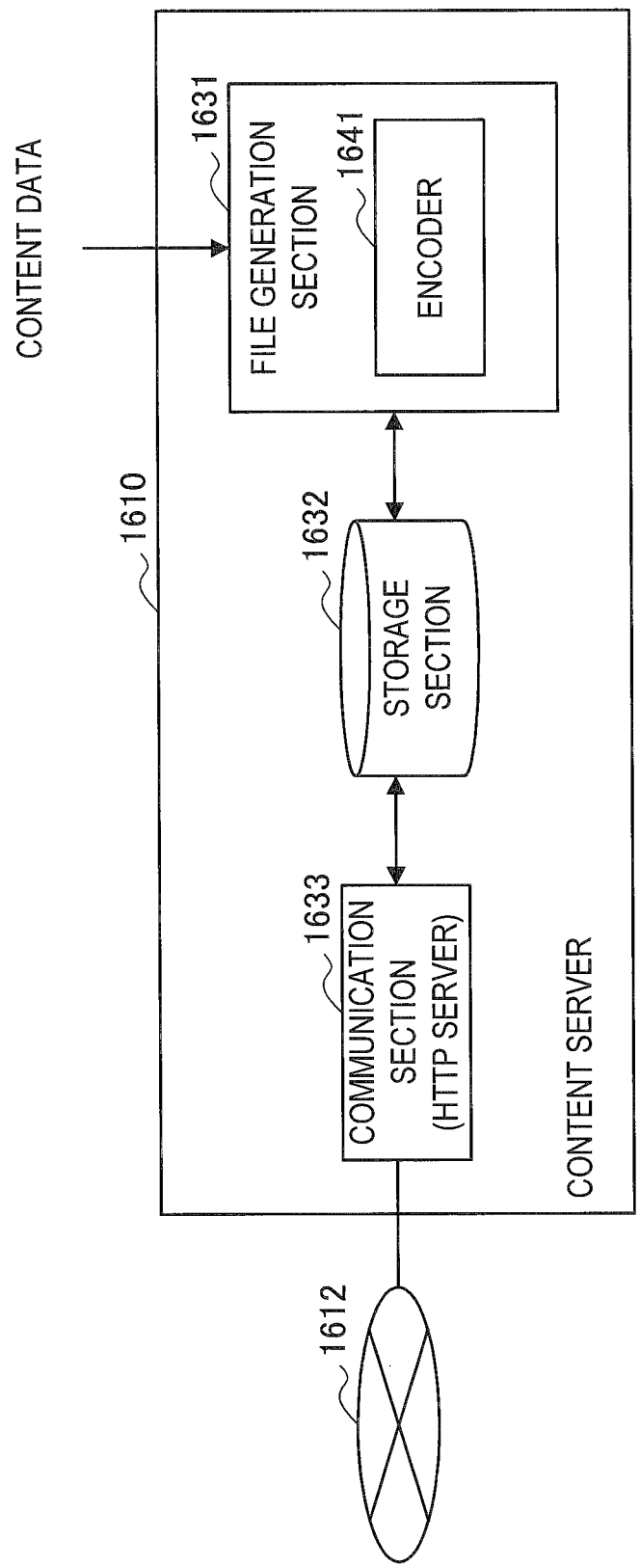
FIG. 34 is a block diagram showing an example of a configuration of a content server.

FIG. 34 is a block diagram showing an example of a configuration of the content server 1610. Referring to FIG. 34, the content server 1610 is provided with a file generation section 1631, a storage section 1632, and a communication section 1633.

The file generation section 1631 has an encoder 1641 which encodes content data, and generates a plurality of pieces of encoded data having different bit rates from the same content data. In addition, the file generation section 1631 generates the above-described MPD. The file generation section 1631, for example, can generate about 6 pieces of encoded data having respective bit rates of 256 Kbps, 512 Kbps, 1.024 Mbps, 1.384 Mbps, 1.536 Mbps, and 2.048 Mbps, thereby generating the MPD exemplified in FIG. 33.

The storage section 1632 stores the plurality of pieces of encoded data and the corresponding MPD generated by the file generation section 1631. The storage section 1632 can include a storage medium such as a non-volatile memory a magnetic disk, an optical disc, or a magneto-optical (MO) disc. For example, the non-volatile memory may be an electrically erasable programmable read-only memory (EEPROM) or an erasable programmable ROM (EPROM). The magnetic disk may be a hard disk or a discoid magnetic disk. The optical disc may be a compact disc (CD), a digital versatile disc recordable (DVD-R), or a Blu-ray disc (BD; registered trademark).

The communication section 1633 is a communication interface or a functional entity for communication with the content reproduction device 1620. The communication section 1633 communicates with the content reproduction device 1620 via the network 1612. To be more specific, the communication section 1633 has the function of an HTTP server. For example, the communication section 1633 provides the MPD to the content reproduction device 1620. In addition, according to an HTTP request from the content reproduction device 1620, the communication section 1633 transmits segments of encoded data having a bit rate selected based on the MPD by the content reproduction device 1620 to the content reproduction device 1620 as an HTTP response.

(3) Configuration Example of a Content Reproduction Device

Figure 35:
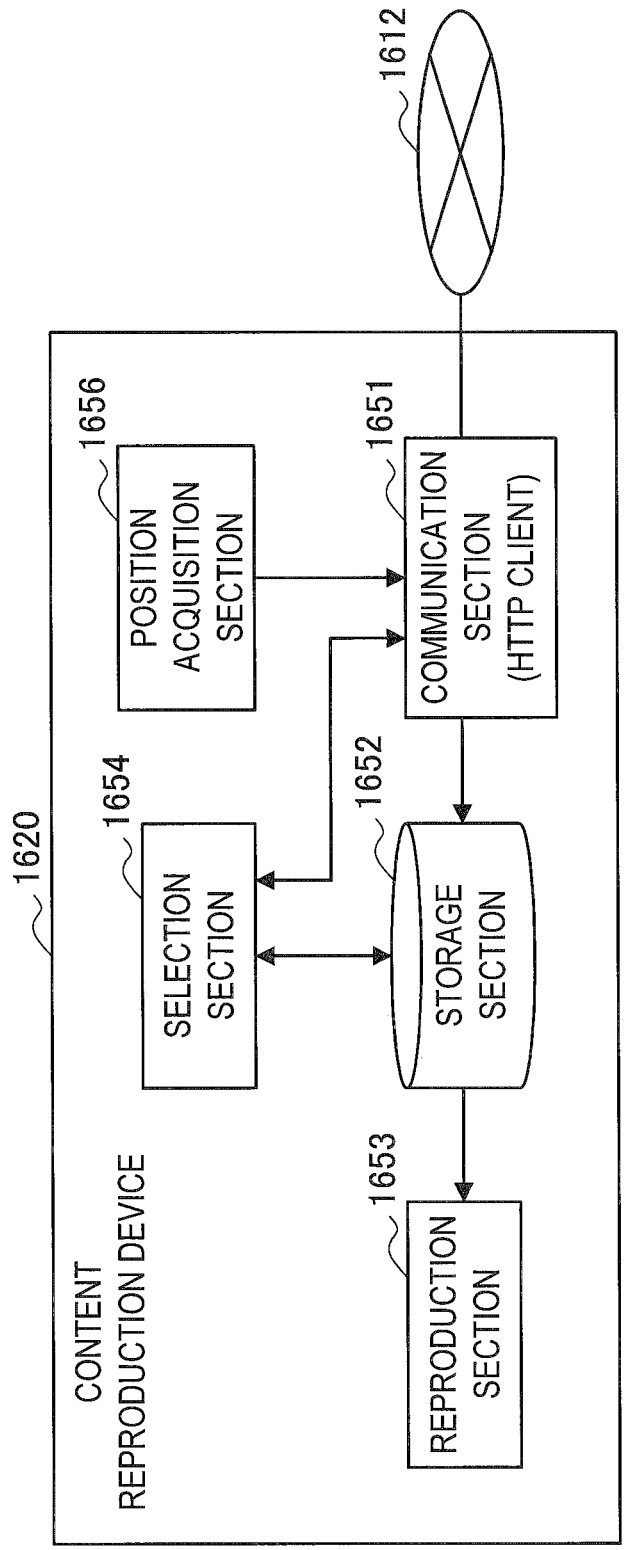
FIG. 35 is a block diagram showing an example of a configuration of a content reproduction device.

FIG. 35 is a block diagram showing an example of a configuration of the content reproduction device 1620. Referring to FIG. 35 the content reproduction device 1620 is provided with a communication section 1651, a storage section 1652, a reproduction section 1653, a selection section 1654, and a position acquisition section 1656.

The communication section 1651 is a communication interface or a functional entity for communication with the content server 1610. The communication section 1651 transmits HTTP requests to the content server 1610, and receives HTTP responses from the content server 1610. In other words, the communication section 1651 can operate as an HTTP client. The communication section 1651 can selectively acquire an MPD and segments of encoded data of target content from the content server 1610 using an HTTP range request.

The storage section 1652 stores various kinds of data relating to reproduction of content. The storage section 1652, for example, sequentially buffers segments acquired by the communication section 1651 from the content server 1610. The segments buffered by the storage section 1652 can be output to the reproduction section 1653 according to, for example, the first-in first-out (FIFO) principle. In addition, the storage section 1652 stores the definition of a parameter to be added to the URL of content which is described in the MPD received from the content server 1610. In addition, the storage section 1652 may store parameter selection information received from the content server 1611 to be described later.

The reproduction section 1653 sequentially acquires segments buffered by the storage section 1652 and decodes content data from the acquired segments. Then, the reproduction section 1653 executes DA conversion and rendering on the decoded content data to reproduce the content.

The selection section 1654 dynamically selects a bit rate proper for reproduction by the reproduction section 1653 among a plurality of bit rates defined in the MPD. Then, an HTTP request for acquiring segments of the encoded data corresponding to the selected bit rate is transmitted from the communication section 1651 to the content server 1610.

The position acquisition section 1656 is a module which acquires position data indicating current positions of the content reproduction device 1620. The position acquisition section 1656 may be, for example, a Global Positioning System (GPS) receiver. Instead, the position acquisition section 1656 may be a positioning engine which acquires current positions using a wireless network.

(4) Other Example of the Configuration of the Content Server

Figure 36:
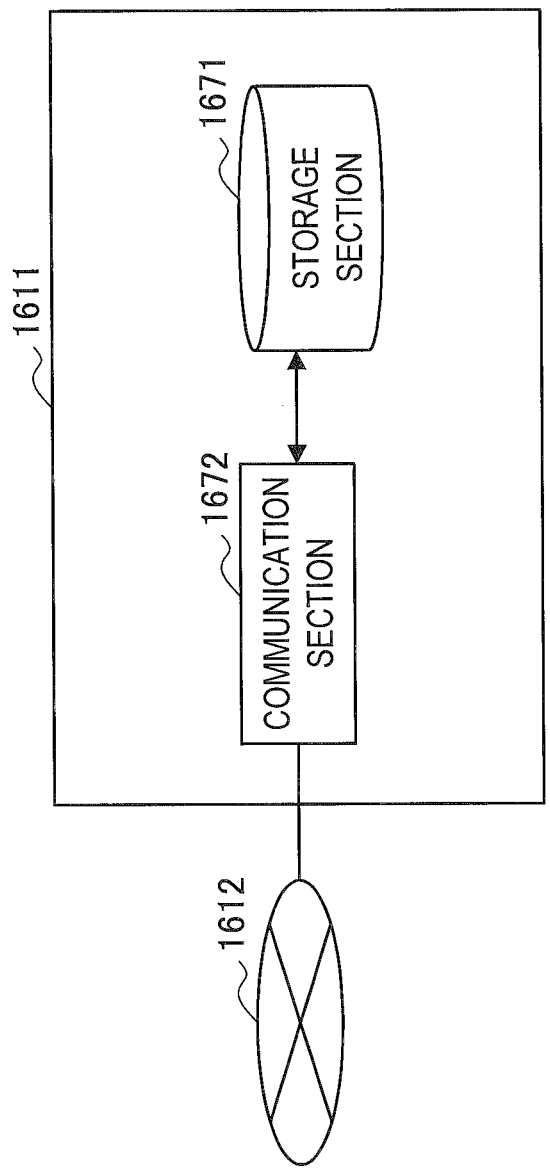
FIG. 36 is a block diagram showing another example of a configuration of a content server.

FIG. 36 is a block diagram showing another example of a configuration of the content server 1611. Referring to FIG. 36, the content server 1611 is provided with a storage section 1671 and a communication section 1672.

The storage section 1671 stores URL information which specifies URLs for accessing each piece of content. In addition, the storage section 1671 stores parameter selection information which can be referred to when the content reproduction device 1620 selects a parameter to be attached to the URL of each piece of content. The parameter selection information can map corresponding parameters to indexes, for example, a current position of a client, a user ID of the client, a memory size of a memory that the client has, a storage capacity that the client has, and the like.

The communication section 1672 is a communication interface or a functional entity for communication with the content reproduction device 1620. The communication section 1672 communicates with the content reproduction device 1620 via the network 1612. To be more specific, the communication section 1672 transmits the URL information and parameter selection information stored in the storage section 1671 to the content reproduction device 1620 according to a request from the content reproduction device 1620. The content reproduction device 1620 may select a parameter to be attached to the URL when requesting streaming of the content to the content server 1610 according to the parameter selection information received from the content server 1611.

In the content reproduction system described using FIGS. 31 to 36, the technology according to the present disclosure can be used in, for example, the encoder 1641 of the content server 1610.

7-6. System that Uses a P2P Mode of Wi-Fi

In this section, an example in which the technology according to the present disclosure is applied to a system which uses a P2P mode of Wi-Fi will be described.

(1) Basic Operation Sequence

Figure 37:
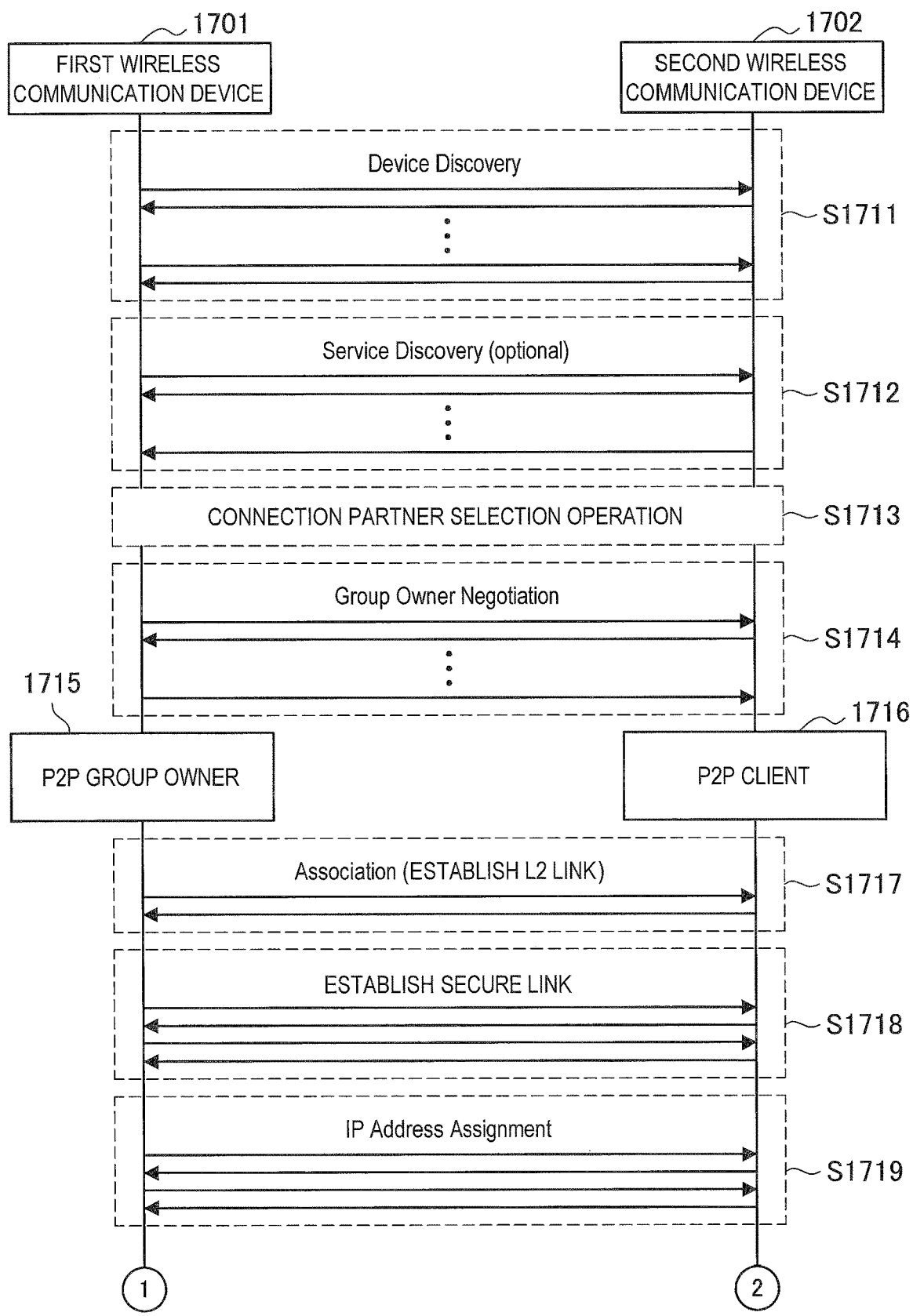
FIG. 37 is the former half of a sequence diagram showing a basic operation sequence in a wireless communication system that is formed in a P2P mode of Wi-Fi.
Figure 38:
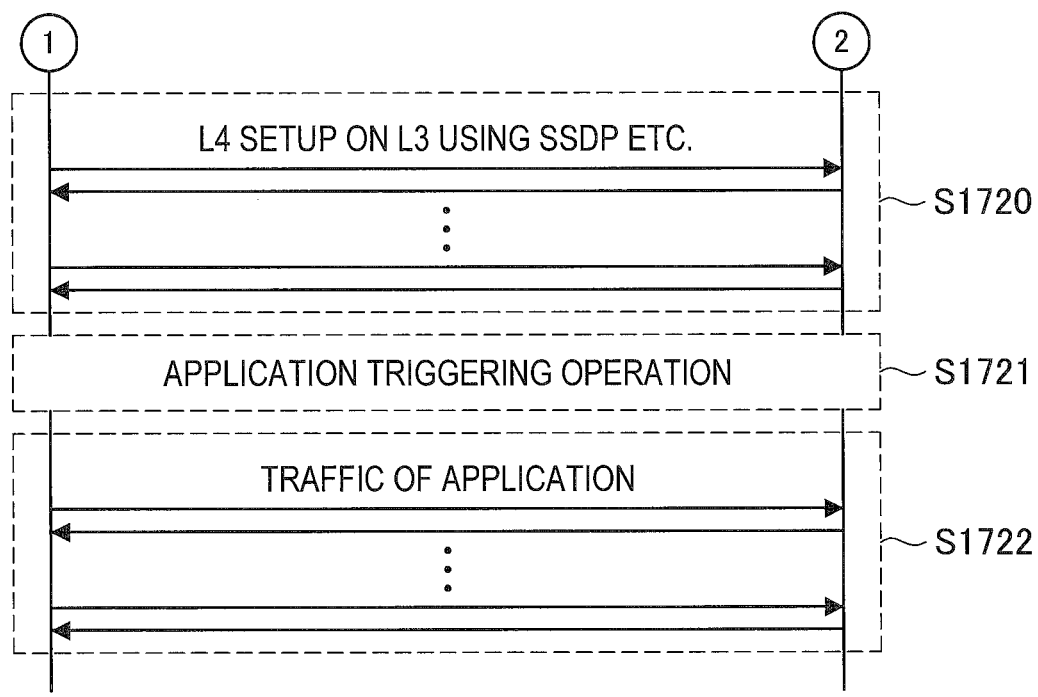
FIG. 38 is the latter half of the sequence diagram showing the basic operation sequence in the wireless communication system that is formed in the P2P mode of Wi-Fi.

FIGS. 37 and 38 are sequence diagrams illustrating a basic operation sequence of a wireless communication system formed in the P2P mode of Wi-Fi. Here, the sequence from establishment of peer-to-peer (P2P) connection between a first wireless communication device 1701 and a second wireless communication device 1702 to the start of an operation of a specific application is illustrated. To be more specific, the illustrated sequence complies with the specifications of Wi-Fi Direct (which can also be called Wi-Fi P2P) that is standardized by Wi-Fi Alliance.

First, a device discovery procedure is executed between the first wireless communication device 1701 and the second wireless communication device 1702 (Step S1711). In the device discovery procedure, for example, the first wireless communication device 1701 broadcasts a probe request (response request signal). Then, the first wireless communication device 1701 receives a probe response (response signal) from the second wireless communication device 1702 which has received the probe request. The first wireless communication device 1701 and the second wireless communication device 1702 thereby discover the presence of each other. In addition, in the device discovery procedure, attribute information such as device names and types (such as a television device, a PC, or a smartphone) of the respective devices and the like can be exchanged.

Next, a service discovery procedure is executed between the first wireless communication device 1701 and the second wireless communication device 1702 (Step S1712). In the service discovery procedure, for example, the first wireless communication device 1701 transmits a service discovery query to the second wireless communication device 1702 to inquire about a service or a protocol that the second wireless communication device 1702 supports. Then, the first wireless communication device 1701 receives a service discovery response from the second wireless communication device 1702, thereby recognizing a service or a protocol that the second wireless communication device 1702 supports. An example of the protocol that can be supported by each device can include the Digital Living Network Alliance (DLNA). In addition, an example of the service that can be supported by each device can include Digital Media Renderer (DMR) of the DLNA.

Next, a user performs an operation of selecting a connection partner (connection partner selection operation) (Step S1713). The connection partner selection operation may be performed on only one of the first wireless communication device 1701 and the second wireless communication device 1702, or on both of them. For example, a connection partner selection screen is displayed on a display of the first wireless communication device 1701. Then, the user selects the second wireless communication device 1702 displayed as a selection option on the connection partner selection screen through a predetermined user input.

After the connection partner selection operation, group owner negotiation is executed between the first wireless communication device 1701 and the second wireless communication device 1702 (Step S1714). Here, as a result of the negotiation, the first wireless communication device 1701 is assumed to serve as a group owner 1715, and the second wireless communication device 1702 as a client 1716.

Next, association (L2 link) is established between the first wireless communication device 1701 and the second wireless communication device 1702 (Step S1717), and further, a secure link is established (Step S1718). Further, allocation of IP addresses (Step S1719) and L4 setup on the L3 using a simple service discovery protocol (SSDP) (Step S1720) are executed between the first wireless communication device 1701 and the second wireless communication device 1702. Note that the L2 means the second layer (data link layer), the L3 means the third layer (network layer), and the L4 means the fourth layer (transport layer).

Next, the user performs an operation of triggering a specific application (application triggering operation) (Step S1721). The application triggering operation may be performed on only one of the first wireless communication device 1701 and the second wireless communication device 1702, or on both of them. For example, an application designation and triggering screen is displayed on the display of the first wireless communication device 1701. Then, the user designates a desired application among candidates listed up on the application designation and triggering screen through a predetermined user input.

After the application triggering operation, the designated application is triggered in the first wireless communication device 1701 and the second wireless communication device 1702, and traffic of the application is exchanged between the devices (Step S1722).

Here, also in the specifications of IEEE802.11 which was standardized earlier than Wi-Fi Direct, P2P connection between an access point (AP) and a station (STA) can be established. According to the specifications of the past, however, it is not possible to know information such as the type of a connection partner, or what service a connection partner supports before L2 link is established. On the other hand, in Wi-Fi Direct, information with regard to a connection partner can be acquired beforehand in the device discovery procedure and the service discovery procedure. Then, a user can select a desired connection partner with reference to the acquired information with regard to the connection partner.

(2) Extended Operation Sequence

The application triggering operation that is performed after the L2 link establishment can also be omitted by extending the structure of the above-described device discovery procedure and the service discovery procedure and causing a user to designate a desired application before L2 link is established. An example of a frame format of a MAC frame for such extension and an example of the operation sequence are illustrated in FIG. 39 and FIG. 40, respectively.

Figure 39:
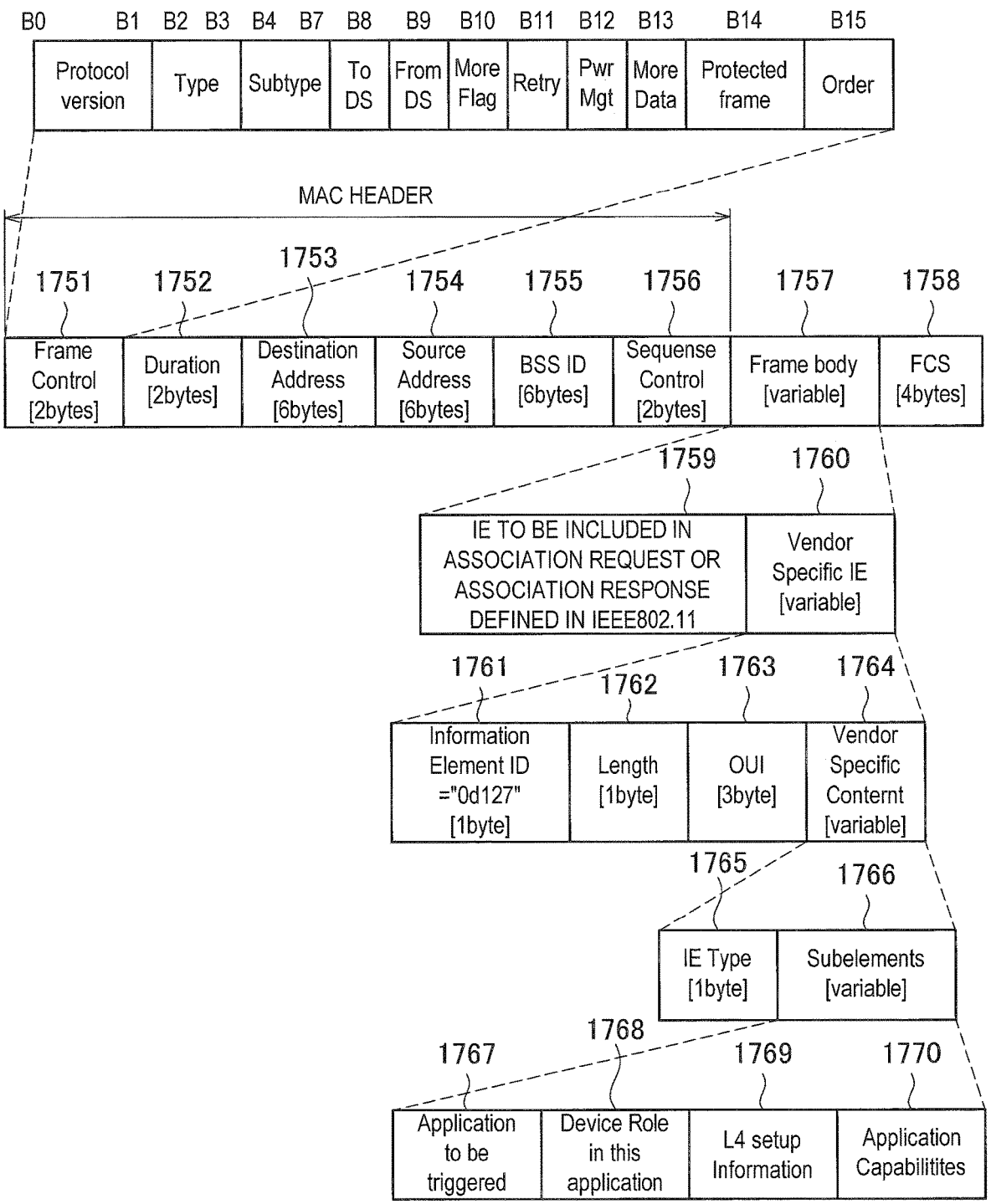
FIG. 39 is an illustrative diagram showing an example of a frame format of a MAC frame for an extended operation sequence.

Referring to FIG. 39, the example of the frame format of the MAC frame of an association request and response transmitted when establishment of L2 link is attempted is illustrated. 6 fields from the frame control field 1751 to the sequence control field 1756 constitute a MAC header. For example, in the frame control field 1751, a value for identifying an association request and an association response is set. While many other fields are fields for information elements (IE) defined in the specification of IEEE802.11-2007, several fields are extended.

In an information element ID field 1761, a value indicating that header-specific information is set in a vendor specific IE field 1760 (127 in decimal) is set. In this case, in the vendor specific IE field 1760, a length field 1762, an OUI field 1763, and a vendor specific content field 1764 continue. In this extension, the vendor specific content field 1764 includes an IE type field 1765 and one or more subelement fields 1766. The subelement field 1766 may include one or more of, for example, a field 1767 for identifying an application to be triggered, a field 1768 for identifying the role of a device relating to the application, a field 1769 for L4 setup information that can include a port number corresponding to the application, and a field 1770 for information relating to the capability of the application. The information relating to the capability may include, for example, information of specifying a possibility of a DLNA application executing audio distribution, audio reproduction, video distribution, and video reproduction.

The above-described extended association request and association response are exchanged when, for example, the first wireless communication device 1701 and the second wireless communication device 1702 attempt establishment of association (L2 link) in the sequence of FIG. 40 (Step S1717*b*). The association request can specify an application designated by the user in a connection partner selection operation (Step S1713*b*). Then, after the establishment of L2 link, the application designated by the user in advance is automatically triggered (Step S1720*b*) without performing an application triggering operation.

In the wireless communication system described in this section, the technology according to the present disclosure may be used when, for example, video data included in traffic of an application is encoded or decoded. Note that, the sequence diagrams described in this section only illustrate parts of processing steps that can be included in the operation sequence for the sake of brevity of description. Practically, the operation sequence may include more processing steps such as additional exchange of packets.

8. Conclusion

So far, the embodiments of the technology according to the present disclosure have been described in detail using FIGS. 1 to 40. According to the embodiments described above, the quantization parameter offsets for the quantization parameters, which are used when the transform coefficient data of the chroma components of the second layer decoded with reference to the first layer is quantized or inversely quantized, are set based on the quantization parameter offsets of the chroma components of the first layer. Thus, in the scalable video coding, it is possible to avoid redundant encoding of parameters relating to quantization and enhance coding efficiency as a whole. In general, adjustment of the quantization parameters of the chroma components depends on a tendency of a color appearing in each image, but does not depend on dissimilarity between the layers (or dissimilarity of resolution). Thus, even if the quantization parameter offsets for adjusting the quantization parameters of the chroma components are reused in the layers, the adjustment can be appropriately performed.

In addition, according to the embodiments described above, the quantization parameter offset set for the second layer is equal to the sum of the quantization parameter offset of the first layer and the quantization parameter offset difference encoded and decoded for the second layer. According to this configuration, while a code amount is reduced by reusing the quantization parameter offset of the first layer, the quantization parameter offsets of the second layer can be adaptively changed using the quantization parameter offset difference. Accordingly, the image quality of the chroma components of the second layer can be optimized for, for example, each slice.

In addition, according to the embodiments described above, the quantization parameter offsets of the second layer are set separately for the Cb component and the Cr component of the second layer. Accordingly, flexible adjustment is possible such that, for example, the quantization parameter of the Cb component is set to be relatively low in order to maintain grayscales in an image with strong red and the quantization parameter of the Cr component is set to be relatively low in order to maintain grayscales in an image with strong blue.

In addition, according to the embodiments described above, the quantization matrixes that are used when the transform coefficient data of the second layer is quantized or inversely quantized are set based on the quantization matrixes of the first layer. Also in this case, it is possible to avoid redundant encoding of parameters relating to quantization and enhance coding efficiency as a whole in a multilayer codec. When reference layer information for designating a layer to be referred to when the quantization matrixes are reused is encoded or decoded, it is possible to flexibly reuse an optimum quantization matrix in the second layer.

When the quantization matrixes of the second layer are duplicated from the quantization matrixes of the first layer, encoding for the quantization matrixes of the second layer does not occur. When the quantization matrixes of the second layer are predicted from the quantization matrixes of the first layer, encoding for a relatively small residual occurs, but an optimum quantization matrix can be used while a code amount of the second layer is reduced to some extent.

In addition, according to the embodiments described above, when the first layer is encoded in the AVC scheme and the second layer is encoded in the HEVC scheme, while the quantization matrixes having the sizes of 8×8 pixels or smaller are reused in the layers, the quantization matrixes having the sizes of 16×16 pixels or greater can be encoded and decoded in the second layer. According to this configuration, while a code amount is reduced due to reuse of the quantization matrixes, it is possible to guarantee proper operations of devices by supplementing insufficient quantization matrixes.

In addition, according to the embodiments described above, various flags such as the flag indicating whether or not the quantization parameter offsets should be reused in the layer, the flag indicating whether or not the quantization matrixes should be reused in the layers, and the flag designating a technique for setting a quantization matrix of the second layer can be encoded and decoded. The flags for quantization matrixes may be encoded and decoded separately for different quantization matrix sizes, different prediction modes, or different color components. With adoption of these flags, an encoding process can be flexibly designed according to various conditions such as user requirements, performance of a device, capability of an application, and a communication environment.

Mainly described herein is the example in which the various pieces of information such as the information related to quantization are multiplexed to the header of the encoded stream and transmitted from the encoding side to the decoding side. The method of transmitting these pieces of information however is not limited to such example. For example, these pieces of information may be transmitted or recorded as separate data associated with the encoded bit stream without being multiplexed to the encoded bit stream. Here, the term "association" means to allow the image included in the bit stream (the image may be a part of the image such as a slice or a block) and the information corresponding to the image to establish a link when decoding. Namely, the information may be transmitted on a different transmission path from the image (or the bit stream). In addition, the information may also be recorded in a different recording medium (or a different recording area in the same recording medium) from the image (or the bit stream). Furthermore, the information and the image (or the bit stream) may be associated with each other in an arbitrary unit such as a plurality of frames, one frame, or a portion within a frame.

The preferred embodiments of the present disclosure have been described above with reference to the accompanying drawings, whilst the present disclosure is not limited to the above examples, of course. A person skilled in the art may find various alternations and modifications within the scope of the appended claims, and it should be understood that they will naturally come under the technical scope of the present disclosure.

Additionally, the present technology may also be configured as below (1)

An image processing device including:

a control section configured to set, based on a first quantization parameter offset set for a chroma component of a first layer, a second quantization parameter offset for a chroma component of a second layer decoded with reference to the first layer; and an inverse quantization section configured to inversely quantize transform coefficient data of the chroma component of the second layer using a quantization parameter computed using the second quantization parameter offset set by the control section.

(2)

The image processing device according to (1), wherein the second quantization parameter offset is equal to the sum of the first quantization parameter offset and a quantization parameter offset difference.

(3)

The image processing device according to (2), further including:

a decoding section configured to decode the quantization parameter offset difference from an encoded stream.

(4)

The image processing device according to any one of (1) to (3), wherein the first quantization parameter offset is equal to the sum of an offset set for the first layer in a picture unit and an offset set for the first layer in a slice unit.

(5)

The image processing device according to any one of (1) to (3), wherein the first quantization parameter offset is equal to an offset set for the first layer in a picture unit.

(6)

The image processing device according to any one of (1) to (5), wherein the control section sets the second quantization parameter offset separately for a Cb component and a Cr component of the second layer.

(7)

The image processing device according to any one of (1) to (6), wherein, when a first flag decoded from an encoded stream indicates that the second quantization parameter offset should be set based on the first quantization parameter offset, the control section sets the second quantization parameter offset based on the first quantization parameter offset.

(8)

The image processing device according to any one of (1) to (7), wherein, based on a first quantization matrix set for the first layer, the control section sets a second quantization matrix for the second layer, and wherein the inverse quantization section inversely quantizes transform coefficient data of the second layer using the second quantization matrix set by the control section.

(9)

The image processing device according to (8), wherein, when reference layer information designates the first layer as a reference layer, the control section sets the second quantization matrix for the second layer based on the first quantization matrix set for the first layer.

(10)
The image processing device according to (8) or (9), wherein the control section duplicates or predicts the second quantization matrix from the first quantization matrix.

(11)
The image processing device according to any one of (8) to (10), wherein, when a second flag decoded from an encoded stream indicates that the second quantization matrix should be set based on the first quantization matrix, the control section sets the second quantization matrix based on the first quantization matrix.

(12)
The image processing device according to (11), wherein the second flag is decoded from the encoded stream separately for different quantization matrix sizes, different prediction modes, or different color components.

(13)
The image processing device according to (10), wherein the control section selects a setting technique for setting the second quantization matrix according to a third flag decoded from an encoded stream.

(14)
The image processing device according to (13), wherein the third flag is decoded from the encoded stream separately for different quantization matrix sizes, different prediction modes, or different color components.

(15)
The image processing device according to any one of (8) to (14),
wherein the second layer is encoded in a High Efficiency Video Coding (HEVC) scheme, and
wherein, when the first layer is encoded in an Advanced Video Coding (AVC) scheme, the control section sets the second quantization matrix having a size of 8×8 pixels or smaller for the second layer based on the first quantization matrix, and sets a third quantization matrix having a size of 16×16 pixels or greater for the second layer without being based on the first quantization matrix.

(16)
An image processing method including:
setting, based on a first quantization parameter offset set for a chroma component of a first layer, a second quantization parameter offset for a chroma component of a second layer decoded with reference to the first layer; and
inversely quantizing transform coefficient data of the chroma component of the second layer using a quantization parameter computed using the set second quantization parameter offset.

(17)
An image processing device including:
a quantization section configured to quantize transform coefficient data of a chroma component of a second layer encoded with reference to a first layer using a given quantization parameter; and
an encoding section configured to encode a second quantization parameter offset of a chroma component of the second layer computed based on a first quantization parameter offset set for a chroma component of the first layer and the given quantization parameter.

(18)
The image processing device according to (17),
wherein the quantization section quantizes transform coefficient data of the second layer using a given quantization matrix, and
wherein, when a decoder should set the given quantization matrix for the second layer based on a quantization matrix set for the first layer, the encoding section refrains from encoding the given quantization matrix.

(19)
The image processing device according to (18), wherein the encoding section encodes reference layer information which designates the first layer as a reference layer to be referred to when the given quantization matrix is set.

(20)
An image processing method including:
quantizing transform coefficient data of a chroma component of a second layer encoded with reference to a first layer using a given quantization parameter; and
encoding a second quantization parameter offset of the chroma component of the second layer computed based on a first quantization parameter offset set for a chroma component of the first layer and the given quantization parameter.

REFERENCE SIGNS LIST 10, 10v image encoding device (image processing device)
1a base layer encoding section
1b enhancement layer encoding section
15 quantization section
16 lossless encoding section
21 inverse quantization section
40 quantization control section
60, 60v image decoding device (image processing device
6a base layer decoding section
6b enhancement layer decoding section
62 lossless decoding section
63 inverse quantization section
90 inverse quantization control section

The invention claimed is:

1. An image processing device comprising:
a control section configured to set, based on a first scaling list for a first layer, a second scaling list for a second layer decoded with reference to the first layer; and
a quantization section configured to quantize transform coefficient data of the second layer using the second scaling list set by the control section,
wherein the control section selects a setting technique for setting the second scaling list according to a setting technique flag decoded from an encoded stream, and
wherein the control section and the quantization section are each implemented via at least one processor.

2. The image processing device according to claim 1, wherein, when reference layer information specifies the first layer as a reference layer, the control section sets the second scaling list for the second layer based on the first scaling list set for the first layer.

3. The image processing device according to claim 1, wherein the control section duplicates or predicts the second scaling list from the first scaling list.

4. The image processing device according to claim 1, further comprising:
an encoding unit configured to encode quantized transform coefficient data to generate an encoded stream,
wherein the encoding unit is implemented via at least one processor.

5. The image processing device according to claim 1, wherein the control section sets flag information specifying that the second scaling list is set based on the first scaling list, and
the encoding section generates the encoded stream including the flag information.

6. The image processing device according to claim 5, wherein the flag information is included in the encoded stream separately for different scaling list sizes, different prediction modes, or different color components.

7. The image processing device according to claim 6, wherein the flag information is included as SPS (Sequence Parameter Sef) or PPS (Picture Parameter Set) of the encoded stream.

8. An image processing method, implemented via at least one processor, the method comprising:
  setting, based on a first scaling list for a first layer, a second scaling list for a second layer decoded with reference to the first layer; and
  quantizing transform coefficient data of the second layer using the set second scaling list,
  wherein a setting technique for setting the second scaling list is selected according to a setting technique flag decoded from an encoded stream.

9. The image processing method according to claim 8, wherein, when reference layer information specifies the first layer as a reference layer, the setting comprises setting the second scaling list for the second layer based on the first scaling list set for the first layer.

10. The image processing method according to claim 8, further comprising duplicating or predicting the second scaling list from the first scaling list.

11. The image processing method according to claim 1, further comprising:
  encoding quantized transform coefficient data to generate an encoded stream.

12. The image processing method according to claim 1, further comprising:
  setting flag information specifying that the second scaling list is set based on the first scaling list, and
  generating the encoded stream including the flag information.

13. The image processing method according to claim 12, wherein the flag information is included in the encoded stream separately for different scaling list sizes, different prediction modes, or different color components.

14. The image processing method according to claim 13, wherein the flag information is included as SPS (Sequence Parameter Sef) or PPS (Picture Parameter Set) of the encoded stream.

* * * * *